United States Patent
Delanghe et al.

(10) Patent No.: US 11,853,530 B2
(45) Date of Patent: Dec. 26, 2023

(54) APPARATUSES, COMPUTER PROGRAM PRODUCTS, AND METHODS FOR GROUP-BASED COMMUNICATION CHANNEL ORGANIZATION

(71) Applicant: Salesforce, Inc., San Francisco, CA (US)

(72) Inventors: Jaime Delanghe, Brooklyn, NY (US); Sufian Rhazi, Brooklyn, NY (US); Rosaleen Nguyen, Brooklyn, NY (US); Kevin Eder, Brooklyn, NY (US); Jaron Moore, Brooklyn, NY (US); Andrew Morrison, Brooklyn, NY (US); Rocio Aracely Delgado Regalado, Fairfax, VA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/543,435

(22) Filed: Dec. 6, 2021

(65) Prior Publication Data
US 2022/0164073 A1     May 26, 2022

Related U.S. Application Data

(63) Continuation of application No. 16/670,823, filed on Oct. 31, 2019, now Pat. No. 11,194,447.

(51) Int. Cl.
*G06F 3/0482* (2013.01)
*G06F 16/953* (2019.01)
(Continued)

(52) U.S. Cl.
CPC ........ *G06F 3/0482* (2013.01); *G06F 3/04847* (2013.01); *G06F 16/953* (2019.01);
(Continued)

(58) Field of Classification Search
CPC ... G06F 3/0482; G06F 3/04847; G06F 16/953
See application file for complete search history.

(56) References Cited

U.S. PATENT DOCUMENTS 9,940,394 B1    4/2018  Grant et al.
2002/0186257 A1 * 12/2002  Cadiz ................. G06F 16/9535
                                                               715/838
(Continued)

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Michael Roswell
(74) *Attorney, Agent, or Firm* — Lee & Hayes, P.C.

(57) ABSTRACT

Various embodiments of the present disclosure provide apparatuses, systems, and computer program products for group-based communication channel organization. In this regard, embodiments described herein are configured to enable group-based communication interfaces rendered with group-based communication channels organized into specific organized channel sets. A plurality of organized channel sets may be reorganized, and/or the associated channel set for each organized channel set may be reorganized. In one example embodiment, an apparatus is configured to receive an interface rendering request associated with an authenticated user account and a group-based communication interface, identify at least one organized channel set associated with the authenticated user account, and cause rendering of the group-based communication interface comprising an organized channel set interface element set, each organized channel set interface element in the organized channel set (Continued)

interface element set associated with one of the at least one organized channel set.

20 Claims, 20 Drawing Sheets

(51) Int. Cl.
*H04L 12/18* (2006.01)
*H04L 67/306* (2022.01)
*H04L 9/40* (2022.01)
*G06F 3/04847* (2022.01)

(52) U.S. Cl.
CPC ............ *H04L 12/185* (2013.01); *H04L 63/08* (2013.01); *H04L 63/104* (2013.01); *H04L 67/306* (2013.01)

(56) References Cited

U.S. PATENT DOCUMENTS

| | | | |
|---|---|---|---|
| 2006/0242581 | A1 | 10/2006 | Manion et al. |
| 2010/0125580 | A1* | 5/2010 | Westen ............. G06F 16/24575 707/737 |
| 2011/0302509 | A1 | 12/2011 | Leacock et al. |
| 2017/0134316 | A1 | 5/2017 | Cohen et al. |
| 2018/0287982 | A1 | 10/2018 | Draeger et al. |
| 2019/0238489 | A1* | 8/2019 | Cohen ................... H04L 51/216 |
| 2021/0132749 | A1 | 5/2021 | Delanghe et al. |

OTHER PUBLICATIONS

"Beginners Guide to Discord", retrieved Nov. 16, 2020 at <<https://support.discord.com/hc/en-us/articles/360045138571-Beginner-s-Guide-to-Discord>>, 14 pgs.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516> (dated Aug. 14, 2013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How can I change Discords appearance/theme? " retrieved Nov. 16, 2020 at <<web.archive.org/web/20190212235400/https://support.discordapp.com/hc/en-us/articles/207260127-How-can-I-change-Discord-s-appearance-theme->>, Feb. 2019, 7pgs.

"How do I join a Server?", retrieved on Nov. 16, 2020 at <<https://support.discord.com/hc/en-us/articles/360034842871-How-do-I-join-a-Server>>, 20 pgs.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat> (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance_lexis.com/api/permalink/3eb84b34-a8f9-4d7d-9573-89d9598a4963/?context=1000516> (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Office Action for U.S. Appl. No. 16/670,823, dated Jul. 29, 2020, Delanghe, "Apparatuses, Computer Program Products, and Methods for Group-Based Communication Channel Organization", 22 Pages.

Office Action for U.S. Appl. No. 16/670,823, dated Nov. 25, 2020, Delanghe, "Apparatuses, Computer Program Products, and Methods for Group-Based Communication Channel Organization", 22 Pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

"Resending Verification Email" retrived Nov. 16, 2020 at << web.archive.org/web/20190722000553/https://support.discordapp.com/hc/en-us/articles/213219267-Resending-Verification-Email>>, Jul. 2019, 4 pgs.

Ernie Smith, "Picking Up the Slack", TEdium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

APPARATUSES, COMPUTER PROGRAM PRODUCTS, AND METHODS FOR GROUP-BASED COMMUNICATION CHANNEL ORGANIZATION

RELATED APPLICATIONS

This application claims priority to and is a continuation of U.S. patent application Ser. No. 16/670,823, filed on Oct. 31, 2019, the entire contents of which are incorporated herein by reference.

TECHNOLOGICAL FIELD

Embodiments of the present disclosure generally relate to group-based communication channel organization, and specifically to organized channel set generation and management in a group-based communication system.

BACKGROUND

Conventionally, in message systems, channels are organized within a single set containing all channels. Alternatively, in some conventional systems, channels are organized within a limited set of inflexible and/or automatically generated channel sets. Applicant has discovered problems with current systems, methods, apparatuses, and computer program products for channel organization, and through applied effort, ingenuity, and innovation, Applicant has solved many of these identified problems by developing a solution that is embodied in the present disclosure, which is described in detail below.

BRIEF SUMMARY

In general, embodiments of the present disclosure provided herein include systems, methods, apparatuses and computer program products for group-based communication channel organization. Other systems, apparatuses, methods, computer readable media, and features will be, or will become, apparent to one with skill in the art upon examination of the following figures and detailed description. It is intended that all such additional systems, apparatuses, methods, computer readable media, and features be included within this description be within the scope of the disclosure, and be protected by the following claims.

In accordance with one aspect of the present disclosure, an apparatus for group-based communication channel organization is provided. In at least one example embodiment, the apparatus includes at least one processor and at least one memory, the at least one memory having computer-coded instructions stored thereon. The computer coded-instructions, in execution with the at least one processor, configure the apparatus to receive an interface rendering request associated with an authenticated user account and a group-based communication interface. The example apparatus is further configured to identify at least one organized channel set associated with the authenticated user account. The example apparatus is further configured to cause rendering of the group-based communication interface, the group-based communication interface comprising (1) a sidebar interface, wherein the sidebar interface comprises an organized channel set interface element set, each organized channel set interface element in the organized channel set interface element set associated with one of the at least one organized channel set, and (2) at least one other group-based communication channel separate from the organized channel set interface element set, wherein the at least one other group-based communication channel is not associated with any of the at least one organized channel set.

Additionally or alternatively, in some embodiments of the example apparatus the interface rendering request is received from a client device, and identifying the at least one organized channel set associated with the authenticated user account comprises querying a group-based communication datastore based on the authenticated user account and the group-based communication interface; and receiving the at least one organized channel set from a group-based communication system in response to the query.

Additionally or alternatively, in some embodiments of the example apparatus the interface rendering request is received in response to user interaction, and identifying the at least one organized channel set associated with the authenticated user account comprises querying a client datastore based on the authenticated user account and the group-based communication interface; and receiving the at least one organized channel set in response to the query.

Additionally or alternatively, in some embodiments of the example apparatus, each organized channel set interface element in the organized channel set interface element set is associated with an organized channel set of the at least one organized channel set, and each organized channel set interface element in the organized channel set interface element set is configured based on one or more of organized channel set title data and organized channel set image data for the associated organized channel set.

Additionally or alternatively, in some embodiments of the example apparatus, the at least one organized channel set comprises a first organized channel set and a second organized channel set, and the organized channel set interface element set comprises at least a first organized channel set interface element associated with the first organized channel set and a second organized channel set interface element associated with the second organized channel set, and wherein the sidebar interface comprises the second organized channel set interface element rendered separate from the first organized channel set interface element.

Additionally or alternatively, in some embodiments of the example apparatus, the apparatus is further configured to receive a channel organization request, the channel organization request associated with at least one selected group-based communication channel and a selected organized channel set of the identified at least one organized channel set; and cause updated rendering of a selected organized channel set interface element associated with the selected organized channel set to include the at least one selected group-based communication channel. Additionally or alternatively, in some such embodiments of the example apparatus, to receive the channel organization request, the apparatus is configured to receive user interaction data representing a drag-and-drop action from the at least one selected group-based communication channel to the selected organized channel set interface element associated with the selected organized channel set.

Additionally or alternatively, in yet other of such embodiments of the example apparatus, to receive the channel organization request, the apparatus is configured to receive first user interaction data indicating activation of an channel organization mode; cause rendering of the sidebar interface of the group-based communication interface comprising at least a selection interface element associated with each group-based communication channel accessible to the authenticated user account and a selection submission interface element, wherein each selection interface element is configured to receive user interaction indicating selection of the corresponding group-based communication channel for associating with an organized channel set; in response to receiving user interaction with the selection interface element associated with the at least one selected group-based communication channel, receive channel selection data for at least the at least one selected group-based communication channel; and in response to receiving user interaction with the selection submission interface element, receive the channel organization request, wherein the at least one selected group-based communication channel associated with the channel organization request is based on the channel selection data, and wherein the selected organized channel set is based on the user interaction with the selection submission interface element.

Additionally or alternatively, in yet other of such embodiments of the example apparatus, the apparatus is further configured to store the at least one selected group-based communication channel within the selected organized channel set.

Additionally or alternatively, in yet other of such embodiments of the example apparatus, the channel organization request comprises a plurality of channel identifiers associated with the at least one selected group-based communication interface, the apparatus further configured to store the channel identifier set within the selected organized channel set.

Additionally or alternatively, in yet other of such embodiments of the example apparatus, the apparatus further configured to receive a second channel organization request in response to receiving second user interaction data, the second channel organization request associated with at least one second selected group-based communication channel and a second selected organized channel set of the identified at least organized channel set; and cause updated rendering of a second organized channel set interface element associated with the second selected organized channel set to include the at least one second selected group-based communication channel.

Additionally or alternatively, in some embodiments of the example apparatus, the apparatus is further configured to receive an organized channel set creation request associated with the authenticated user account, wherein the organized channel set creation request comprises organized channel set title data; generate a new organized channel set based on the organized set creation request, the new organized channel set comprising at least a new organized channel set identifier; and store the new organized channel set associated with the authenticated user account. Additionally or alternatively, in some such embodiments of the example apparatus, the organized channel set creation request further comprises organized channel set image data, and the apparatus is further configured to cause updated rendering of the group-based communication interface to include a new organized channel set interface element based configured based on at least the organized channel set image data.

Additionally or alternatively, in some embodiments of the example apparatus, the organized channel set interface element set comprises a selected organized channel set interface element, the selected organized channel set interface element comprising at least a selected group-based communication channel of a plurality of associated group-based communication channels, and the selected organized channel set is associated with a channel order, the apparatus further configured to receive channel reordering interaction data in response to user interaction with the selected group-based communication channel associated with the selected organized channel set interface element; generate an updated channel order based on the channel order and the channel reordering interaction data; and cause updated rendering of the group-based communication interface comprising the selected organized channel set interface element rendered based on the updated channel order.

Additionally or alternatively, in some embodiments of the example apparatus, the organized channel set interface element set comprises a selected organized channel set interface element associated with a selected organized channel set, and the apparatus is further configured to receive a settings configuration request associated with the selected organized channel set in response to user interaction with the selected organized channel set interface element; and configure at least one group-based communication channel setting for each group-based communication channels in a group-based communication channel set associated with the selected organized channel set, wherein the at least one group-based communication channel setting is configured based on the settings configuration request.

Additionally or alternatively, in some embodiments of the example apparatus, the organized channel set interface element set comprises a selected organized channel set interface element, and the at least one organized channel set is associated with an organized channel set order, the apparatus is further configured to receive organized channel set reordering interaction data in response to user interaction with the selected organized channel set interface element; generate an updated organized channel set order based on the organized channel set order and the organized channel set reordering interaction data; and cause updated rendering of the sidebar interface comprising at least the selected organized channel set interface element rendered based on the updated organized channel set order.

In accordance with another aspect of the present disclosure, a computer-implemented method for group-based communication channel organization is provided. The computer-implemented method may be performed by any hardware, software, firmware, or a combination thereof, as disclosed herein. In at least one example embodiment, the computer-implemented method includes receiving an interface rendering request associated with an authenticated user account and a group-based communication interface. The example computer-implemented method further includes identifying at least one organized channel set associated with the authenticated user account. The example computer-implemented method further includes causing rendering of the group-based communication interface, the group-based communication interface comprising (1) a sidebar interface, wherein the sidebar interface comprises an organized channel set interface element set, each organized channel set interface element in the organized channel set interface element set associated with one of the at least one organized channel set, and (2) at least one other group-based communication channel separate from the organized channel set interface element set, wherein the at least one other group-based communication channel is not associated with any of the at least one organized channel set.

Additionally or alternatively, in some example embodiments of the computer-implemented method, the interface rendering request is received from a client device, and wherein identifying the at least one organized channel set associated with the authenticated user account comprises querying a group-based communication datastore based on the authenticated user account and the group-based communication interface; and receiving the at least one organized channel set from a group-based communication system in response to the query.

Additionally or alternatively, in some example embodiments of the computer-implemented method, the interface rendering request is received in response to user interaction, and wherein identifying the at least one organized channel set associated with the authenticated user account comprises querying a client datastore based on the authenticated user account and the group-based communication interface; and receiving the at least one organized channel set in response to the query.

Additionally or alternatively, in some example embodiments of the computer-implemented method, each organized channel set interface element in the organized channel set interface element set is associated with an organized channel set of the at least one organized channel set, and each organized channel set interface element in the organized channel set interface element set is configured based on one or more of organized channel set title data and organized channel set image data for the associated organized channel set.

Additionally or alternatively, in some example embodiments of the computer-implemented method, the at least one organized channel set comprises a first organized channel set and a second organized channel set, and the organized channel set interface element set comprises at least a first organized channel set interface element associated with the first organized channel set and a second organized channel set interface element associated with the second organized channel set, and the sidebar interface comprises the second organized channel set interface element rendered separate from the first organized channel set interface element.

Additionally or alternatively, in some example embodiments of the computer-implemented method, the computer-implemented method further comprises receiving a channel organization request, the channel organization request associated with at least one selected group-based communication channel and a selected organized channel set of the identified at least one organized channel set; and causing updated rendering of a selected organized channel set interface element associated with the selected organized channel set to include the at least one selected group-based communication channel. Additionally or alternatively, in some such example embodiments of the computer-implemented method, receiving the channel organization request comprises receiving user interaction data representing a drag-and-drop action from the at least one selected group-based communication channel to the selected organized channel set interface element associated with the selected organized channel set. Additionally or alternatively, in other such example embodiments of the computer-implemented method, receiving the channel organization request comprises receiving first user interaction data indicating activation of an channel organization mode; causing rendering of the sidebar interface of the group-based communication interface comprising at least a selection interface element associated with each group-based communication channel accessible to the authenticated user account and a selection submission interface element, wherein each selection interface element is configured to receive user interaction indicating selection of the corresponding group-based communication channel for associating with an organized channel set; in response to receiving user interaction with the selection interface element associated with the at least one selected group-based communication channel, receiving channel selection data for at least the at least one selected group-based communication channel; and in response to receiving user interaction with the selection submission interface element, receive the channel organization request, wherein the at least one selected group-based communication channel associated with the channel organization request is based on the channel selection data, and wherein the selected organized channel set is based on the user interaction with the selection submission interface element.

Additionally or alternatively, in other such example embodiments of the computer-implemented method, the computer-implemented method further comprises storing the at least one selected group-based communication channel within the selected organized channel set. Additionally or alternatively, in other such example embodiments of the computer-implemented method, the channel organization request comprises a plurality of channel identifiers associated with the at least one selected group-based communication interface, the computer-implemented method further comprises storing the channel identifier set within the selected organized channel set. Additionally or alternatively, in other such example embodiments of the computer-implemented method, the computer-implemented method further comprises receiving a second channel organization request in response to receiving second user interaction data, the second channel organization request associated with at least one second selected group-based communication channel and a second selected organized channel set of the identified at least organized channel set; and causing updated rendering of a second organized channel set interface element associated with the second selected organized channel set to include the at least one second selected group-based communication channel.

Additionally or alternatively, in some example embodiments of the computer-implemented method, the computer-implemented method further comprises receiving an organized channel set creation request associated with the authenticated user account, wherein the organized channel set creation request comprises organized channel set title data; generating a new organized channel set based on the organized set creation request, the new organized channel set comprising at least a new organized channel set identifier; and storing the new organized channel set associated with the authenticated user account. Additionally or alternatively, in other such example embodiments of the computer-implemented method, the organized channel set creation request further comprises organized channel set image data, and the computer-implemented method further comprising causing updated rendering of the group-based communication interface to include a new organized channel set interface element based configured based on at least the organized channel set image data.

Additionally or alternatively, in some such example embodiments of the computer-implemented method, the organized channel set interface element set comprises a selected organized channel set interface element, the selected organized channel set interface element comprising at least a selected group-based communication channel of a plurality of associated group-based communication channels, the selected organized channel set is associated with a channel order, and the computer-implemented method further comprises receiving channel reordering interaction data in response to user interaction with the selected group-based communication channel associated with the selected organized channel set interface element; generating an updated channel order based on the channel order and the channel reordering interaction data; and causing updated rendering of the group-based communication interface comprising the selected organized channel set interface element rendered based on the updated channel order.

Additionally or alternatively, in some such example embodiments of the computer-implemented method, the organized channel set interface element set comprises a selected organized channel set interface element associated with a selected organized channel set, and the computer-implemented method further comprises receiving a settings configuration request associated with the selected organized channel set in response to user interaction with the selected organized channel set interface element; configuring at least one group-based communication channel setting for each group-based communication channels in a group-based communication channel set associated with the selected organized channel set, wherein the at least one group-based communication channel setting is configured based on the settings configuration request.

Additionally or alternatively, in some such example embodiments of the computer-implemented method, the organized channel set interface element set comprises a selected organized channel set interface element, the at least one organized channel set is associated with an organized channel set order, and the computer-implemented method further comprises receiving organized channel set reordering interaction data in response to user interaction with the selected organized channel set interface element; generating an updated organized channel set order based on the organized channel set order and the organized channel set reordering interaction data; and causing updated rendering of the sidebar interface comprising at least the selected organized channel set interface element rendered based on the updated organized channel set order.

In accordance with another aspect of the present disclosure, a computer program product for group-based communication channel organization is provided. In at least one example embodiment, the computer program product includes at least one non-transitory computer-readable storage medium having computer program instructions thereon. The computer program instructions are, in execution with a processor, configured for receiving an interface rendering request associated with an authenticated user account and a group-based communication interface. The example computer program product is further configured for identifying at least one organized channel set associated with the authenticated user account. The example computer program product is further configured for causing rendering of the group-based communication interface, the group-based communication interface comprising (1) a sidebar interface, wherein the sidebar interface comprises an organized channel set interface element set, each organized channel set interface element in the organized channel set interface element set associated with one of the at least one organized channel set, and (2) at least one other group-based communication channel separate from the organized channel set interface element set, wherein the at least one other group-based communication channel is not associated with any of the at least one organized channel set.

Additionally or alternatively, in some example embodiments of the computer program product, the interface rendering request is received from a client device, and identifying the at least one organized channel set associated with the authenticated user account comprises querying a group-based communication datastore based on the authenticated user account and the group-based communication interface; and receiving the at least one organized channel set from a group-based communication system in response to the query.

Additionally or alternatively, in some example embodiments of the computer program product, the interface rendering request is received in response to user interaction, and wherein identifying the at least one organized channel set associated with the authenticated user account comprises querying a client datastore based on the authenticated user account and the group-based communication interface; and receiving the at least one organized channel set in response to the query.

Additionally or alternatively, in some example embodiments of the computer program product, each organized channel set interface element in the organized channel set interface element set is associated with an organized channel set of the at least one organized channel set, and each organized channel set interface element in the organized channel set interface element set is configured based on one or more of organized channel set title data and organized channel set image data for the associated organized channel set.

Additionally or alternatively, in some example embodiments of the computer program product, the at least one organized channel set comprises a first organized channel set and a second organized channel set, the organized channel set interface element set comprises at least a first organized channel set interface element associated with the first organized channel set and a second organized channel set interface element associated with the second organized channel set, and the sidebar interface comprises the second organized channel set interface element rendered separate from the first organized channel set interface element.

Additionally or alternatively, in some example embodiments of the computer program product, the computer program product is further configured for receiving a channel organization request, the channel organization request associated with at least one selected group-based communication channel and a selected organized channel set of the identified at least one organized channel set; and causing updated rendering of a selected organized channel set interface element associated with the selected organized channel set to include the at least one selected group-based communication channel. Additionally or alternatively, in some such example embodiments of the computer program product, receiving the channel organization request comprises receiving user interaction data representing a drag-and-drop action from the at least one selected group-based communication channel to the selected organized channel set interface element associated with the selected organized channel set. Additionally or alternatively, in other such example embodiments of the computer program product, receiving the channel organization request comprises receiving first user interaction data indicating activation of an channel organization mode; causing rendering of the sidebar interface of the group-based communication interface comprising at least a selection interface element associated with each group-based communication channel accessible to the authenticated user account and a selection submission interface element, wherein each selection interface element is configured to receive user interaction indicating selection of the corresponding group-based communication channel for associating with an organized channel set; in response to receiving user interaction with the selection interface element associated with the at least one selected group-based communication channel, receiving channel selection data for at least the at least one selected group-based communication channel; and in response to receiving user interaction with the selection submission interface element, receive the channel organization request, wherein the at least one selected group-based communication channel associated with the channel organization request is based on the channel selection data, and wherein the selected organized channel set is based on the user interaction with the selection submission interface element.

Additionally or alternatively, in other such example embodiments of the computer program product, the computer program product is further configured for storing the at least one selected group-based communication channel within the selected organized channel set. Additionally or alternatively, in other such example embodiments of the computer program product, the channel organization request comprises a plurality of channel identifiers associated with the at least one selected group-based communication interface, and the computer program product is further configured for storing the channel identifier set within the selected organized channel set.

Additionally or alternatively, in some example embodiments of the computer program product, the computer program product is further configured for receiving a second channel organization request in response to receiving second user interaction data, the second channel organization request associated with at least one second selected group-based communication channel and a second selected organized channel set of the identified at least organized channel set; and causing updated rendering of a second organized channel set interface element associated with the second selected organized channel set to include the at least one second selected group-based communication channel.

Additionally or alternatively, in some example embodiments of the computer program product, the computer program product is further configured for receiving an organized channel set creation request associated with the authenticated user account, wherein the organized channel set creation request comprises organized channel set title data; generating a new organized channel set based on the organized set creation request, the new organized channel set comprising at least a new organized channel set identifier; and storing the new organized channel set associated with the authenticated user account. Additionally or alternatively, in some such example embodiments of the computer program product, the organized channel set creation request further comprises organized channel set image data, and the computer program product is further configured for causing updated rendering of the group-based communication interface to include a new organized channel set interface element based configured based on at least the organized channel set image data.

Additionally or alternatively, in some example embodiments of the computer program product, the organized channel set interface element set comprises a selected organized channel set interface element, the selected organized channel set interface element comprising at least a selected group-based communication channel of a plurality of associated group-based communication channels, the selected organized channel set is associated with a channel order, and the computer program product is further configured for receiving channel reordering interaction data in response to user interaction with the selected group-based communication channel associated with the selected organized channel set interface element; generating an updated channel order based on the channel order and the channel reordering interaction data; and causing updated rendering of the group-based communication interface comprising the selected organized channel set interface element rendered based on the updated channel order.

Additionally or alternatively, in some example embodiments of the computer program product, the organized channel set interface element set comprises a selected organized channel set interface element associated with a selected organized channel set, and the computer program product is further configured for receiving a settings configuration request associated with the selected organized channel set in response to user interaction with the selected organized channel set interface element; and configuring at least one group-based communication channel setting for each group-based communication channels in a group-based communication channel set associated with the selected organized channel set, wherein the at least one group-based communication channel setting is configured based on the settings configuration request.

Additionally or alternatively, in some example embodiments of the computer program product, the organized channel set interface element set comprises a selected organized channel set interface element, the at least one organized channel set is associated with an organized channel set order, and the computer program product is further configured for receiving organized channel set reordering interaction data in response to user interaction with the selected organized channel set interface element; generating an updated organized channel set order based on the organized channel set order and the organized channel set reordering interaction data; and causing updated rendering of the sidebar interface comprising at least the selected organized channel set interface element rendered based on the updated organized channel set order.

In yet another aspect of the present disclosure, a second apparatus for group-based communication channel organization is provided. In at least one example embodiment, the second example apparatus includes at least one processor and at least one memory, the at least one memory having computer-coded instructions stored thereon. The computer coded-instructions, in execution with the at least one processor, configure the second apparatus to receive a channel organization request comprising at least a channel identifier and an organized channel set identifier, wherein the channel identifier is associated with a group-based communication channel of an accessible group-based communication channel set associated with an authenticated user account. The second apparatus is further configured to store the channel identifier associated with an organized channel set corresponding to the organized channel set identifier. The second apparatus is further configured to cause rendering of a group-based communication interface comprising a sidebar interface, wherein the sidebar interface comprises at least (1) an organized channel set interface element associated with the organized channel set, and (2) at least one other group-based communication channel separate from the organized channel set interface element, wherein the at least one other group-based communication channel is not associated with the organized channel set.

In accordance with yet another aspect of the present disclosure, a second example computer-implemented method for group-based communication channel organization is provided. The second example computer-implemented method may be performed by any hardware, software, firmware, or a combination thereof, as disclosed herein. In at least one example embodiment, the second computer-implemented method includes receiving a channel organization request comprising at least a channel identifier and an organized channel set identifier, wherein the channel identifier is associated with a group-based communication channel of an accessible group-based communication channel set associated with an authenticated user account. The second computer-implemented method further includes storing the channel identifier associated with an organized channel set corresponding to the organized channel set identifier. The second computer-implemented method further includes causing rendering of a group-based communication interface comprising a sidebar interface, wherein the sidebar interface comprises at least (1) an organized channel set interface element associated with the organized channel set, and (2) at least one other group-based communication channel separate from the organized channel set interface element, wherein the at least one other group-based communication channel is not associated with the organized channel set.

In accordance with yet another aspect of the present disclosure, a second example computer program product for group-based communication channel organization is provided. In at least one example embodiment, the second computer program product includes at least one non-transitory computer-readable storage medium having computer program instructions thereon. The computer program instructions are, in execution with a processor, configured for receiving a channel organization request comprising at least a channel identifier and an organized channel set identifier, wherein the channel identifier is associated with a group-based communication channel of an accessible group-based communication channel set associated with an authenticated user account. The second computer program product is further configured for storing the channel identifier associated with an organized channel set corresponding to the organized channel set identifier. The second computer program product is further configured for causing rendering of a group-based communication interface comprising a sidebar interface, wherein the sidebar interface comprises at least (1) an organized channel set interface element associated with the organized channel set, and (2) at least one other group-based communication channel separate from the organized channel set interface element, wherein the at least one other group-based communication channel is not associated with the organized channel set.

In yet another aspect of the present disclosure, a third example apparatus for group-based communication channel organization is provided. In at least one example embodiment, the third example apparatus includes at least one processor and at least one memory, the at least one memory having computer-coded instructions stored thereon. The computer coded-instructions, in execution with the at least one processor, configure the third apparatus to receive user interaction data indicating a user request to associate a selected group-based communication channel with an organized channel set. The third apparatus is further configured to parse the user interaction data to identify a channel identifier associated with the selected group-based communication channel and an organized channel set identifier associated with the organized channel set. The third apparatus is further configured to generate an channel organization request based on the channel identifier and the organized channel set identifier, the channel organization request configured to cause the selected group-based communication channel to be associated with the organized channel set. The third apparatus is further configured to transmit the channel organization request to a group-based communication system. The third apparatus is further configured to render a group-based communication interface comprising a sidebar interface, wherein the sidebar interface comprises at least (1) an organized channel set interface element associated with the organized channel set, the organized channel set interface element comprising at least the selected group-based communication channel, and (2) at least one other group-based communication channel separate from the organized channel set interface element, wherein the at least one other group-based communication channel is not associated with the organized channel set.

In accordance with yet another aspect of the present disclosure, a third example computer-implemented method for group-based communication channel organization is provided. The third example computer-implemented method may be performed by any hardware, software, firmware, or a combination thereof, as disclosed herein. In at least one example embodiment, the third computer-implemented method includes receiving user interaction data indicating a user request to associate a selected group-based communication channel with an organized channel set. The third computer-implemented method further includes parsing the user interaction data to identify a channel identifier associated with the selected group-based communication channel and an organized channel set identifier associated with the organized channel set. The third computer-implemented method further includes generating an channel organization request based on the channel identifier and the organized channel set identifier, the channel organization request configured to cause the selected group-based communication channel to be associated with the organized channel set. The third computer-implemented method further includes transmitting the channel organization request to a group-based communication system. The third computer-implemented method further includes rendering a group-based communication interface comprising a sidebar interface, wherein the sidebar interface comprises at least (1) an organized channel set interface element associated with the organized channel set, the organized channel set interface element comprising at least the selected group-based communication channel, and (2) at least one other group-based communication channel separate from the organized channel set interface element, wherein the at least one other group-based communication channel is not associated with the organized channel set.

In accordance with yet another aspect of the present disclosure, a third example computer program product for group-based communication channel organization is provided. In at least one example embodiment, the third computer program product includes at least one non-transitory computer-readable storage medium having computer program instructions thereon. The computer program instructions are, in execution with a processor, configured for receiving user interaction data indicating a user request to associate a selected group-based communication channel with an organized channel set. The third computer program product is further configured for parsing the user interaction data to identify a channel identifier associated with the selected group-based communication channel and an organized channel set identifier associated with the organized channel set. The third computer program product is further configured for generating an channel organization request based on the channel identifier and the organized channel set identifier, the channel organization request configured to cause the selected group-based communication channel to be associated with the organized channel set. The third computer program product is further configured for transmitting the channel organization request to a group-based communication system. The third computer program product is further configured for rendering a group-based communication interface comprising a sidebar interface, wherein the sidebar interface comprises at least (1) an organized channel set interface element associated with the organized channel set, the organized channel set interface element comprising at least the selected group-based communication channel, and (2) at least one other group-based communication channel separate from the organized channel set interface element, wherein the at least one other group-based communication channel is not associated with the organized channel set.

BRIEF DESCRIPTION OF THE DRAWINGS

Figure 1:
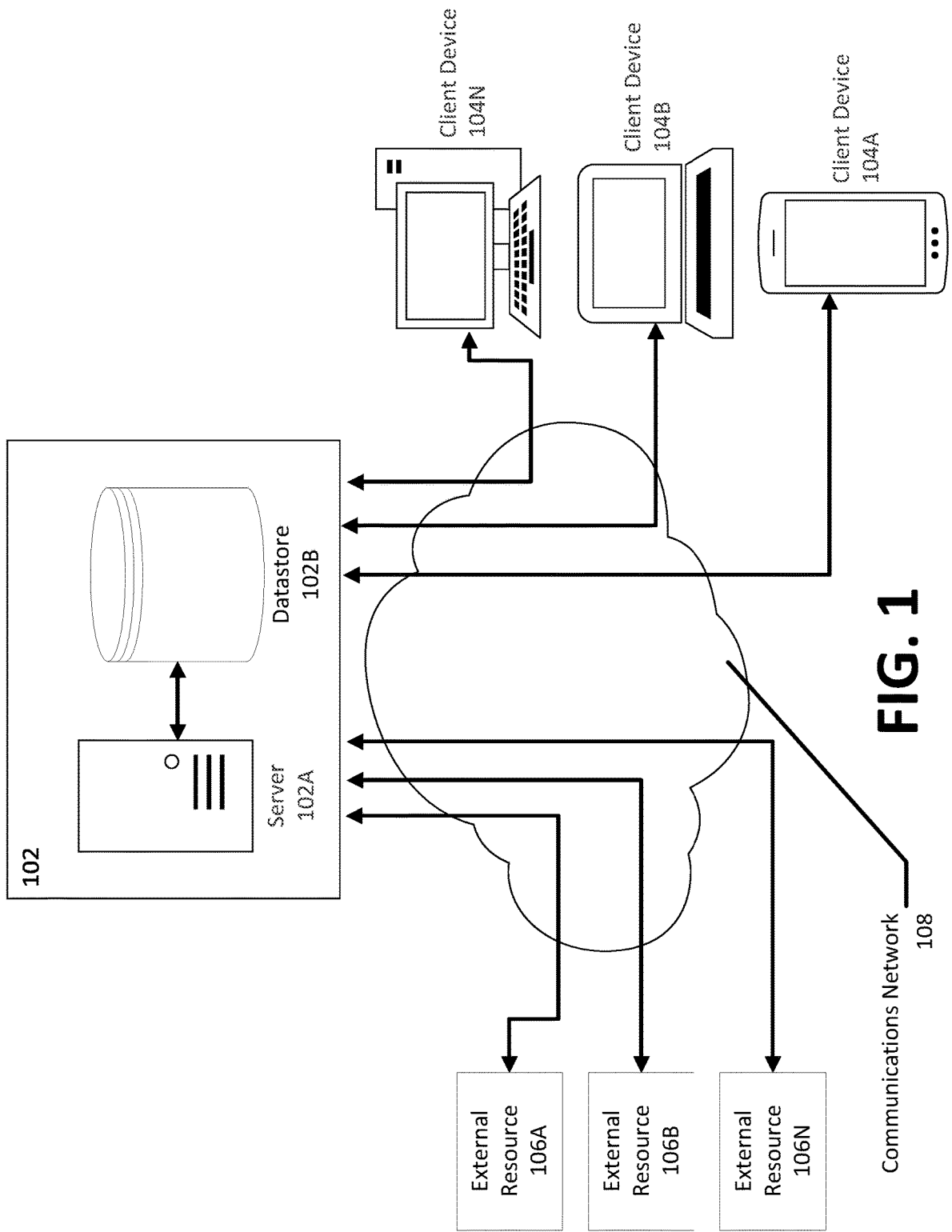
Figure 2:
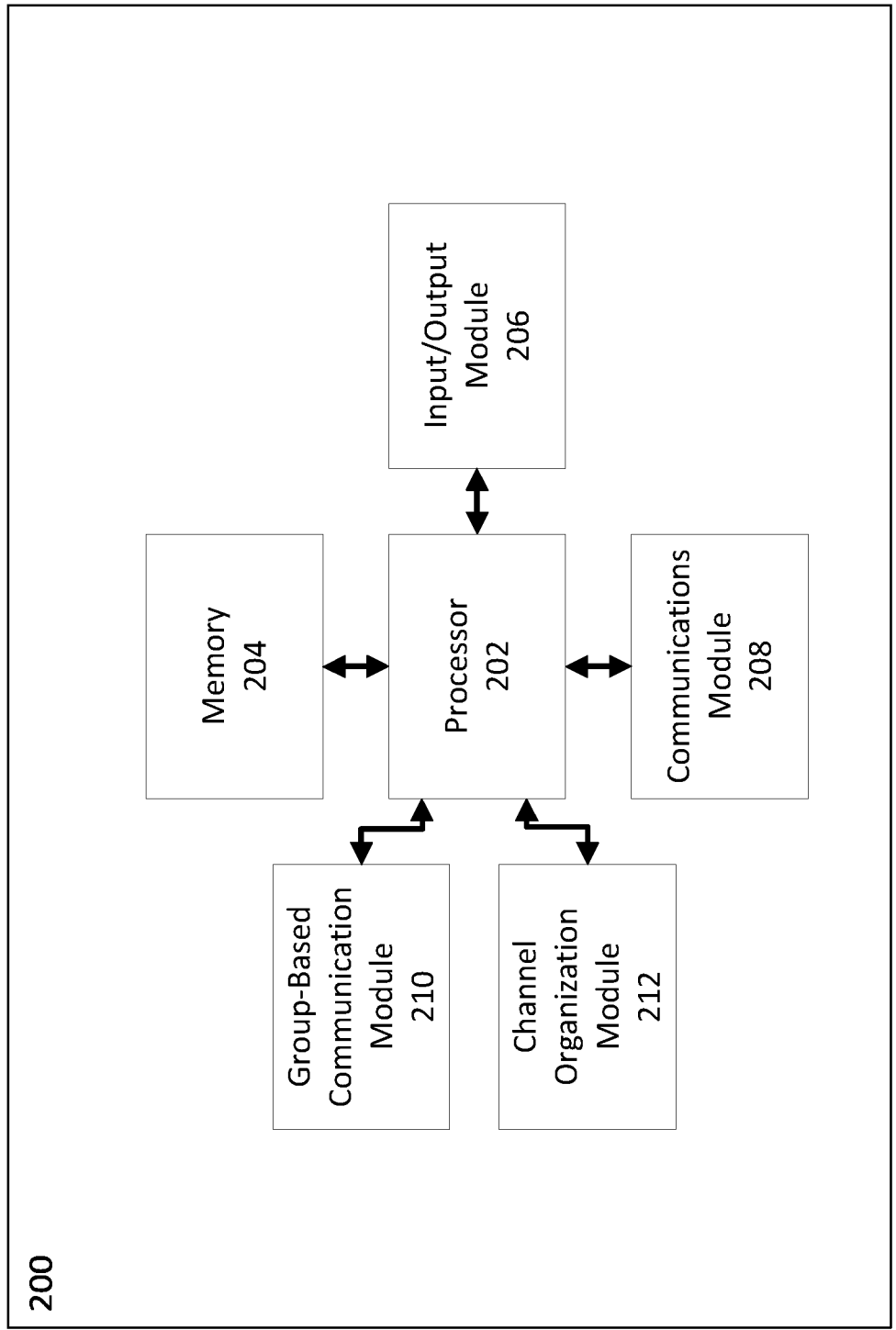
Figure 3:
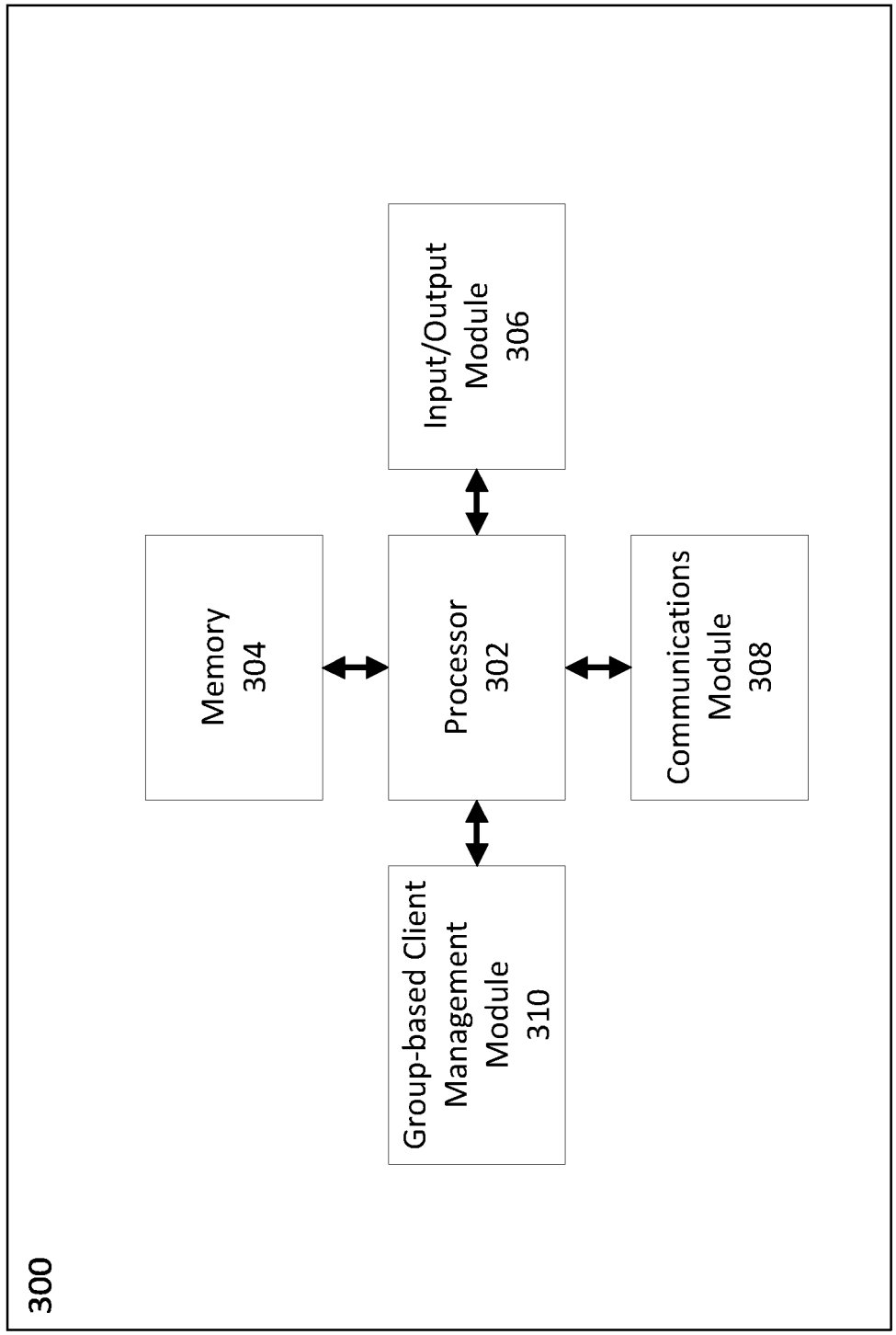
Figure 4:
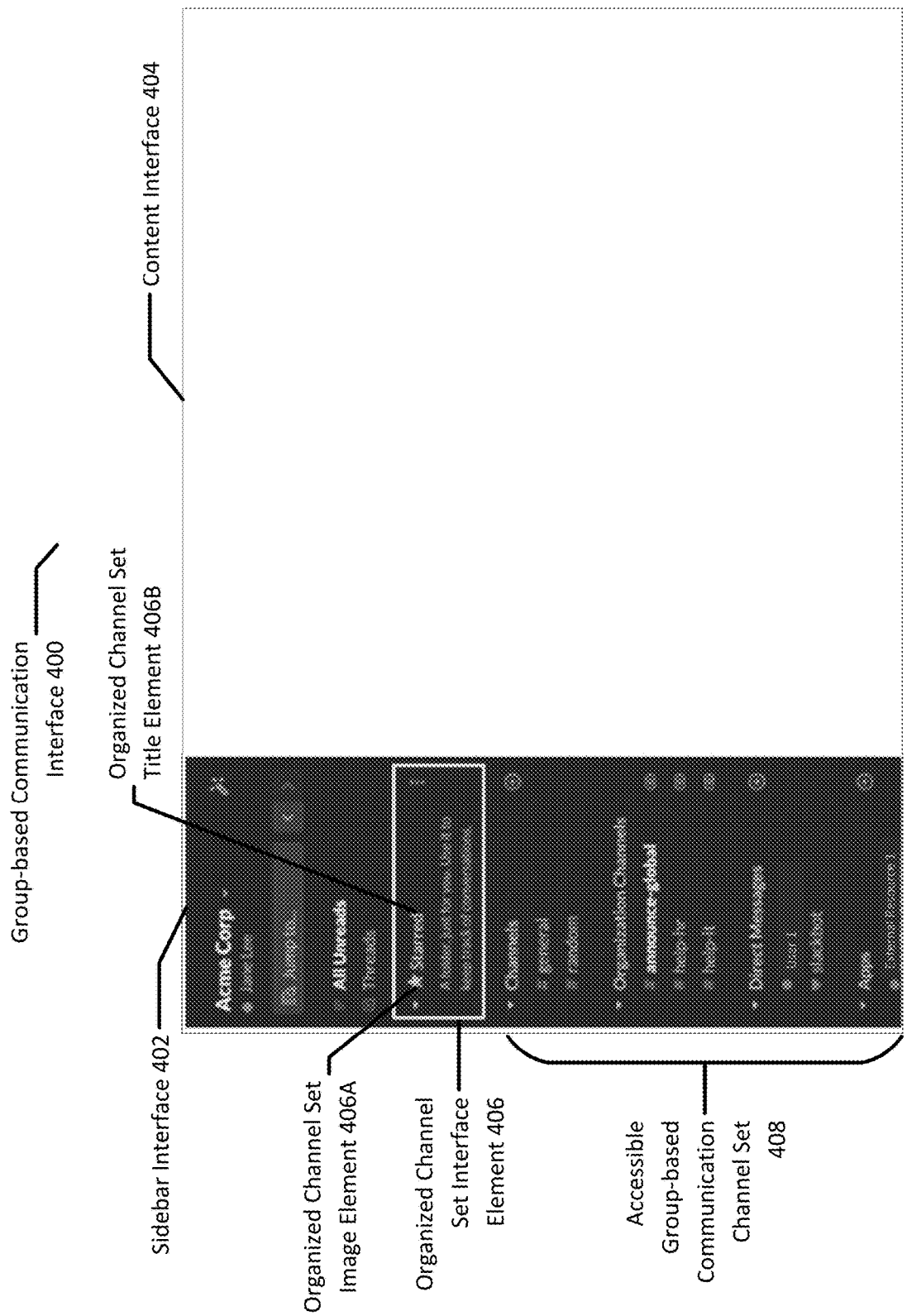
Figure 5:
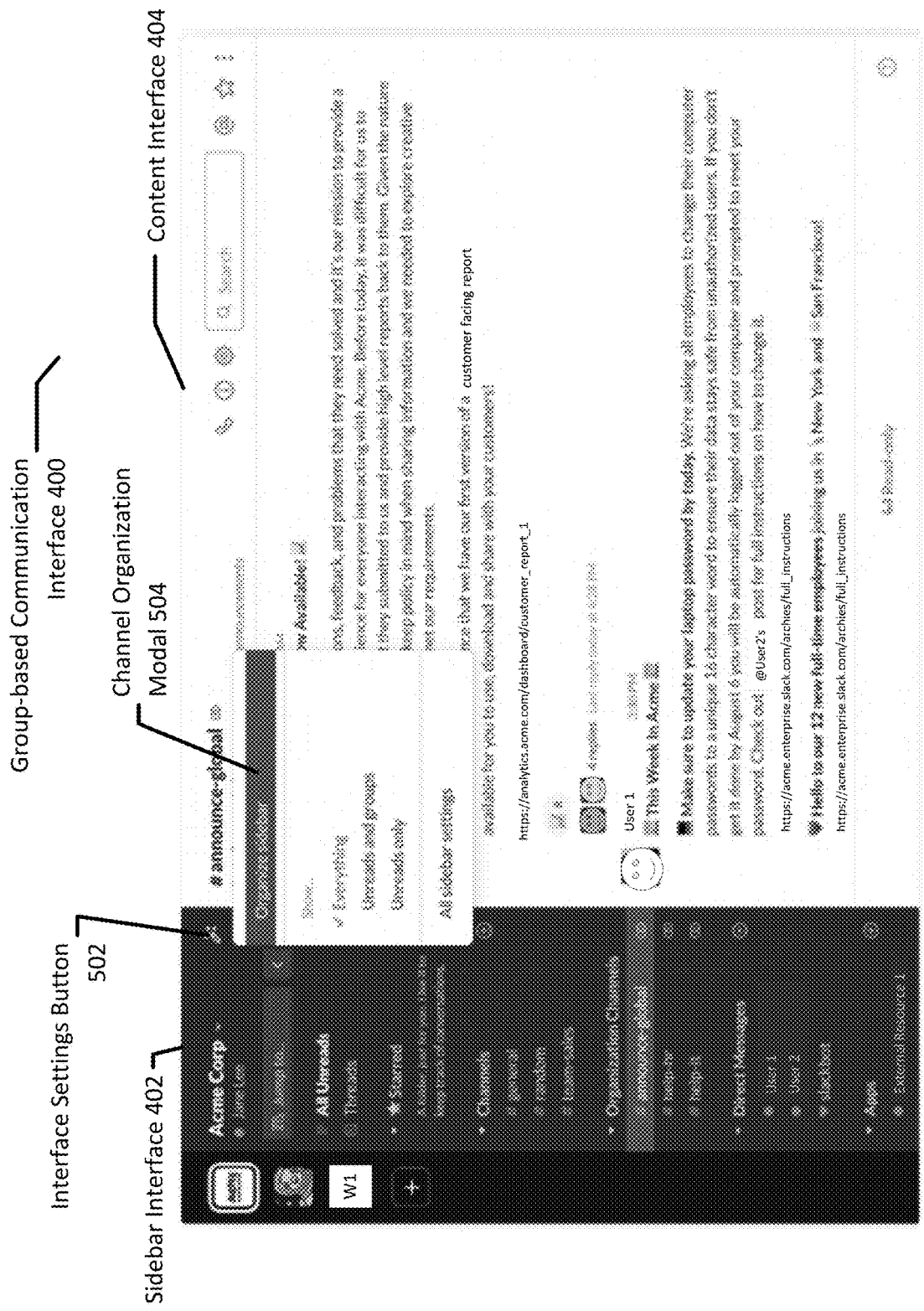
Figure 6A:
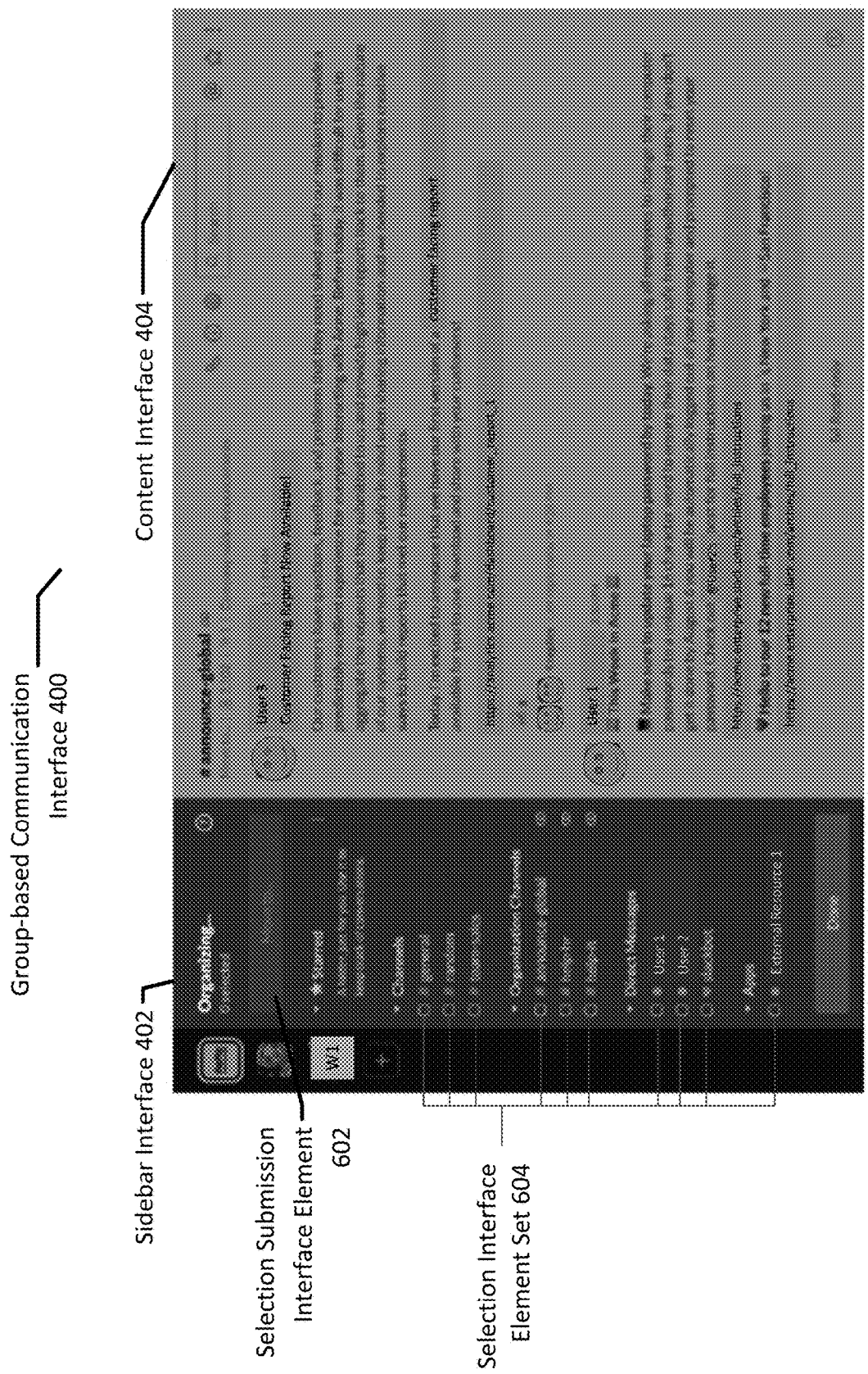
Figure 6B:
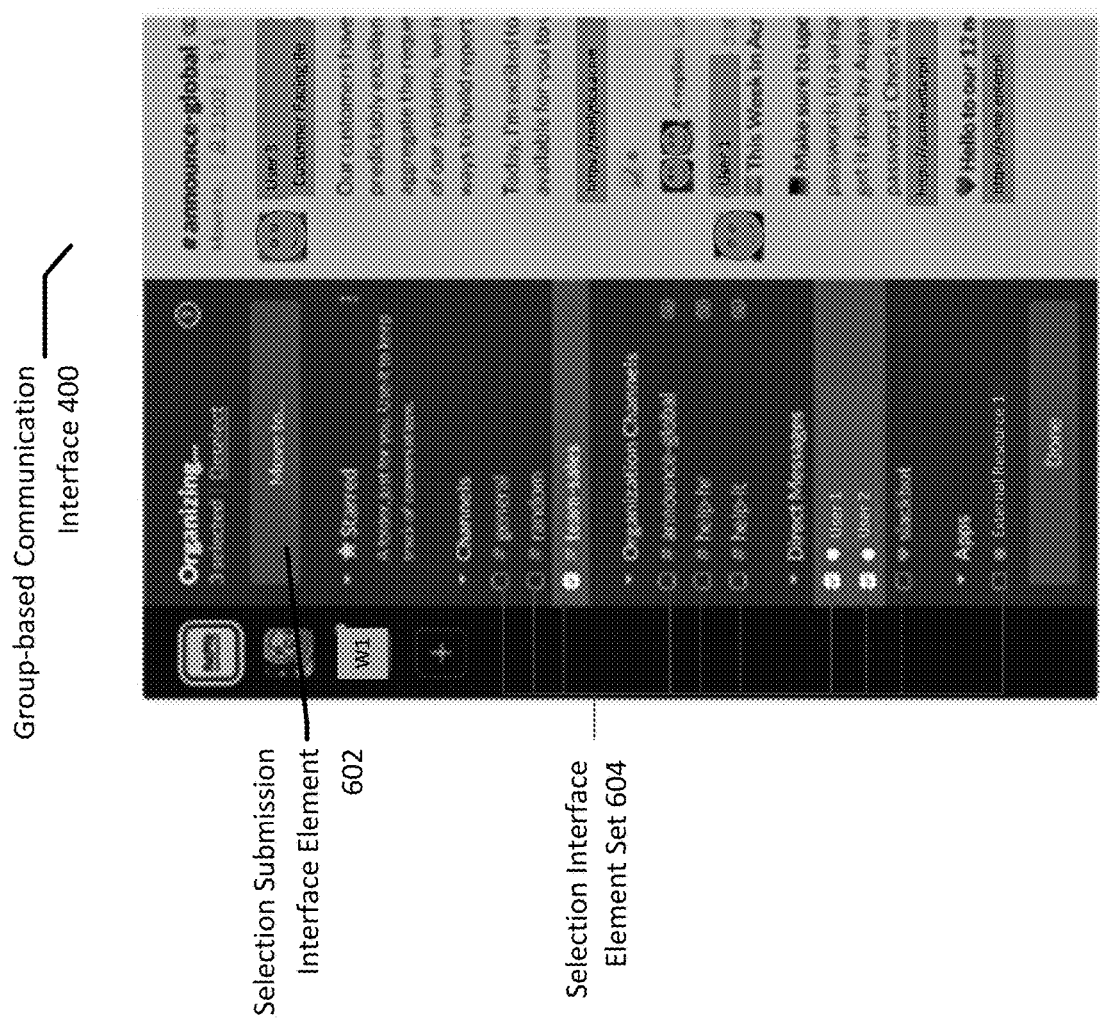
Figure 6C:
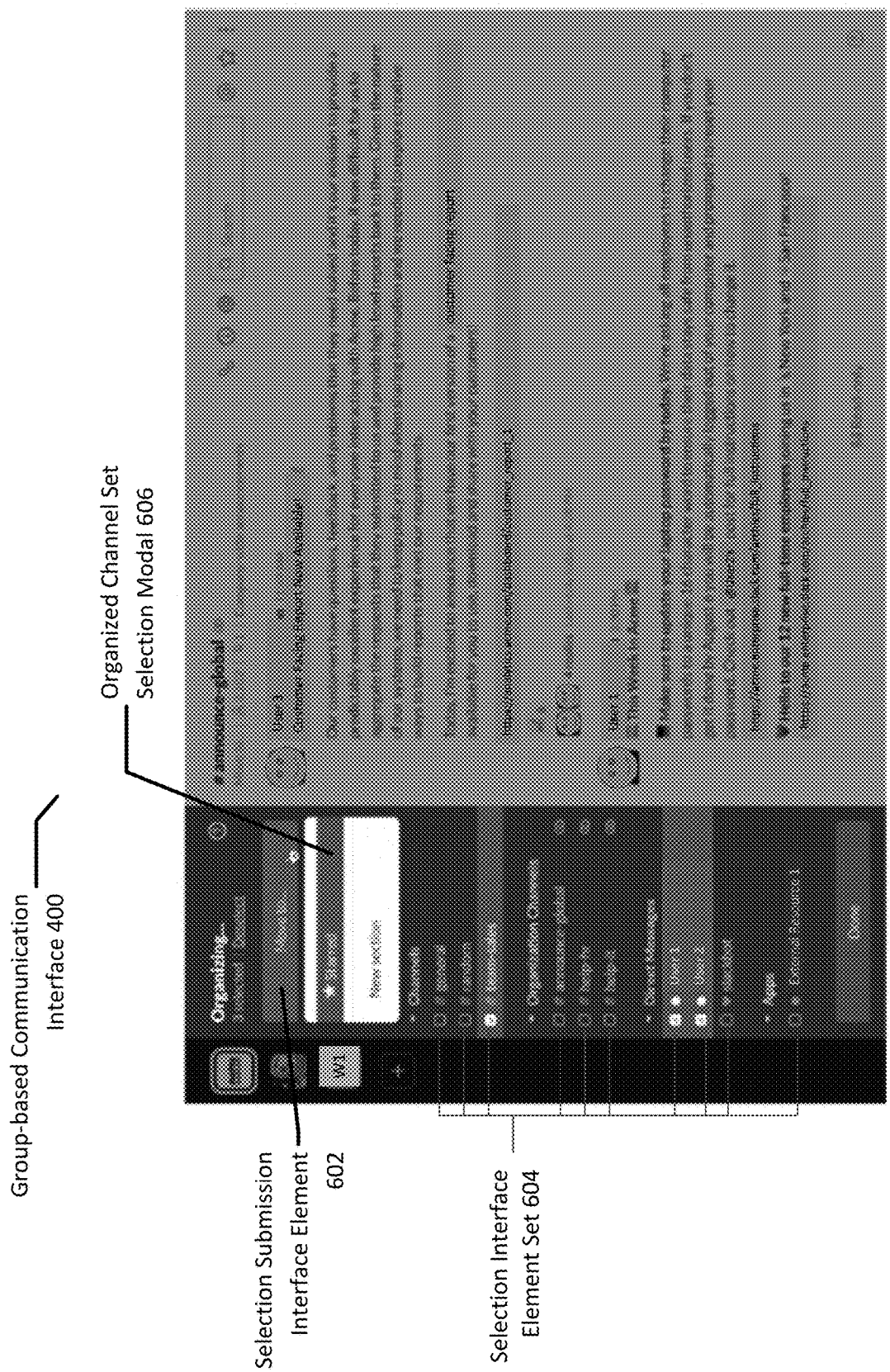
Figure 7A:
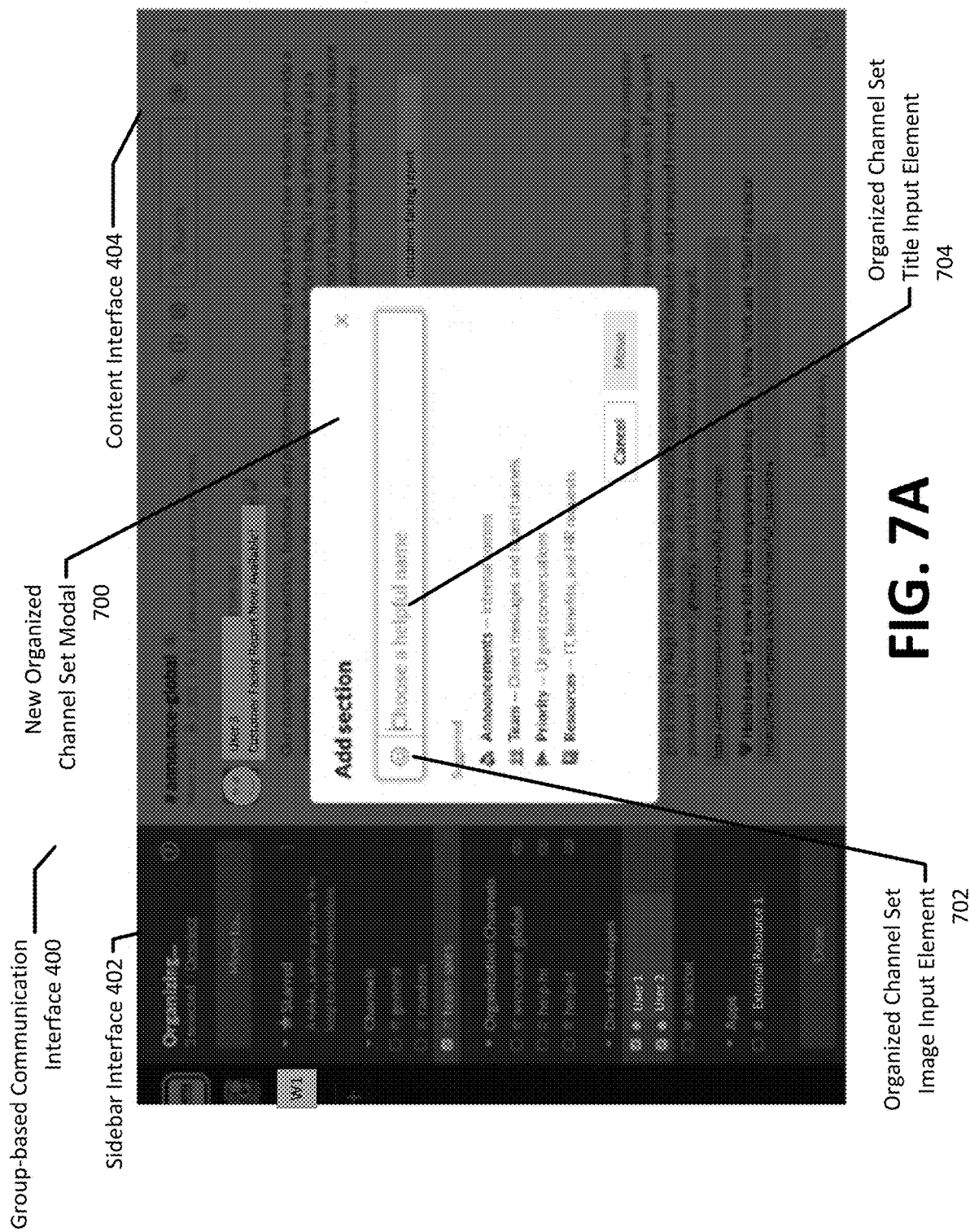
Figure 7B:
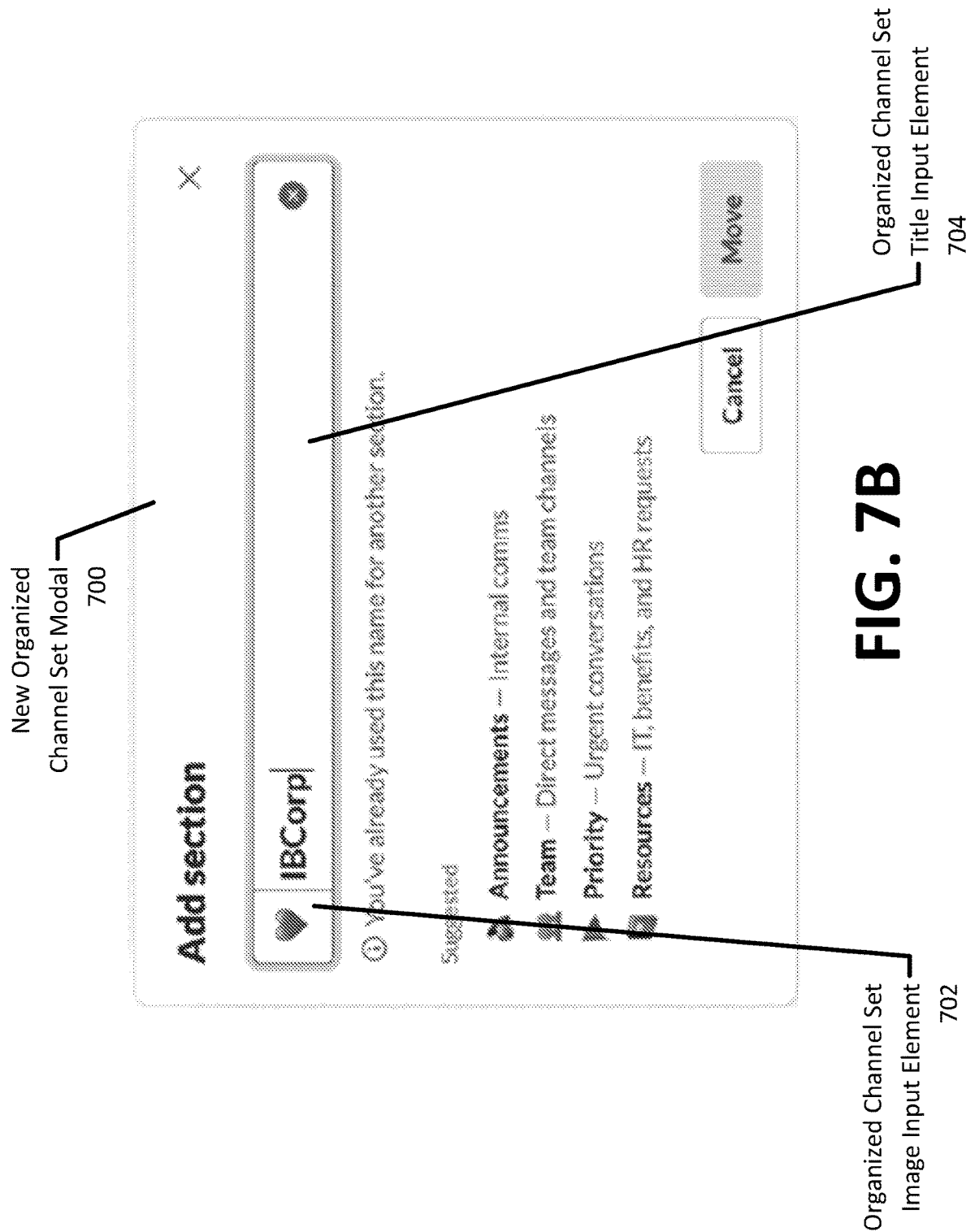
Figure 8:
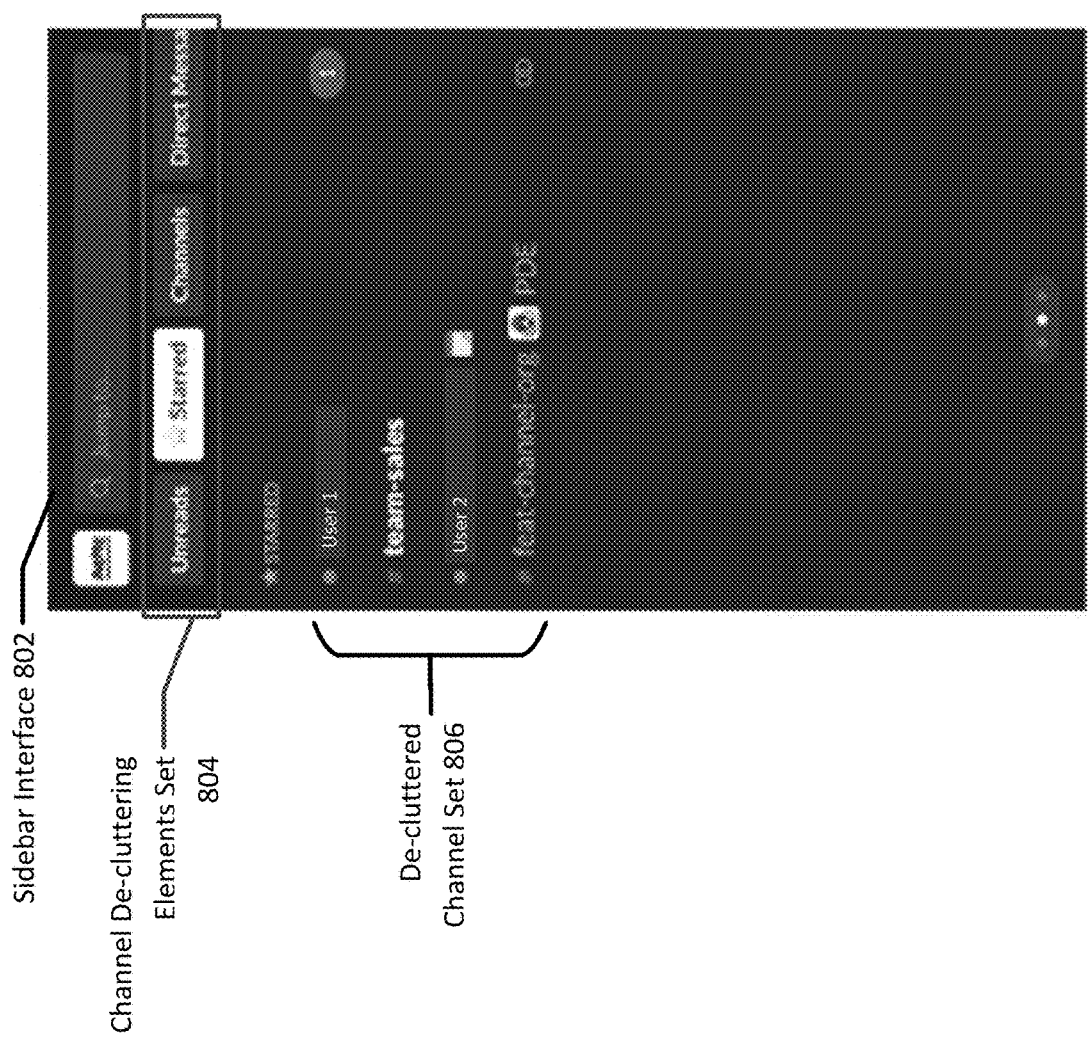
Figure 9:
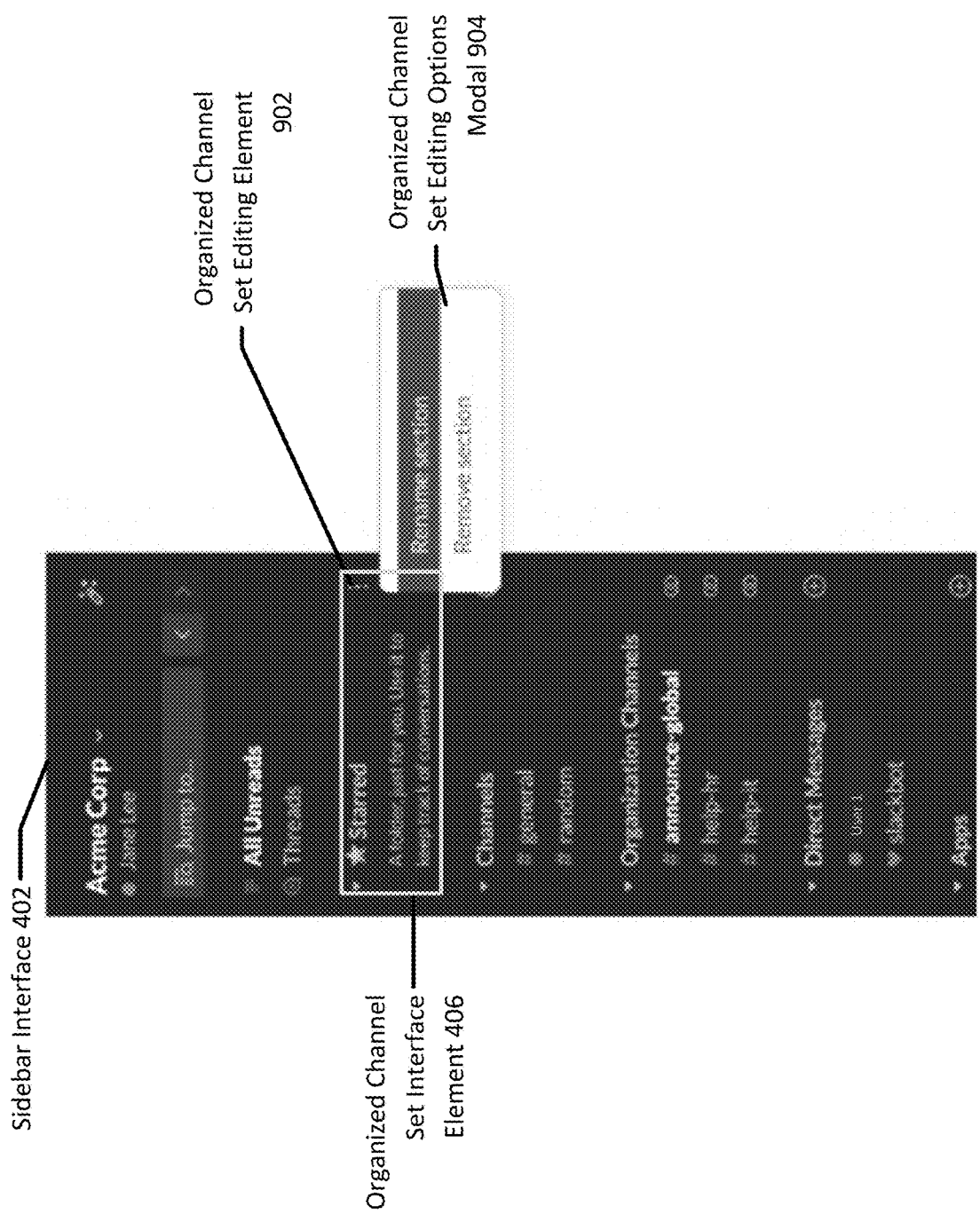
Figure 10:
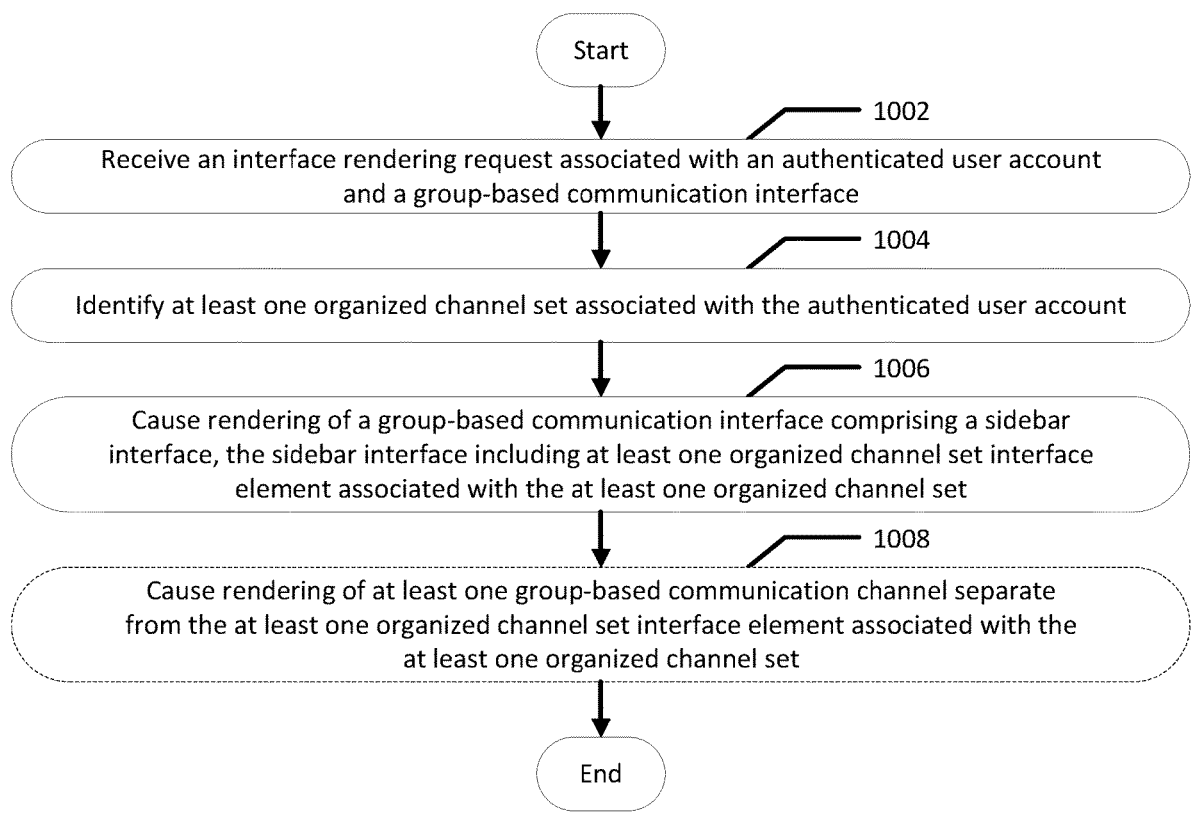
Figure 11A:
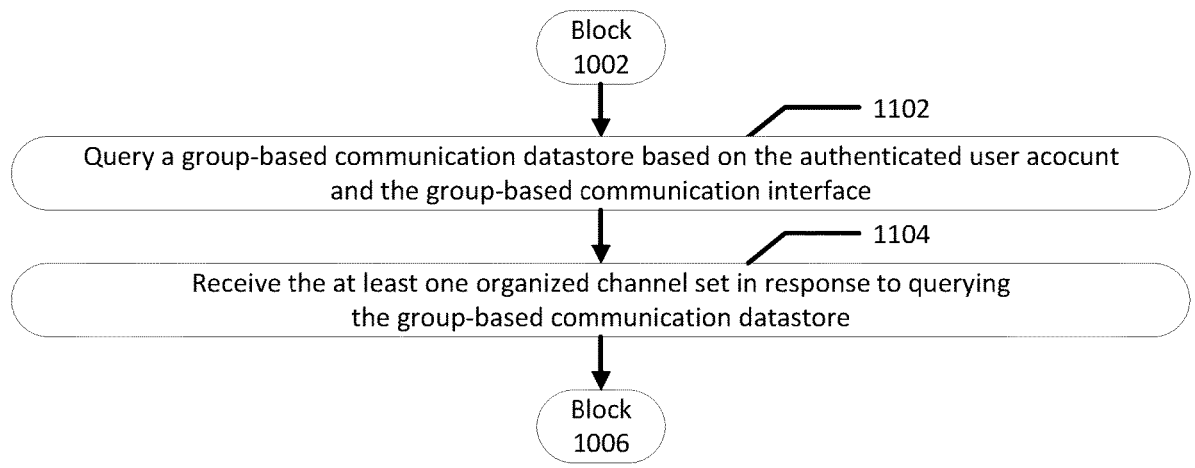
Figure 11B:
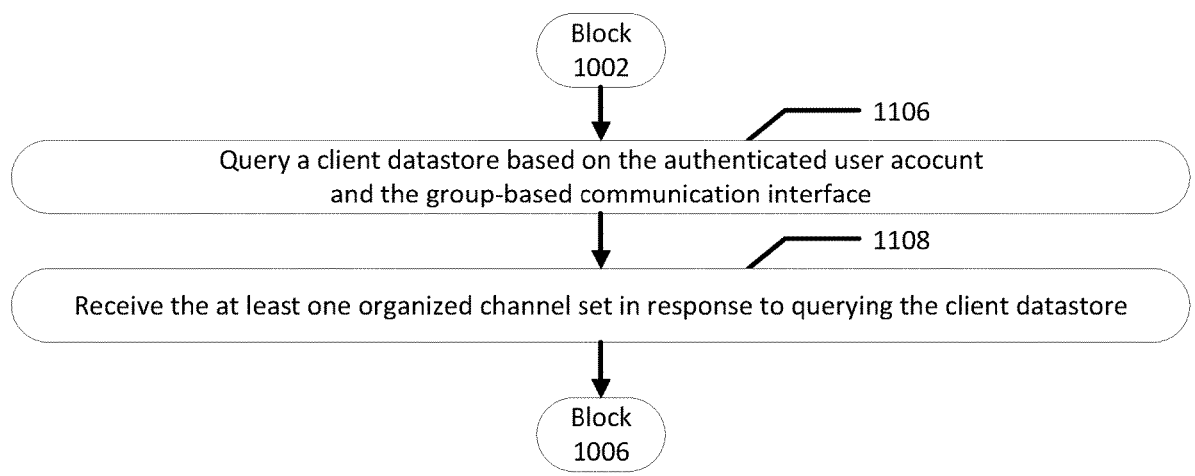
Figure 12:
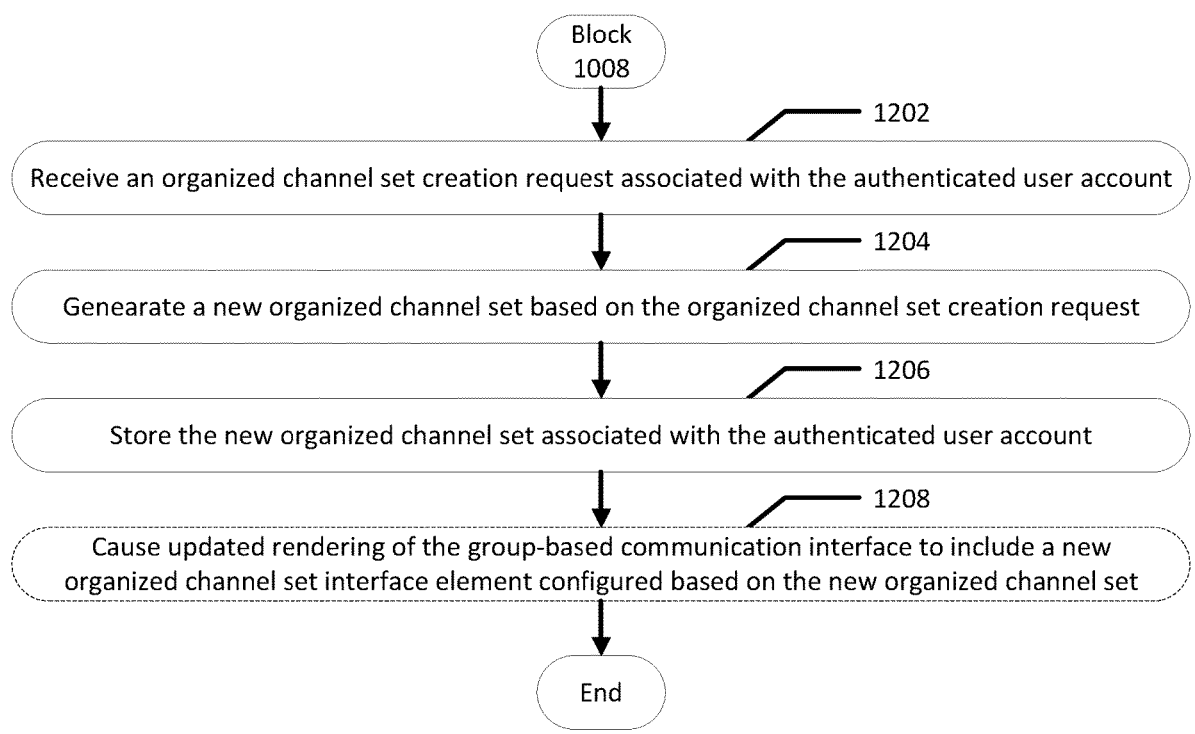
Figure 13:
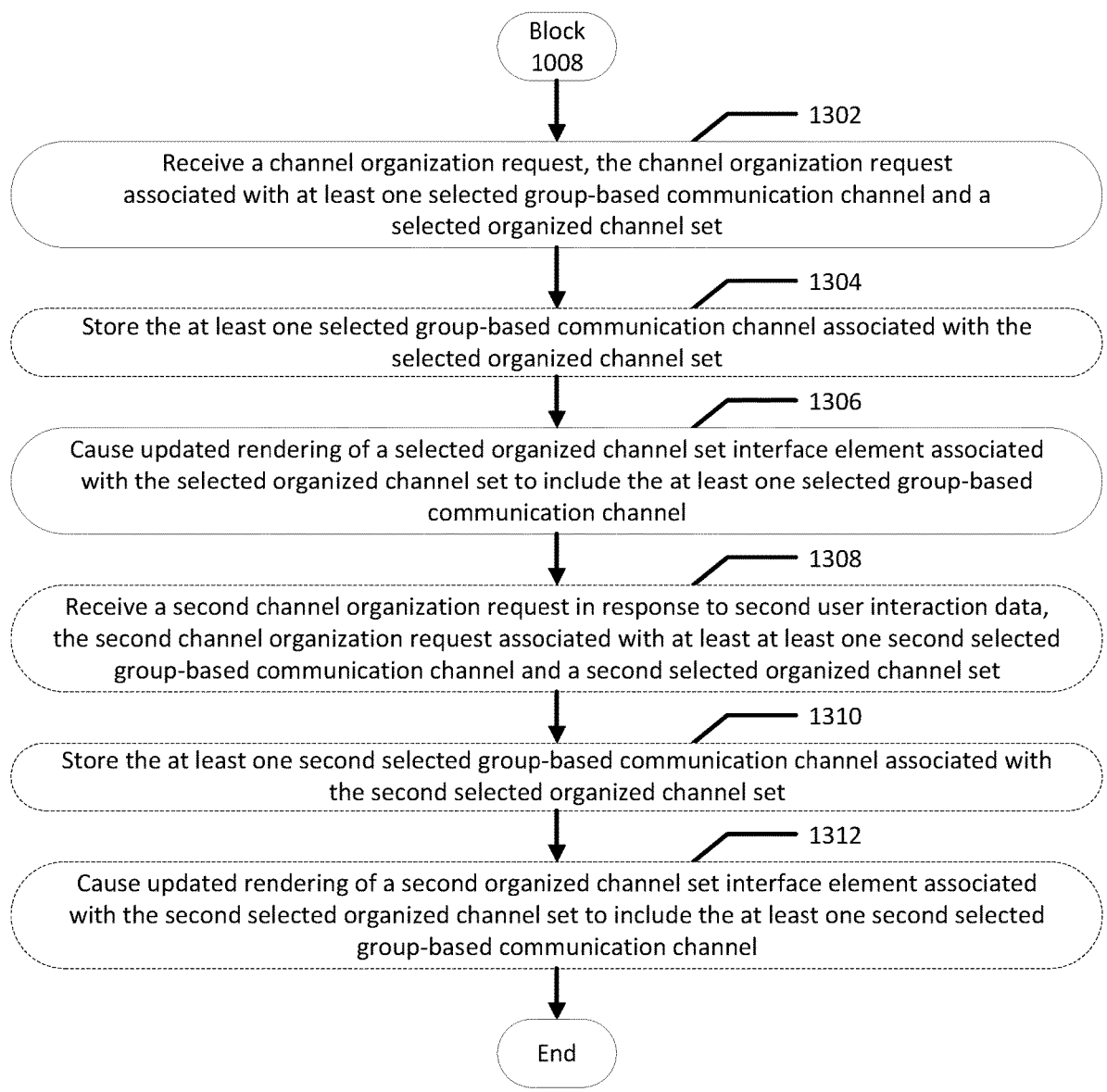
Figure 14:
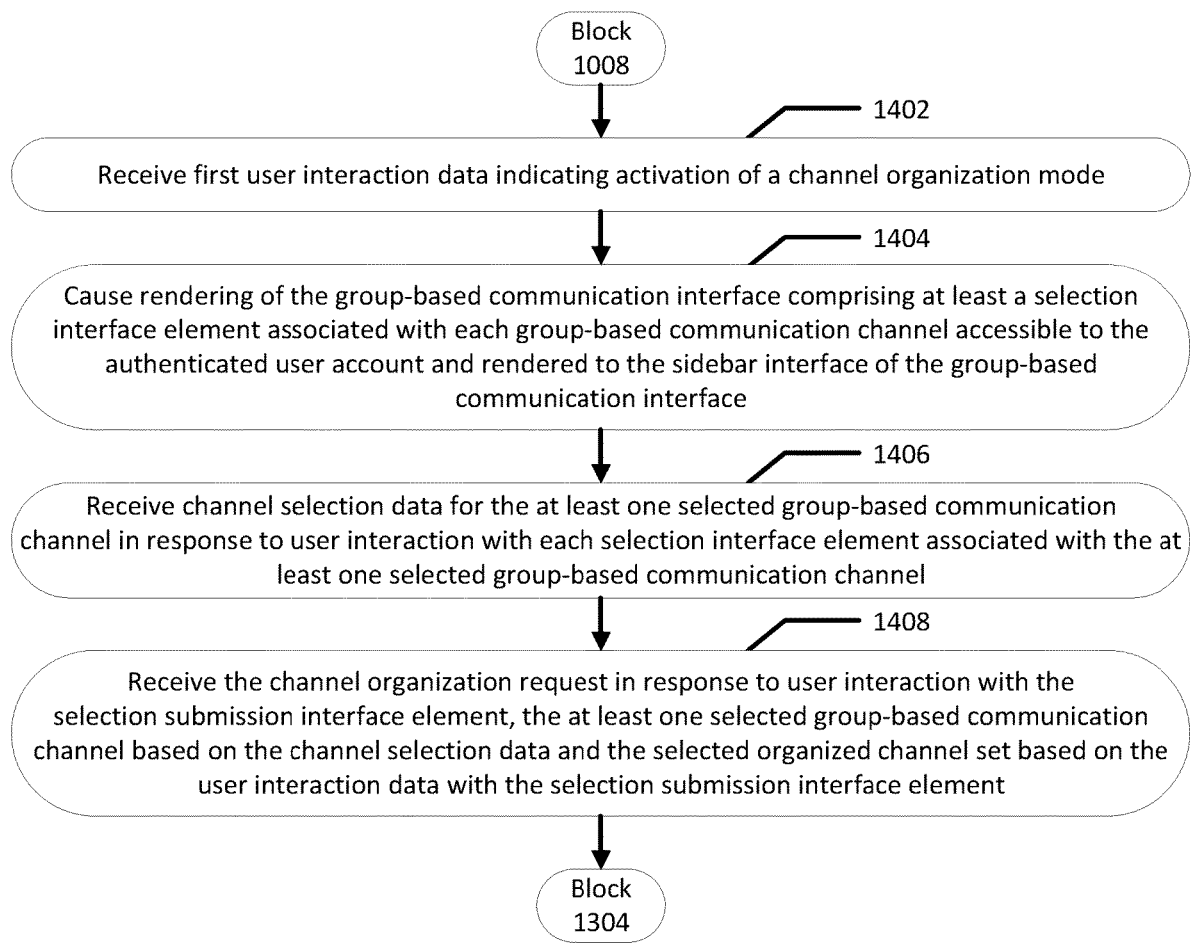
Figure 15:
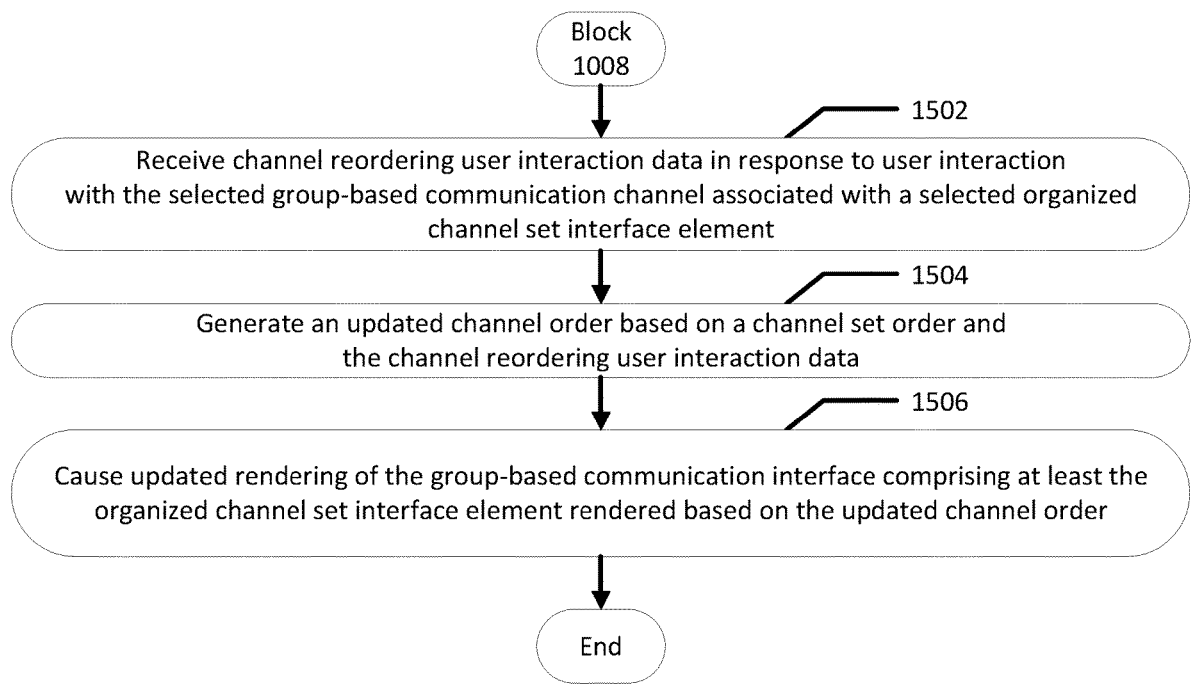
Figure 16:
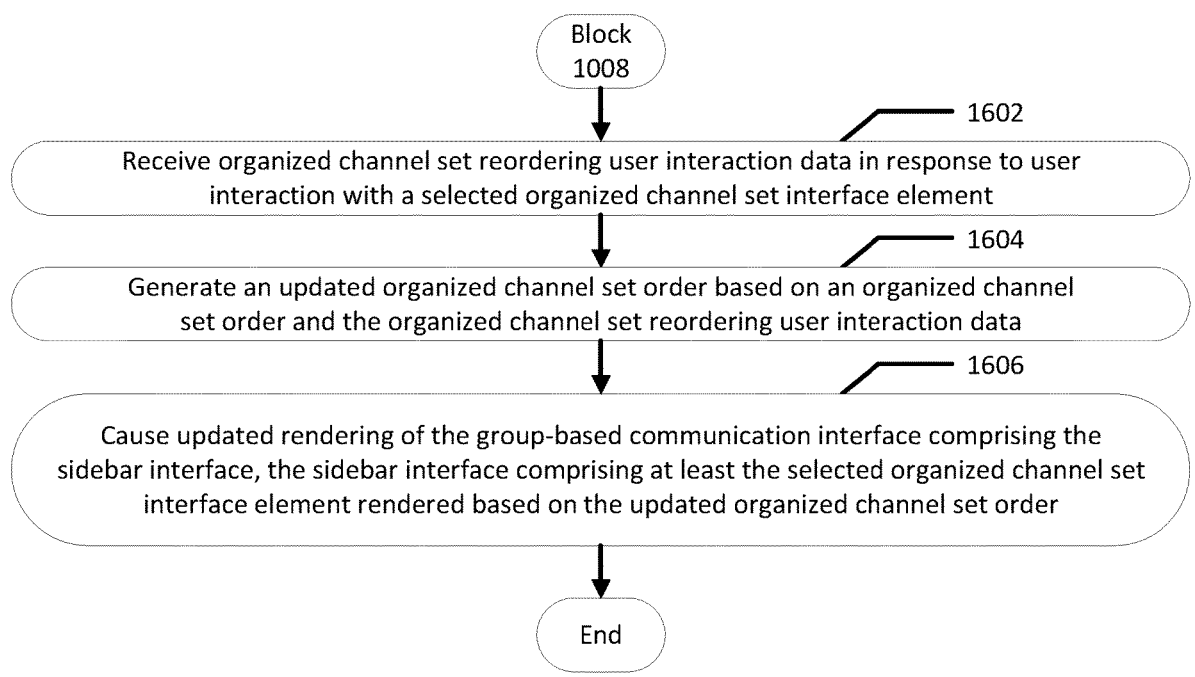
Figure 17:
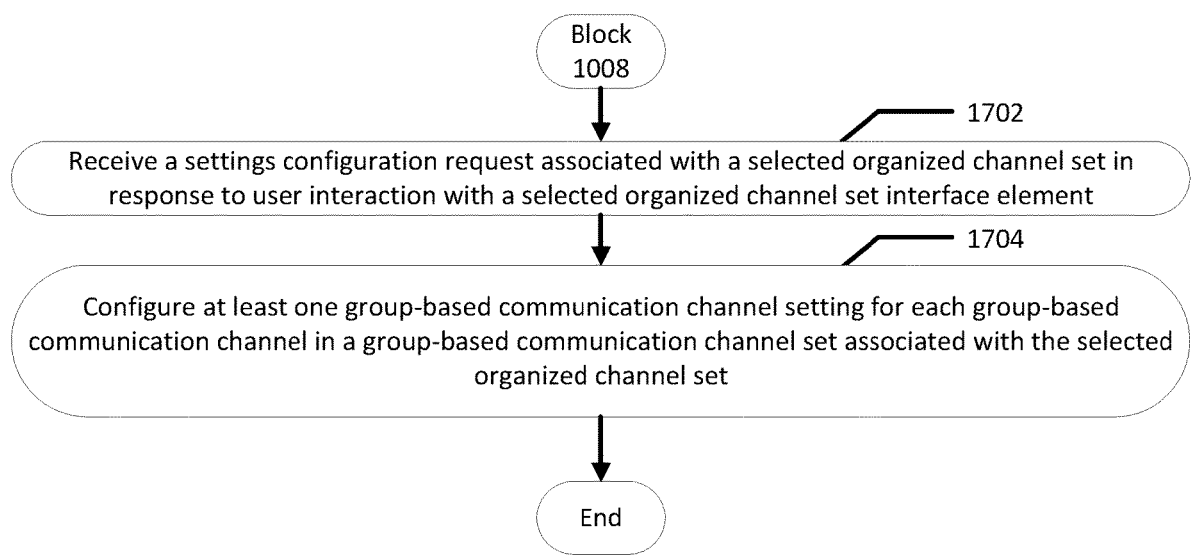

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example apparatus that may be specially configured in accordance with an example embodiment of the present disclosure;

FIG. 3 illustrates an example group-based communication interface for group-based communication channel organization in accordance with at least an example embodiment of the present disclosure;

FIG. 4 illustrates another example group-based communication interface for group-based communication channel organization in accordance with at least an example embodiment of the present disclosure;

FIG. 5 illustrates another example group-based communication interface for group-based communication channel organization in accordance with at least an example embodiment of the present disclosure;

FIG. 6A illustrates another example group-based communication interface for group-based communication channel organization in accordance with at least an example embodiment of the present disclosure;

FIG. 6B illustrates another example group-based communication interface for group-based communication channel organization in accordance with at least an example embodiment of the present disclosure;

FIG. 6C illustrates another example group-based communication interface for group-based communication channel organization in accordance with at least an example embodiment of the present disclosure;

FIG. 7A illustrates another example group-based communication interface for group-based communication channel organization in accordance with at least an example embodiment of the present disclosure;

FIG. 7B illustrates another example group-based communication interface for group-based communication channel organization in accordance with at least an example embodiment of the present disclosure;

FIG. 8 illustrates another example group-based communication interface for group-based communication channel organization in accordance with at least an example embodiment of the present disclosure;

FIG. 9 illustrates another example group-based communication interface for group-based communication channel organization in accordance with at least an example embodiment of the present disclosure;

FIG. 10 illustrates an example flowchart including operations for group-based communication channel organized to be performed in accordance with at least one example embodiment of the present disclosure;

FIG. 11A illustrates an example flowchart including additional operations for group-based communication channel organization to be performed in accordance with at least one example embodiment of the present disclosure;

FIG. 11B illustrates another example flowchart including additional operations for group-based communication channel organization to be performed in accordance with at least one example embodiment of the present disclosure;

FIG. 12 illustrates another example flowchart including additional operations for group-based communication channel organization to be performed in accordance with at least one example embodiment of the present disclosure;

FIG. 13 illustrates another example flowchart including additional operations for group-based communication channel organization to be performed in accordance with at least one example embodiment of the present disclosure;

FIG. 14 illustrates another example flowchart including additional operations for group-based communication channel organization to be performed in accordance with at least one example embodiment of the present disclosure;

FIG. 15 illustrates another example flowchart including additional operations for group-based communication channel organization to be performed in accordance with at least one example embodiment of the present disclosure;

FIG. 16 illustrates another example flowchart including additional operations for group-based communication channel organization to be performed in accordance with at least one example embodiment of the present disclosure; and FIG. 17 illustrates yet another example flowchart including additional operations for group-based communication channel organization to be performed in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

A group-based communication system is configured to provide inter-user communication in a particularized organizational format. In this regard, for example, users each are associated with a user account registered to the group-based communication system (e.g., accessible via authentication credentials such as a combination of username and password). Each user account may be provisioned to access one or more group-based communication workspaces and/or associated group-based communication channels. The group-based communication channels accessible to a particular authenticated user account may include any number of public group-based communication channels within a group-based communication workspace, private group-based communication channels within a group-based communication workspace, shared group-based communication channel, single-user direct group-based communication channel, multi-user direct group-based communication channel, and the like.

In an example context, a user accesses the group-based communication system via a client device to enable access to one or more group-based communication interfaces including various information and/or data linked to group-based communication workspaces and/or group-based communication channels associated with an authenticated user account. In this regard, the group-based communication interface may include a channel list of accessible group-based communication channels, for example those associated within a particular group-based communication workspace and/or direct group-based communication channels. Each group-based communication channel may include, or otherwise be linked to, one or more group-based communications transmitted within the group-based communication channel. A user may interact with the group-based communication interface to select a group-based communication channel for viewing, and/or otherwise interact with the group-based communication interface for organizing, managing, and/or otherwise utilizing functionality associated with accessible group-based communication channels.

The group-based communication interface may provide access to any of a number of accessible group-based communication channels within each workspace. For example, a group-based communication interface may include a sidebar interface including a channel list of accessible group-based communication interfaces for a particular authenticated user account. In conventional systems, the sidebar interface is often inflexible, such that accessible group-based communication channels are rendered in a manner that does not enable reorganization of the group-based communication channels within the channel list. As the number of group-based communication channels accessible to an authenticated user account increases, a user may quickly become overwhelmed and not be able to effectively or quickly locate and/or access the group-based communication channels they desire.

Embodiments of the present disclosure enable group-based communication channel organization, for example within a group-based communication interface. In some such embodiments, a user associated with an authenticated user account may organize group-based communication channels into one or more organized channel set(s). An organized channel set may include any number of group-based communication channels, which the user may be organized by the user as they desire via one or more types of user interaction. In some embodiments, an organized channel set is associated with organized channel set title data and/or organized channel set image data that may be used to render a corresponding organized channel set interface element. Furthermore, in some embodiments, each organized channel set interface element is collapsible within a group-based communication interface, for example such that a user may hide the group-based communication channels therein from being rendered and cluttering the group-based communication interface. In this regard, a user may utilize one or more organized channel set(s) to organize the rendering of group-based communication channels within a group-based communication interface as they desire, and/or limit visual clutter associated with group-based communication channels not currently prioritized by the user.

Organized channel sets further enable efficient configuration of multiple group-based communication channels, including group-based communication channels having various group-based communication channel types, with a single (or minimal) required user interaction. In addition to minimizing the required user interaction, such configuration enables one or more group-based communication channels to be organized and configured similarly to meet the desires or needs of a particular user. For example, in some embodiments, an organized channel set may be configured according with particular group-based communication channel settings such that, while within the organized channel set, the group-based communication channel inherits the group-based communication channel settings of the organized channel set. Additionally or alternatively, in some embodiments, a user may interact with a rendered organized channel set interface element, which corresponds to an organized channel set, to configure particular group-based communication channel settings for all group-based communication channels linked to the organized channel set. In this regard, an organized channel set enables the user to configure multiple group-based communication channels of various group-based communication channel types with a single interaction instead of performing the configuration interactions for each group-based communication channel or group-based communication channel type individually.

In a given group-based communication interface, an authenticated user account may be associated with any number of organized channel sets, for example such that the user may organize accessible group-based communication channels into various organized channel sets as the user desires. Various embodiments further enable a user associated with an authenticated user account to freely create any number of organized channel set(s), and/or delete such organized channel set(s). In some such embodiments, created organized channel set(s) are each associated with unique organized channel set title data, such that corresponding organized channel set interface elements are readily distinguishable between one another and enable the user to organize group-based communication channels into desired and/or logical groupings (e.g., by intended subject matter, users permissioned to access the group-based communication channels, or the like).

Additionally or alternatively, in some embodiments, organized channel set(s) are further customizable based on a user desired order of such interface elements. For example, group-based communication channels within each organized channel set may be organized based on an order specified by the user. In this regard, within each organized channel set interface element, the group-based communication channels may be rendered in a desired order. Additionally or alternatively still, organized channel set(s) may be rendered in an order within a group-based communication interface or sub-component thereof. In this regard, the group-based communication interface is further customizable to enable rendering of organized channel set interface elements in an order set by the user. By enabling organization the group-based communication interface in this manner, embodiments further enable rendering of specific user interfaces particularly laid out for efficient use as preferred by a particular user.

Organized channel sets further enable technological advantages with respect to a group-based communication system and specially configured client device. For example, a group-based communication interface may be organized and/or de-cluttered based on organized channel set(s) to limit the number of group-based communication channels and/or corresponding information (e.g., notifications, badges, or the like) that must be transmitted to a client device and rendered by the client device. Further, processing resources are saved by enabling rendering of particularized group-based communication interfaces based on user preference. Such technological advantages are provided in addition to the multitude of user interaction and user experience based improvements described above with respect to rendering particularized group-based communication interfaces for limiting information overload and enabling efficient usability.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "identifier" refers to electronically managed information that is uniquely correlated with (i.e., identifies) a particular data object, set of data, or information. In some embodiments, an identifier includes one or more of a binary data value, a numerical data value, ASCII text, text encoded via another encoding schema, a pointer, a memory address, or a combination thereof.

The term "client device" refers to one or more computer hardware devices for accessing functionality facilitated by a group-based communication system, an external resource, and/or one or more software applications executable via the client device. In some embodiments, a user interacts with a client device to access functionality provided by a group-based communication system using an authenticated user account. Non-limiting examples of a client device include a mobile phone, wearable, tablet, personal computer, laptop, smart device, IoT device, or the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation originated from one user who has been granted access to the group to another entity who has not been granted access to the group. Group identifiers are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface The term "external resource" refers to a software application, program, platform, or service associated with a third-party controlled system, and that is configured for authenticated communication with a group-based communication system to provide particular functionality to a client device connected the group-based communication system. An external resource provides functionality not provided natively by the group-based communication system. The external resource operates on a compiled code base or repository that is separate and distinct from that which supports the group-based communication system. In some embodiments, the external resource may communicate with the group-based communication system, and vice versa, through one or more application program interfaces (APIs). In some embodiments, the external resource receives tokens and/or other authentication credentials that are used to facilitate secure communication between the external resource and the group-based communication system, such as for navigating the network security layers or protocols (e.g., network firewall protocols) securing the group-based communication system. Additionally or alternatively, in some embodiments, a group-based communication system stores one or more authentication token(s) for accessing functionality provided by the external resource. In some embodiments, access to an external resource is managed on a workspace level. In other embodiments, access to external resource is managed on an organization level.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.). In some embodiments, a group-based communication interface comprises one or more sub-interfaces, for example a sidebar interface, content interface, and flex interface, or combination thereof (as defined below).

The term "sidebar interface" refers to a sub-interface corresponding to a defined area of a group-based communication interface to be rendered via a client device. In some embodiments, a sidebar interface includes workspace-level information and/or organization-level information associated with a particular authenticated user account. For example, in some embodiments, a sidebar interface includes one or more interface elements comprising accessible group-based communication channels associated with particular workspace or organization linked to an authenticated user account.

The term "channel content interface" refers to another sub-interface corresponding to a defined area of a group-based communication interface to be rendered via a client device. In some embodiments, a channel content interface includes group-based communication channel-level information associated with an accessed group-based communication channel. For example, in some embodiments, a group-based communication channel is accessed through interaction with a sidebar interface, and corresponding group-based communication messages and/or other content associated with the group-based communication channel is rendered via the channel content interface. In some embodiments, a group-based communication interface is rendered including only a sidebar interface and a channel content interface. In other embodiments, a group-based communication interface is rendered including one or more additional sub-interfaces The term "flex interface" refers to another sub-interface corresponding to a defined area of a group-based communication interface to be rendered via a client device. In some embodiments, a flex interface includes a variety of digital content associated with the channel content interface, such as for rendering a thread of group-based communication messages. Additionally or alternatively, in some embodiments, a flex interface is configured to provide interface elements for performing functionality associated with the channel content interface and/or group-based communication interface generally (e.g., search functionality, link preview and/or accessing functionality, and/or the like).

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel. In some embodiments, a group-based communication system is configured to manage various types of group-based communication channels, which may be identified based on a "group-based communication channel type." Non-limiting examples of group-based communication channels include a single-user direct group-based communication channel (e.g., for communications between two authenticated user accounts), a multi-user direct group-based communication channel (e.g., for communications between a plurality of authenticated user accounts), a public group-based communication channel (e.g., accessible to all authenticated user accounts within a workspace), a private group-based communication channel (e.g., accessible to invited and/or specific authenticated user accounts within a workspace), an external resource group-based communication channel (e.g., for communications from and/or to an external resource accessible within a workspace or organization), or any combination thereof.

In some embodiments, one group-based communication channel may be associated with one or more organization identifiers. A group-based communication channel associated with more than one organization identifiers is a "common group-based communication channel."

The terms "group-based communication channel identifier" and "channel identifier" refer to one or more identifiers by which a group-based communication channel may be uniquely identified by a group-based communication system. A group-based communication channel identifier associated with a common group-based communication channel is a "common group-based communication channel identifier."

The term "group-based communication channel setting" refers to one or more data management settings associated with a group-based communication channel. A group-based communication channel setting is associated with a corresponding "channel setting value" that refers to a configured data value for use associated with the group-based communication channel setting. It should be appreciated that some group-based communication channel settings are associated with a limited number of group-based communication channel setting values, for example a binary value selection (e.g., on-off for a particular setting), a predetermined value set (e.g., different notification modes), a discrete numerical value within a numerical range (e.g., 0 to 100), or any combination thereof. Non-limiting examples of group-based communication channel settings include notification settings for determining when a client device should render a notification associated with a group-based communication message or other activity occurring within a group-based communication channel, client device cache settings for the group-based communications within the group-based communication channel, badge settings for the group-based communication channel, and the like.

The term "settings configuration request" refers to electronically managed data indicating a request to configure at least one group-based communication channel setting for all group-based communication channels associated with a selected organized channel set. In some embodiments, the settings configuration request includes at least an organized channel set identifier associated with the selected organized channel set, for example for use in identifying and/or retrieving the organized channel set. Additionally or alternatively, in some embodiments, a settings configuration request includes a channel setting value set including at least one channel setting value, each channel setting value to be used in configuring a corresponding group-based communication channel to utilize the channel setting value. In some embodiments, a specially configured client device receives and/or processes a settings configuration request in response to user interaction with a selected organized channel set interface element, for example by locally storing updated channel setting value(s) for the group-based communication channel settings for one or more authenticated user accounts. Additionally or alternatively, in some embodiments, a group-based communication system receives, from a client device, and/or processes a settings configuration request in response to user interaction with the client device, for example by storing the updated channel setting value(s) for a group-based communication channel setting remote from the client device for one or more authenticated user accounts.

The terms "group identifier" and "workspace identifier" refer to one or more identifiers by which a workspace within a group-based communication system may be uniquely identified. An organization or other entity within a group-based communication system may be associated with any number of workspace identifiers.

The term "authenticated user account" refers to information corresponding to authentication credentials (e.g., a username and password combination) for accessing particular functionality of a group-based communication system. An authenticated user account is associated with any of a variety of information, including, for example and without limitation, a user identifier, one or more group-based communication channel identifiers associated with group-based communication channels that the user has been granted access to (i.e., accessible group-based communication channels), one or more group identifiers for workspaces with which the user is associated (e.g., accessible workspaces), one or more organization identifiers for organizations with which the user is associated, an indication as to whether the user is an owner of any group-based communication channels, an indication as to whether the user has any group-based communication channel restrictions, a plurality of group-based communication messages, an emoji, a plurality of conversations, a plurality of conversation topics, an avatar, an email address, a real name (e.g., John Doe), a username (e.g., j doe), a password, a real name, a time zone, a status, and the like. In some embodiments, a user utilizes a client device to transmit authentication credentials corresponding to a particular authenticated user account to a group-based communication system, and in response initiates an authenticated session configured to enable access to functionality and/or information accessible to the authenticated user account via the client device during the authenticated session.

The term "accessible group-based communication channel set" refers to zero or more group-based communication channels that an authenticated user account is permissioned and/or provisioned to access. In some embodiments, during an authenticated session, a user accesses an accessible group-based communication channel via a rendered group-based communication interface to display information associated with the accessed group-based communication channel (e.g., group-based communication messages transmitted within the group-based communication channel).

The term "organized channel set" refers to electronically managed data including zero or more group-based communication channels linked together for an associated authenticated user account for rendering. An organized channel set provides a data structure for separating group-based communication channels from other group-based communication channels, and to render such group-based communication channels to a group-based communication interface based on one or more organized channel set(s). In this regard, an organized channel set may be stored associated with each authenticated user account (e.g., server side or client side), such that each authenticated user account may organize group-based communication channels differently between one or more organized channel set(s). The term "organized channel set identifier" refers to one or more identifiers by which an organized channel set may be uniquely identified by a group-based communication system or client device. In some embodiments, an organized channel set includes or is otherwise associated with an organized channel set identifier, one or more group-based communication channel identifiers, organized channel set title data, organized channel set image data, an authenticated user account identifier, and/or a combination thereof.

In some embodiments, an organized channel set is associated with one or more organized channel set settings. For example, in some embodiments an organized channel set is associated with a mute setting (e.g., whether notifications, badges, and/or the like are rendered for activity that occurs within group-based communication channels associated with the organized channel set). Additionally or alternatively, in some embodiments, an organized channel set is associated with badge settings, for example for one or more group-based communication channel types. For example, the badge settings may be associated with a value (i.e., text data, image data, color and/or other formatting data for use in rendering badges and/or other notifications associated with activity in one or more group-based communication channels associated with the organized channel set). In this regard, a user associated with a particular authenticated user account may set a first badge settings value associated with direct group-based communication channels linked to the organized channel set (e.g., for use in rendering a notification badge associated with activity, such as group-based communication message posting, within one or more linked single-user and/or multi-user direct group-based communication channels), a second badge settings value associated with external resource group-based communication channels linked to the organized channel set, and/or the like.

The term "organized channel set interface element" refers to an interface component rendered within a group-based communication interface, or sub-interface thereof, for displaying information associated with an organized channel set. An organized channel set interface element includes at least data associated with each group-based communication channel linked within the organized channel set (e.g., a group-based communication channel title). In some embodiments, an organized channel set interface element additionally includes organized channel set title data and/or organized channel set image data, for example to visually distinguish the organized channel set interface element from one or more other organized channel set interface elements.

The term "channel order" refers to data and/or information representing an order that group-based communication channels within an organized channel set are to be rendered via an organized channel set interface element. In some embodiments, a channel order is user-defined for a particular authenticated user account. A channel order may be updated, for example based on particular user interaction, to change the order that group-based communication channels of a particular organized channel set are rendered within a corresponding organized channel set interface element. For example, in some embodiments, an organized channel set is associated with a channel order such that, when rendered via an organized channel set interface element, the channel order defines each position within a list for the group-based communication channels to be rendered. In some embodiments, an organized channel set stores associated group-based communication channels within a structured data object (e.g., a vector or ordered list), such that the channel order is embodied by the positions of each group-based communication channel identifier within the structured data object. In other embodiments, a channel order is embodied by a separate data object included in the organized channel set that links a group-based communication channel within the organized channel set to a particular ordinal.

The term "channel reordering interaction data" refers to user engagement with a client device that represents a user desire to update a channel order for a particular organized channel set. In some embodiments, channel reorder user interaction data is received in response to user interaction with one or more group-based communication channels rendered within an organized channel set interface element. For example, in some embodiments, channel reordering interaction data represents a user drag-and-drop of a first group-based communication channel above and/or below a second group-based communication channel indicating a user desire to update the channel order for the organized channel set based on the drag-and-drop action.

The term "organized channel set order" refers to data and/or information representing an order that organized channel sets associated with a particular authenticated user account, and/or particular accessed workspace, are to be rendered within a group-based communication interface. In some embodiments, an organized channel set order is user-defined for a particular group-based communication interface associated with a group-based workspace. An organized channel set order may be updated, for example based on particular user interaction, to change the order that organized channel set interface elements associated with the organized channel sets are rendered within a corresponding group-based communication interface. For example, in some embodiments, a set of organized channel sets for a particular authenticated user account is associated with an organized channel set order such that, when rendered via corresponding organized channel set interface elements within a group-based communication interface, the organized channel set order defines each position within a list for the organized channel sets to be rendered within the group-based communication interface. In some embodiments, the organized channel set order is embodied by a structured data object (e.g., a vector or ordered list, or the like) stored associated with a particular authenticated user account and/or group-based communication interface.

The term "organized channel set reordering interaction data" refers to user engagement with a client device that represents a user desire to update an organized channel set order for a particular set of organized channel sets. In some embodiments, organized channel set reordering interaction data is received in response to user interaction with one or more organized channel set interface elements rendered within a group-based communication interface. For example, in some embodiments, organized channel set reordering interaction data represents a user drag-and-drop of a first organized channel set interface element above and/or below a second organized channel set interface element within a group-based communication interface, indicating a user desire to update the organized channel set order based on the drag-and-drop action.

The term "organized channel set title data" relates to electronically managed data representing a user submitted title for an organized channel set. In some embodiments, the organized channel set title data embodies a string and/or alphanumeric representation that a user provides as a human-readable description of the intended grouping of the group-based communication channels within the organized channel set. In some embodiments, organized channel set title data includes image-based text data, for example representing one or more emojis. For example, an organized channel set intended to include a user's favorite group-based communication channels may be associated with organized channel set title data embodying the string "Favorites." In some embodiments, organized channel set title data is configured to be displayed within an organized channel set interface element. In some embodiments, the organized channel set title data for two organized channel sets may be equivalent. In other embodiments, the organized channel set title data for each organized channel set associated with an authenticated user account must be unique, for example such that no two organized channel sets have equivalent organized channel set title data. In some such embodiments, the organized channel set title data embodies an organized channel set identifier.

The term "organized channel set image data" refers to electronically managed data representing a user submitted image for an organized channel set. In some embodiments, the organized channel set image data embodies a user-uploaded image in any of a variety of known image file formats (e.g., PNG, JPG, TIFF, or the like). Alternatively or additionally, in some embodiments, organized channel set image data embodies image-based text data, for example representing one or more emojis. In some embodiments, organized channel set image data is configured to be displayed within an organized channel set interface element, for example additional and/or alternative to organized channel set title data. In some embodiments, the organized channel set image data for two organized channel sets may be equivalent. In other embodiments, the organized channel set image data for two organized channel sets must be unique.

The term "organized channel set creation request" refers to electronically managed data indicating a request to generate a new organized channel set. In some embodiments, an organized channel set creation request is transmitted by a client device to a group-based communication system for processing. In some embodiments, the organized channel set creation request is generated and/or transmitted by the client device based on user interaction data with a rendered group-based communication interface. In some embodiments, the organized channel set creation request includes an authenticated user account identifier associated with an authenticated user account with which the newly created organized channel set is to be linked. Additionally or alternatively, in some embodiments, the organized channel set creation request includes a group-based communication interface identifier, or workspace identifier, associated with the group-based communication interface utilized to generate the organized channel set creation request. Additionally or alternatively, in some embodiments, the organized channel set creation request includes organized channel set title data for the newly created organized channel set. Additionally or alternatively, in some embodiments, the organized channel set creation request includes organized channel set image data for the newly created organized channel set.

The term "channel organization request" refers to electronically managed data representing a request to add a group-based communication channel to an organized channel set. In some embodiments, a channel organization request includes at least an organized channel set identifier (e.g., associated with the organized channel set to which the group-based communication channel is to be added) and a channel identifier (e.g., associated with the group-based communication channel to be added to the organized channel set). In some embodiments, the channel organization request is received in response to user interaction with one or more sub-elements of a group-based communication interface.

The term "user interaction data" refers to data generated based on user engagement with a client device and/or associated peripheral. Non-limiting examples of user interaction data include user engagement of a touch area or touch screen, a tactile gesture (e.g., swipe, long press, and the like), a motion gesture (e.g., moving the user's body and/or a device in a predefined motion), a virtual button press, a mouse click, a scroll, a keyboard press, a peripheral button press, a controller input, a joystick input, a voice command or other audio interaction, a remote control input, and/or or a combination thereof. In some embodiments, user interaction data is associated with particular functionality based on a currently rendered user interface, for example based on a location and/or type of user interaction data received.

The term "channel organization mode" refers to a state of a group-based communication interface rendered via a client device for enabling access to user interface elements for creating a new organized channel set, deleting an existing organized channel set, moving one or a plurality of group-based communication channels to a new or existing organized channel set, removing one or a plurality of group-based communication channels from an existing organized channel set, or any combination thereof. In some embodiments, a group-based communication interface is affected by one or more visual effects when a channel organization mode is activated.

The term "selection interface element" refers to an interface element rendered associated with a group-based communication channel and configured to receive user interaction data associated with selecting the group-based communication channel for management (e.g., moving to a new and/or existing organized channel set, or for removing from an existing organized channel set). In some embodiments, a group-based communication interface is rendered including a selection interface element for a group-based communication channel when a channel organization mode is activated. In some such embodiments, one or more selection interface elements may be interacted with to select a set of group-based communication channels for moving together. Non-limiting examples of a selection interface element include a checkbox, a toggle switch, a customized interface effect (e.g., highlighting or bolding a group-based communication channel when selected, and un-highlighting or un-bolding the group-based communication channel when deselected), or any combination thereof.

The term "selection submission interface element" refers to an interface element rendered to a group-based communication interface configured to receive user interaction indicating completion of group-based communication channel selection. In some embodiments, a selection submission interface element is configured to receive user interaction to initiate a process for moving selected group-based communication channels to a particular organized channel set, or removing selected group-based communication channels from one or more corresponding organized channel sets.

The term "channel selection data" refers to electronically managed data representing and/or embodying selected group-based communication channels. In some embodiments, channel selection data is identified and/or received in response to user interaction with a selection submission interface element to complete selection of the group-based communication channels. For example, in some embodiments, channel selection data includes a group-based communication channel identifier for a selected group-based communication channel, or a plurality of group-based communication channel identifiers associated with a plurality of selected group-based communication channels. In some embodiments, channel selection data further includes an indicator representing a request to add the selected channel identifiers to a particular organized channel set, or an indicator representing a request to remove the selected channel identifiers from their corresponding organized channel set(s).

Example System Architecture of the Disclosure

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

In this regard, FIG. 1 discloses an example computing system in which embodiments of the present disclosure may operate. FIG. 1 illustrates an overview for a system configured for group-based communication channel organization. Specifically, the system includes a client device for communicating with a group-based communication system, where the group-based communication system provides inter-user group-based communications functionality and facilitates functionality associated with one or more external resources. For example, the group-based communication system may provide native group-based communication functionality and/or external resource functionality through provision of various information for use in rendering one or more specially configured group-based communication interfaces. The group-based communication system is communicable with one or more client device(s) and/or external resource(s) through one or more communication networks.

Specifically, as illustrated, the system includes a group-based communication system 102. The group-based communication system 102 comprises a group-based communication server 102A ("server 102A") and a group-based communication datastore 102B ("datastore 102B"). The server 102A may be configured to communicate with the datastore 102B to enable the group-based communication system 102 to provide the functionality described herein.

The server 102A may be embodied by a computer or a plurality of computers. The server 102A may provide various functionality associated with receiving group-based communications, maintaining group-based communications, and/or transmitting group-based communications to one or more client devices, such as the client devices 104A-104N (collectively "client devices 104"). Additionally or alternatively, the server 102A provides various external resource functionality through communication with one or more external resources, such as the external resources 106A-106N (collectively "external resources 106"). In some such embodiments, the server 102A facilitates transmission of external resource information to one or more client devices, for example automatically or in response to a user request. For example, the server 102A may be operable to receive and post, or transmit, group-based communications provided by one or more of the client devices 104 and/or external resources 106. The server 102A may access the communications network 108 to perform one or more of the operations described.

The datastore 102B may be embodied as a data storage device, such as one or more local storage device(s), one or more cloud storage device(s), network attached storage ("NAS") device or a plurality of NAS devices, or as a separate database server of plurality of servers. The datastore 102B includes information accessed by, receive by, and/or otherwise generated and/or processed by the server 102A to facilitate operations provided by the group-based communication system 102. For example, the datastore 102B may be configured to store, without limitation, a plurality of group-based communications associated with a plurality of workspaces, group-based communication channels, authenticated user accounts, and/or the like. Additionally or alternatively, the datastore 102B may be configured to store authentication credentials associated with various authenticated user accounts, for example to enable a client device to initiate an authenticated session with the group-based communication system 102 and link the client device with an authenticated user account for enabling the authenticated session.

In some embodiments, the datastore 102B is configured at least for storing data associated with rendering one or more organized group-based communication interfaces. For example, in some embodiments, the datastore 102B is configured to store one or more group-based communication channels associated with one or more group-based workspaces. Additionally or alternatively, in some embodiments, the datastore 102B is configured to store permissions associated with each authenticated use account for accessing one or more group-based communication interfaces for one or more particular group-based workspaces (e.g., "accessible group-based communication interfaces"), and/or one or more of the group-based communication channels for each accessible group-based communication interface (e.g., "accessible group-based communication channels"). Additionally or alternatively, in some embodiments, the datastore 102B is configured to store personalized data for each authenticated user account for customizing one of the corresponding accessible group-based communication interfaces. For example, additionally or alternatively in some embodiments, the datastore 102B is configured to store any number of organized channel set(s) created by an authenticated user account for a particular accessible group-based communication interface. Additionally or alternatively, in some embodiments, the datastore 102B is configured to store a channel set order for each organized channel set associated with a particular group-based communication interface and/or associated authenticated user account, where the channel set order defines the order for rendering of the group-based communication channels associated with, linked to, or otherwise stored in the corresponding organized channel set. Additionally or alternatively, in some embodiments, the datastore 102B is configured to store, for each authenticated user account, an organized channel set order associated with each accessible group-based communication interface, where the organized channel set order defines the order for rendering of the organized channel sets associated with the corresponding group-based communication interface.

Each of the client devices 104 may be embodied by any of a variety of computing devices as defined above. Electronic data received by the group-based communication server 102A from the client devices 104 may be provided in various forms and via various methods for processing. For example, the client devices 104 may include desktop computers, laptop computers, smartphones, netbooks, tablet computers, wearables, and/or the like. Each of the client devices 104 may include a networking interface to enable such communications, and/or each of the client devices 104 may be associated with a device configured with a network interface to enable such communications (e.g., a wearable device connected to a smartphone). The client devices 104 may be configured to enable communications over various networks utilizing various networking hardware, software, and/or firmware (e.g., Bluetooth between a smartphone and associated wearable, a carrier network between a smartphone and a group-based communication system and/or between a wearable and a group-based communication system, and/or one or more wireless and/or wireless networks for communicating via the Internet between a client device and a group-based communication system).

In an example context, the client devices 104 may execute an application or "app" to enable interaction with the group-based communication system 102. Such applications are typically designed for execution via a computing device dependent on the operating system and/or other configurations associated with the computing device. For example, an application may be provided that executes on mobile device operating systems such as iOS®, Android®, or Windows®. Alternatively, an application may be provided that executes on a personal computer operating system, such as Windows®, macOS®, Linux®, or another operating system executed on a laptop device, desktop device, or terminal device. These platforms typically provide frameworks that allow applications to communicate with one another and/or with particular hardware and/or software components of the client device. For example, the mobile operating systems and/or personal computer operating systems named above each provide frameworks for interacting with location services circuitry, wired and/or wireless network interfaces, user contacts, and other applications. In an example context, the application is embodied by a group-based communication service application provided by the group-based communication system. Communication with hardware and software modules outside of the application is typically provided via one or more application programming interfaces (APIs) configured by the operating system for the client device and/or provided via an external resource.

Alternatively or additionally, the client devices 104 may interact with the group-based communication system 102 via a web application. In an example context, the web application is embodied by a web browser executed via one of the client devices 104. As yet another example, the client devices 104 may include various hardware, firmware, and/or software designed to interface with the group-based communication system 102.

In some embodiments, one or more of the client devices 104 is configured to maintain a client datastore (not shown). It should be appreciated that the client datastore may be embodied by any number of local datastores accessible to the client device of the client devices 104. In this regard, the client datastore may be utilized for storing settings, parameters, and/or other data for rendering a group-based communication layout locally (e.g., without communications with a group-based communications system, such as group-based communication system 102). The client datastore may be configured to store various data locally to the associated client device of the client devices 104. For example, in some embodiments, the client datastore is configured to store group-based communication interface data, any number of associated organized channel set(s), a defined organized channel set order for the associated organized channel set(s), one or more defined channel orders for associated organized channel set(s), and/or other settings utilized for rendering a group-based communication interface personalized associated with an authenticated user account.

In some embodiments, for example, the client datastore is configured at least for storing data associated with rendering one or more group-based communication interfaces without communicating with the group-based communication system 102. For example, in some embodiments, the client datastore is configured to store personalized data for one or more authenticated user accounts that accesses the corresponding client device. For example, in some embodiments, the client datastore is configured to store any number of organized channel set(s) created by an authenticated user account and associated with a particular group-based communication interface. Additionally or alternatively, in some embodiments, the client datastore is configured to store a channel set order for each organized channel set associated with a group-based communication interface, where the channel set order defines the order for rendering of the group-based communication channels associated with, linked to, or otherwise stored in the corresponding organized channel set. Additionally or alternatively, in some embodiments, the client datastore is configured to store an organized channel set order for a group-based communication interface, where the organized channel set order defines the order for rendering of the organized channel sets associated with the corresponding group-based communication interface.

Each of the external resources 106 represents an external system, resource, service, software application, computer, and/or the like, that is accessible by a group-based communication system 102 for providing associated functionality to one or more of the client devices 104 during an authenticated session. In some embodiments, one or more of the external resources 106 (or a specific subset thereof) provide specific functionality via one or more group-based communication interfaces provided by the group-based communication system 102 and rendered to one or more of the client devices 104. For example, the group-based communication system 102 may access functionality provided by each of the external resources 106 via one or more APIs. An external resource of the external resources 106 may provide specific functionality and/or a specific service integrated into a group-based communication interface. In one example, one or more of the external resources 106 may be a validated software source code repository, or the like, which members of a particular group-based communication workspace may collectively access as they collaborate to develop a new software application. Additionally or alternatively, in another context, one of the external resources 106 may provide cloud storage for documents and/or the like. An external resource of the external resources 106 may be embodied in a variety of ways utilizing a variety of computing devices, for example an external server remote from the group-based communication system 102 and accessible using communications via the communications network 108 (e.g., over the Internet for example).

In some embodiments, group-based communication system is configured to access an external resource of the external resources 106 utilizing an external resource identifier. The external resource identifier may include, or otherwise be associated with and retrievable together with, an external resource access token associated with the external resource and/or a corresponding group-based communication system, workspace, and/or authenticated user account. A group-based communication system 102 may store one or more external resource identifiers including or associated with external resource access token(s) to enable API requests to the external resource, which may be tied with a specific external resource user account linked to a particular authenticated user account. For example, in this regard, an authenticated user account of the group-based communication system may be linked to a particular external resource user account, such that a user may access personalized external resource functionality.

In some embodiments of an exemplary group-based communication system 102, a group-based communication may be sent from a client device of the client devices 104 to a group-based communication system 102. In various implementations, the group-based communication may be sent to the group-based communication system 102 over communications network 108 directly by one of the client devices 104. In other embodiments, the group-based communication may be sent to group-based communication system 102 via one or more intermediaries, such as a messaging server, relay server, and/or the like. In at least one example implementation, the group-based communication may include data such as a communication identifier, sending user account identifier, a group identifier, a group-based communication channel identifier, communications contents (e.g., text, emojis, images, links), attachments (e.g., files), communications hierarchy data (e.g., the group-based communication may be a reply to another group-based communication), third-party metadata, external resource content, and/or the like.

In one embodiment, one of the client devices 104 may provide the following example group-based communication substantially in the form of a (Secure) Hypertext Transfer Protocol ("HTTP(S)") POST message including eXtensible Markup Language ("XML") formatted data, embodying a particular request for authenticating user account details to initiate an authenticated session, as provided below:

```
POST /authrequest.php HTTP/1.1
Host: www.server.com
Content-Type: Application/XML
Content-Length: 667
<?XML version ="1.0" encoding ="UTF-8"?>
<auth_request>
    <timestamp>2020-12-31 23:59:59</timestamp>
    <user_accounts_details>
      <user_account_credentials>
        <user_name>ID_user_1</user_name>
        <password>abc123</password>
        //OPTIONAL <cookie>cookieID</cookie>
        //OPTIONAL   <digital_cert_link>www.mydigitalcertificate.com/
JohnDoeDaDoeDoe@gmail.com/mycertifcate.dc</digital_cert_link>
        //OPTIONAL <digital_certificate>_DATA_</digital certificate>
      </user_account_credentials>
    </user_accounts_details>
    <client_details>//iOS Client with App and Webkit
        //it should be noted that although several client details
        //sections are provided to show example variants of client
        //sources, further messages will include only on to save
```

-continued

```
    //space
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
    <app_name>nickname.app</app_name>
    <app_version>1.0 </app_version>
    <app_webkit_name>Mobile Safari</client_webkit_name>
    <client_version>537.51.2</client_version>
  </client_details>
  <client_details>//iOS Client with Webbrowser
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product type>iPhone6,1</client_product type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
  </client_details>
  <client_details>//Android Client with Webbrowser
    <client_IP>10.0.0.123</client_IP>
    <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
  </client_details>
  <client_details>//Mac Desktop with Webbrowser
    <client_IP>10.0.0.123</client_IP>
    <user agent string>Mozilla/5.0 (Macintosh; Intel Mac OS X 10_9_3)
AppleWebKit/537.75.14 (KHTML, like Gecko) Version/7.0.3
Safari/537.75.14</user_agent_string>
    <client_product type>MacPro5,1</client_product type>
    <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Mac OS X</client_OS>
    <client_OS yersion>10.9.3</client_OS_version>
    <client_app type>web browser</client_app_type>
    <client_name>Mobile Safari</client_name>
    <client_version>537.75.14</client_version>
  </client_details>
  <message>
    <message_identifier>ID_message_10</message_identifier>
    <team_identifier>ID_team_1</team_identifier>
    <channel_identifier>ID_channel_1</channel_identifier>
    <body contents>That is an interesting invention. I have attached a copy our patent
policy.</body contents>
    <attachments>patent_policy.pdf</attachments>
  </message>
</auth request>
```

The group-based communication system 102 comprises at least one group-based communication server 102A that may create a storage request data object based upon the received message to facilitate message indexing and storage in a group-based communication repository 102B. In one implementation, the storage request data object may include data such as a communication identifier, a group identifier, a group-based communication channel identifier, a sending user account identifier, topics, responses, communication contents (i.e., body contents), attachments, communication hierarchy data, third party metadata, conversation primitive data, and/or the like. For example, the group-based communication server 102A may provide the following example storage request data object, substantially in the form of a HTTP(S) POST message including XML-formatted data, for example embodying a particular request for posting a group-based communication, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <body contents>That is an interesting disclosure. I have attached a copy our patent
policy.</body contents>
    <attachments>patent_policy.pdf</attachments>
    <conversation_primitive>
        conversation includes messages: ID_message_8, ID_message_9, ID_message_10,
        ID_message_11, ID_message_12
    </conversation_primitive>
</storage_message>
```

In embodiments, a sending user account identifier may be associated with the message communication. In one implementation, the message may be parsed (e.g., using PHP—i.e., the script language derived from Personal Home Page Tools—commands) to determine a sending user account identifier of the user who sent the group-based communication.

In embodiments, topics may be associated with the group-based communication. In one implementation, the communication contents may be parsed (e.g., using PHP commands) to determine topics discussed in the group-based communication. For example, hashtags in the group-based communication may indicate topics associated with the group-based communication. In another example, the group-based communication may be analyzed (e.g., by itself, with other group-based communications in a conversation primitive) or parsed using a machine learning technique, such as topic modeling, to determine topics associated with the group-based communication.

In embodiments, data indicating responses may be associated with the group-based communication. For example, responses to the group-based communication by other users may include reactions (e.g., selection of an emoji associated with the group-based communication, selection of a "like" button associated with the group-based communication), clicking on a hyperlink embedded in the group-based communication, replying to the group-based communication (e.g., posting a group-based communication to the group-based communication channel in response to the communication), downloading a file associated with the group-based communication, sharing the group-based communication from one group-based communication channel to another group-based communication channel, pinning the group-based communication, starring the group-based communication, and/or the like. In one implementation, data regarding responses to the group-based communication by other users may be included with the group-based communication, and the group-based communication may be parsed (e.g., using PHP commands) to determine the responses. In another implementation, data regarding responses to the group-based communication may be retrieved from a database. For example, data regarding responses to the group-based communication may be retrieved via a MySQL database command similar to the following:

SELECT messageResponses
FROM MSM_Message
WHERE messageID=ID_message_10.

For example, data regarding responses to the group-based communication may be used to determine context for the group-based communication (e.g., a social score for the group-based communication from the perspective of some user). In another example, data regarding responses to the group-based communication may be analyzed to determine context regarding the user (e.g., the user's expertise in a topic may be determined based on the responses to the user's group-based communication regarding the topic).

In embodiments, attachments may be included with the group-based communication. If there are attachments, files may be associated with the group-based communication. In one implementation, the group-based communication may be parsed (e.g., using PHP commands) to determine file names of the attachments. For example, file contents may be analyzed to determine context for the group-based communication (e.g., a patent policy document may indicate that the group-based communication is associated with the topic "patents").

In embodiments, third-party metadata may be associated with the group-based communication. For example, third-party metadata may provide additional context regarding the group-based communication or the user that is specific to a company, group, a group-based communication workspace, a group-based communication channel, and/or the like. In one implementation, the group-based communication may be parsed (e.g., using PHP commands) to determine third-party metadata. For example, third-party metadata may indicate whether the user who sent the group-based communication is an authorized representative of the group-based communication channel (e.g., an authorized representative may be authorized by the company to respond to questions in the group-based communication channel).

In embodiments, a conversation primitive may be associated with the group-based communication. In one implementation, a conversation primitive is an element used to analyze, index, store, and/or the like communications. For example, the group-based communication may be analyzed by itself, and may form its own conversation primitive. In another example, the group-based communication may be analyzed along with other group-based communications that make up a conversation, and the group-based communications that make up the conversation may form a conversation primitive. In one implementation, the conversation primitive may be determined as the group-based communication, a specified number (e.g., two) of preceding group-based communications and a specified number (e.g., two) of following group-based communications. In another implementation, the conversation primitive may be determined based on analysis of topics discussed in the group-based communication and other group-based communications (e.g., in the group-based communication channel) and/or proximity (e.g., communication send order proximity, communication send time proximity) of these group-based communications.

In embodiments, various metadata, determined as described above, and/or the contents of the group-based communication may be used to index the communication (e.g., using the conversation primitive) to facilitate various facets of searching (i.e., search queries that return results from group-based communication repository 102B). In at least one example implementation, a storage request data object may be sent from group-based communication server 102A to facilitate indexing in group-based communication repository 102B. In another implementation, metadata associated with the group-based communication may be determined and the communication may be indexed in group-based communication repository 102B. In an example embodiment, the group-based communication may be indexed such that a company's or a group's communications are indexed separately (e.g., in a separate index associated with the group and/or company that is not shared with other groups and/or companies). In one implementation, group-based communications may be indexed at a separate distributed repository (e.g., to facilitate data isolation for security purposes).

If there are attachments associated with the group-based communication, file contents of the associated files may be used to index such files in group-based communication repository 102B to facilitate searching. In one embodiment, the files may be indexed such that a company's or a group's files are indexed at a separate distributed repository.

Example Apparatuses of the Disclosure

The group-based communication system 102 may be embodied by one or more computing systems, such as the apparatus 200 shown in FIG. 2. The apparatus 200 may include a processor 202, memory 204, input/output module 206, communications module 208, group-based communication module 210, and channel organization module 212. The apparatus 200 may be configured, using one or more of the modules to execute the operations described herein.

Although the components are described with respect to functional limitations, it should be understood that the particular implementations necessarily include the use of particular hardware. It should also be understood that certain of the components described herein may include similar or common hardware. For example, two modules may both leverage use of the same processor, network interface, storage medium, or the like to perform their associated functions, such that duplicate hardware is not required for each module. The use of the term "module" and/or the term "circuitry" as used herein with respect to components of the apparatus 200 should therefore be understood to include particular hardware configured to perform the functions associated with the particular module as described herein.

Additionally or alternatively, the terms "module" and "circuitry" should be understood broadly to include hardware and, in some embodiments, software and/or firmware for configuring the hardware. For example, in some embodiments, "module" and "circuitry" may include processing circuitry, storage media, network interfaces, input/output devices, and the like. In some embodiments, other elements of the apparatus 200 may provide or supplement the functionality of the particular module. For example, the processor 202 may provide processing functionality, the memory 204 may provide storage functionality, the communications module 208 may provide network interface functionality, and the like, to one or more of the other modules.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus 200 to carry out various functions in accordance with example embodiments of the present disclosure.

The processor 202 may be embodied in any one of a myriad of ways and may, for example, include one or more processing devices configured to perform independently. Additionally or alternatively, the processor 202 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, and/or remote or "cloud" processors.

In an example embodiment, the processor 202 may be configured to execute computer-coded instructions stored in the memory 204 or otherwise accessible to the processor. Alternatively, or additionally, the processor 202 may be configured to execute hard-coded functionality. As such, whether configured by hardware or software means, or by a combination thereof, the processor 202 may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As one example context, the processor 202 may be configured to maintain one or more group-based communication channels accessible by various user accounts associated with the client devices 104 (shown in FIG. 1) to enable communication transmission between the client devices 104. The processor 202 ensures that group-based communications intended for exchange between the client devices 104 within the particular group-based communication channel are properly disseminated to those client devices 104 for display within respective display windows or particular interface portions provided via the client devices 104, such as via a group-based communication service application. In some embodiments, the processor 202 is configured to store and/or maintain one or more organized channel set(s) for one or more authenticated user accounts and/or one or more group-based communication interfaces.

Moreover, the processor 202 may be configured to synchronize group-based communications transmitted within particular communication channel with a database for storage and/or indexing of the communications therein. In certain embodiments, the processor 202 may provide stored and/or indexed group-based communications for dissemination to client devices 104. The processor 202 may also be configured synchronize such stored and/or indexed group-based communications across various group-based communication interfaces and/or associated group-based communication channels therein.

In some embodiments, the apparatus 200 may include input/output module 206 that may, in turn, be in communication with processor 202 to provide output to the user and, in some embodiments, to receive an indication of a user input. The input/output module 206 may comprise a user interface (e.g., a group-based communication interface) and may include a display to which the user interface is rendered. In some embodiments, the input/output module 206 may comprise a web user interface, a mobile application (e.g., a mobile group-based communication service application), a desktop application (e.g., a desktop group-based communication service application), a linked or networked client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface module comprising the processor, for example processor 202, may be configured to control one or more functions of one or more user interface elements through computer program instructions (e.g., software and/or firmware) stored on a memory accessible to the processor (e.g., memory 204, and/or the like).

The communications module 208 may be any means such as a device or circuitry embodied in either hardware or a combination of hardware and software that is configured to receive and/or transmit data from/to a network and/or any other device, circuitry, or module in communication with the apparatus 200. In this regard, the communications module 208 may include, for example, at least a network interface for enabling communications with a wired or wireless communication network. For example, the communications module 208 may include one or more network interface cards, antennas, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication module 210 includes hardware, software, firmware, and/or a combination thereof, configured to support functionality associated with group-based communication system 102. The group-based communication module 210 may utilize processing circuitry, such as the processor 202, to perform these actions. In some embodiments, the group-based communication module 210 includes hardware, software, firmware, or a combination thereof, to process group-based communications transmitted by one or more external resource(s) and/or one or more client device(s). For example, the group-based communication module 210 may additionally and/or alternatively be configured to send data and/or receive data from one or more datastores, for example datastore 102B. In some implementations, the sent and/or received data may be data objects embodying one or more group-based communications (e.g., messages, files, links, etc.) organized among a plurality of group-based communication channels. Additionally or alternatively, the group-based communication module 210 may provide for authenticating authentication credentials to initiate an authenticated session associated with a corresponding client device. During the authenticated session, the apparatus 200, for example via the group-based communication module 210 may provide native communication functionality and/or functionality associated with the external resources. It should be appreciated that, in some embodiments, the group-based communication module 210 may include a separate processor, specially configured field programmable gate array (FPGA), or a specially configured application-specific integrated circuit (ASIC).

The channel organization module 212 includes hardware, software, firmware, and/or a combination thereof, configured to support functionality associated maintaining organized channel set(s) and/or configuring data to cause rendering group-based communication interfaces based on stored organized channel set(s). The channel organization module 212 may utilize processing circuitry, such as the processor 202, to perform these actions. In some embodiments, the channel organization module 212 includes hardware, software, firmware, or a combination thereof, to receive and/or process requests for creating a new organized channel set and/or deleting an existing organized channel set. Additionally or alternatively, in some embodiments, the channel organization module 212 includes hardware, software, firmware, or a combination thereof, to receive and/or process requests for storing group-based communication channels associated (e.g., within) one or more organized channel set(s). Additionally or alternatively, in some embodiments, the channel organization module 212 includes hardware, software, firmware, and/or a combination thereof, to configure data for transmission to one or more client devices to cause rendering of a specially configured group-based communication interface, for example including organized channel set interface elements for one or more organized channel set(s). In addition to processing and/or storing such organized channel set(s) and/or associated information, the channel organization module 212 may be configured to maintain such data stored by the apparatus 200. It should be appreciated that, in some embodiments, the channel organization module 212 may include a separate processor, specially configured FPGA, or a specially configured ASIC.

In some embodiments, one or more of the aforementioned components is combined to form a single module. For example, in some embodiments, the group-based communication module 210 and/or channel organization module 212, and/or processor 202, are combined into a single module. The combined module may be configured to perform some or all of the functionality described above with respect to the individual modules. Additionally or alternatively, in some embodiments, one or more of the modules described above may be configured to perform one or more of the actions described with respect to one or more of the other modules.

Any of the client devices 104 may be embodied by one or more computing systems, such as the apparatus 300 shown in FIG. 3. The apparatus 300 may include a processor 302, memory 304, input/output module 306, communications module 308, and group-based client management module 310. The apparatus 300 may be configured, using one or more of the modules to execute the operations described herein.

The modules 302-308 may perform functions similar to those described above with respect to the similarly named modules illustrated depicted in the apparatus 200 illustrated in FIG. 2. In the interest of brevity, repeated description of the similarly named components is omitted. It should be appreciated that the similarly named components, with respect to FIG. 3 may interact with, or be utilized in conjunction with, one or more of the modules 310-312 to perform functionality associated with these modules.

The group-based client management module 310 includes hardware, software, firmware, and/or a combination thereof, configured to support functionality associated with transmitting and/or processing requests for generating, deleting, and/or maintaining organized channel set(s), and/or rendering group-based communication interfaces specifically configured based on the organized channel set(s). The group-based client management module 310 may utilize processing circuitry, such as the processor 302, to perform these actions. In some embodiments, the group-based client management module 310 includes hardware, software, firmware, or a combination thereof, to receive and/or process user interaction data for generating a new organized channel set, deleting an existing organized channel set, renaming and/or modifying an organized channel set, adding one or more group-based communication channels to an organized channel set, removing one or more group-based communication channels from an organized channel set, and/or moving one or more group-based communication channels between organized channel sets. The group-based client management module 310 may provide such functionality by storing and/or otherwise maintaining specific information to facilitate such functionality and/or utilizing such information in rendering a corresponding group-based communication interface. It should be appreciated that, in some embodiments, the group-based client management module 310 may include a separate processor, specially configured FPGA, or a specially configured ASIC.

In some embodiments, one or more of the aforementioned components is combined to form a single module. For example, in some embodiments, the group-based client management module 310 is combined with one or more other components, such as processor 302, into a single module. The combined module may be configured to perform some or all of the functionality described above with respect to the individual modules. Additionally or alternatively, in some embodiments, one or more of the modules described above may be configured to perform one or more of the actions described with respect to one or more of the other modules.

As described above, and as will be appreciated based on this disclosure, embodiments of the present disclosure may be configured as methods, mobile devices, frontend graphical user interfaces, backend network devices, and the like. Accordingly, embodiments may comprise various means including entirely hardware, entirely software, or a combination of hardware and software. Furthermore, embodiments may take the form of a computer program product on at least one non-transitory computer-readable storage medium having computer-readable program instructions (e.g., computer software) embodied in the storage medium. Similarly, embodiments may take the form of computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus circuitry to produce a machine, such that the computer, processor, or other programmable circuitry that execute the code on the machine creates the means for implementing various functions, including those described herein.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page or parseable data representation) to a client device (e.g., for purposes of displaying information/data to and receiving user input from a user interacting with the client device). Information/data generated at the client device (e.g., a result of the user interaction) can be received from the client device at the server.

While this disclosure contains many specific implementation details, these should not be construed as limitations on the scope of this disclosure or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Example Interfaces of the Disclosure

FIGS. 4-9 illustrate various group-based communication interfaces, and components thereof, for providing group-based communication channel organization. It should be appreciated that, in some embodiments, one or more of the interface elements illustrated are rendered to one or more displays associated with various computing hardware described herein. For example, in some embodiments, the one or more interfaces are rendered to a display associated with a client device in communication with a group-based communication system. For example, the interfaces may be rendered to a display associated with a specially configured apparatus, such as apparatus 300. In some embodiments, the apparatus 300 is configured to maintain all data required for causing rendering of the various interfaces. In some embodiments, the interfaces are rendered via data communications with a group-based communication system, for example embodied by a specially configured apparatus, such as apparatus 200, for example to receive data utilized in rendering one or more interface elements (e.g., organized channel set interface elements, a channel list, group-based communications, and/or the like).

For example, FIG. 4 illustrates an example group-based communication interface 400 rendered in accordance with at least an example embodiment of the present disclosure. The group-based communication interface 400 comprises a sidebar interface 402 and content interface 404. In some embodiments, the sidebar interface 402 is configured based on one or more of an authenticated user account and/or a selected group-based workspace. For example, in an example context, the group-based communication interface 400 is configured for a user Jane Lee," who may be associated with an authenticated user account. Additionally, in the example context, the group-based communication interface 400 is configured based on a selected group-based workspace of "Acme Corp." In this regard, the sidebar 402 of the group-based communication interface 400 may be configured based on the various group-based communication channels accessible by the authenticated user account within the selected group-based workspace.

In particular, the sidebar interface 402 comprises various specially configured interface elements for organizing group-based communication channels (e.g. "channels") accessible to the authenticated user account. For example, sidebar interface 402 comprises an organized channel set interface element 406. The organized channel set interface element 406 may depict a visual representation of an organized channel set linked to the group-based communication interface 400 for the particular authenticated user account accessing the group-based communication interface (e.g., the authenticated user account associated with user Jane Lee). The organized channel set associated with organized channel set interface element 406 may have been created by user Jane Lee via the authenticated user account as described herein.

Each organized channel set interface element may further comprise one or more sub-interface elements. For example, as illustrated, the organized channel set interface element 406 comprises organized channel set image element 406A. In some such embodiments, the organized channel set image element 406A is rendered based on organized channel set image data within the corresponding organized channel set. The organized channel set image element 406A provides a particular visual indicator, for example that is set by the authenticated user account, for use in identifying the organized channel set interface element and/or conveying user-level information associated with the organized channel set image element (e.g., the user may use a star to denote an organized channel set interface associated with an organized channel set including the user's favorite and/or most used channels). In some embodiments, the organized channel set image element is optional, for example such that no rendered organized channel interface element(s) includes an organized channel set image element, or the user my provide organized channel set image data for only a desired subset of organized channel sets.

Additionally, as illustrated, the organized channel set interface element 406 comprises organized channel set title element 406B. In some such embodiments, the organized channel set title element 406B is rendered based on organized channel set title data within the corresponding organized channel set. The organized channel set title element 406B may provide a user-input identifier, such as a string, used to identify the organized channel set interface element 406. It should be appreciated that, in some embodiments, the organized channel set title data is unique such that the organized channel set title data functions as a unique identifier for purposes of storing and/or differentiating between organized channel sets. In other embodiments, organized channel sets are identified using another identifier (a UUID or GUID, for example a randomly generated object identifier), such that an organized channel set title data between various organized channel sets need not be unique.

Additionally, in some embodiments, the organized channel set interface element 406 comprises any number of rendered interface elements, each associated with a group-based communication channel stored within, and/or otherwise associated with, the organized channel set. For example, if the organized channel set is associated with two group-based communication channels, both group-based communication channels may be rendered within the organized channel set interface element 406. As illustrated, the organized channel set interface element 406 includes no such sub-interfaces, indicating the corresponding organized channel set is associated with zero group-based communication channels (e.g., because it is newly created, had all links to associated group-based communication channels removed, or otherwise has not yet been associated with any group-based communication channels). In some embodiments, in some such circumstances, one or more default message elements may be rendered within the organized channel set interface element.

As described herein, in some embodiments, an authenticated user account is associated with any number of organized channel sets associated with a particular group-based communication interface linked to a given group-based workspace. Accordingly sidebar interface 402 may comprise any number of organized channel set interface elements, such that an organized channel set interface element is rendered within the sidebar interface 402 for each associated organized channel set. In some such embodiments, each organized channel set interface is collapsible, for example such that the group-based communication channels are hidden and/or otherwise not rendered. In a particular example context, for example, the organized channel set interface element 406 is collapsible using a collapsible interface element rendered to the left of the organized channel set image element 406A, which in other embodiments may be rendered using any of a number of known interface controls, known interface images, custom interface images, and/or the like. When collapsed, the organized channel set interface element 406 is rendered including only the organized channel set image interface 406A and/or organized channel set title interface 406B, and an interface element for un-collapsing the organized interface set interface element 406 (which may be the same interface element for collapsing the organized channel set interface element 406, with altered functionality).

Additionally or alternatively, in some embodiments, the organized channel set interface element 406 includes one or more sub-interfaces for conveying notification information and/or other summary information for the group-based communication channels associated with the organized channel set corresponding to the organized channel set interface element 406. For example, in some embodiments, the organized channel set interface element 406 includes a badge notification indicating unread and/or newly received activity (i.e., posted group-based communication messages) within associated group-based communication channels. In some embodiments, the organized channel set interface element 406 includes one or more notification badge(s) rendered based on badge settings stored associated with the organized channel set corresponding to the organized channel set interface element 406. For example, in some embodiments, a first notification badge is rendered for unread activity occurring in direct group-based communication channels associated with the organized channel set corresponding to the organized channel set interface element 406, and a second notification badge is rendered for unread activity occurring in external resource group-based communication channels associated with the organized channel set corresponding to the organized channel set interface element 406. In this regard, in some embodiments, the first notification badge is rendered based on a first badge setting value associated with the organized channel set (e.g., a first badge setting value stored associated with the direct group-based communication channel type), and the second notification badge is rendered based on a second badge setting value associated with the organized channel set (e.g., a second badge setting value stored associated with the external resource group-based communication channel type). Alternatively or additionally, in some embodiments, only a single notification badge is rendered (e.g., a notification badge associated with the group-based communication channel type having the greatest count of unread activity for group-based communication channels associated with the organized channel set). It should be appreciated that, in some embodiments, each organized channel set may be stored associated with different notification settings, for example badge settings, such that each organized channel set may be rendered uniquely based on the particular desires of the user associated with an authenticated user account.

As rendered, the sidebar interface 402 further comprises an accessible group-based communication channel set 408. The accessible group-based communication channel set 408 includes any number of group-based communication channels accessible within the particular group-based communication interface (e.g., group-based communication channels within the corresponding group-based communication workspace) or otherwise associated with the authenticated user account (e.g., direct group-based communication channels accessible in one or a plurality of group-based communication interfaces). The accessible group-based communication channel set 408 may be sorted into various groupings, for example based on one or more user-created groupings and/or automatically based on one or more parameters. For example, as illustrated, the accessible group-based communication channel set 408 is grouped based on the group-based communication channel type for each group-based communication, and given an appropriate header. In some embodiments, such default groupings cannot be added to by a user (e.g., group-based communication channels can only be moved to an organized channel set, or placed in their default group). In other embodiments, each default grouping embodies another organized channel set. It should be appreciated that, in some embodiments, the accessible group-based communication channel set 408 is embodied by a single grouping, such that a user may organize all group-based communication channels into various organized channel set(s) as the user desires.

The group-based communication interface 400 further comprises a content interface 404. The content interface 404 may include any of a variety of data and/or information associated with an accessed group-based communication channel. For example, as illustrated, the user may select the "#announce-global" channel, as indicated by a bolding, color change, highlight, and/or other visual effect applied to the group-based communication channel. In response, the content interface 404 may be updated to include particular information associated with the "#announce-global" channel, such as group-based communication messages transmitted associated with (e.g., "within") the group-based communication channel. It should be appreciated that the accessed group-based communication channel may be associated with any number of group-based communication messages having various content, senders, and/or the like, where one or more of the group-based communication messages are rendered within the content interface 404 at a time (not shown). In some embodiments, the content interface 404 includes a scroll view for navigating throughout the history of group-based communication messages transmitted within the accessed group-based communication channel and viewable by the authenticated user account.

In some embodiments, organized channel sets within the group-based communication interface are configured for reorganization. For example, in some embodiments, each organized channel set interface element is configured to receive user interaction for reordering the organized channel set interface elements. For example, as illustrated in a context where each of the groupings of the accessible group-based communication channel set 408 comprises an organized channel set, the organized channel set interface element 406 may be configured to be reordered utilizing a drag-and-drop action. In this regard, the user may press down, click on, and/or otherwise interact with the organized channel set interface element 406 and drag it below another group (e.g., the "Channels" set) to update the sidebar interface 402 of the group-based communication interface 400, causing the organized channel set interface element 406 to be rendered under the "Channels" set. In some such embodiments, in response to the user interaction and/or to otherwise facilitate the reordering of the organized channel sets, the client device and/or group-based communication system receives corresponding organized channel set reordering interaction data for further processing.

Additionally or alternatively, in some embodiments, group-based communication channels within one or more organized channel set(s) are configured for reorganization. In this regard, the group-based communication channels may be reordered within their respective organized channel set. For example, in some embodiments, each group-based communication channel in the accessible group-based communication channel set 408 may be configured to receive user interaction data for reordering. In some embodiments, the group-based communication channels are similarly configured to be reordered utilizing a drag-and drop action. In this regard, the user may press down, click on, and/or otherwise interact with a group-based communication channel, and drag it above and/or below another group-based communication channel in the same organized channel set to update the group-based communication interface to position the group-based communication channels based on the release location (e.g., move the dragged group-based communication channel below the other group-based communication channel if released below other group-based communication channel). In some such embodiments, in response to the user interaction and/or to otherwise facilitate the reordering of the group-based communication channels within an organized channel set, the client device and/or group-based communication system receives corresponding channel set reordering interaction data for further processing.

Additionally or alternatively, in some embodiments, each group-based communication channel is configured to be added to a new organized channel set and/or otherwise moved from a first organized channel set to a second organized channel set. For example, in some embodiments, each group-based communication channel is configured to receive user interaction for adding the group-based communication channel to a particular organized channel set. As illustrated, for example, any of the group-based communication channels in the accessible group-based communication channel set 408 may be configured to receive user interaction for adding the group-based communication channel to the organized channel set corresponding to the organized channel interface element 406. In some embodiments, the group-based communication channel is similarly added to an organized channel set and/or moved between organized channel sets using a drag-and-drop action. For example, in some embodiments, the user may press down, click on, and/or otherwise interact with a group-based communication channel, and drag it to interact with an organized channel set interface element for an organized channel set with which the group-based communication channel is not currently associated. Upon releasing the group-based communication channel, the group-based communication channel may be newly added to the organized channel set associated with the organized channel set interface element where it was released, and/or removed from the organized channel set with which it was previously associated. The group-based communication interface may then be updated accordingly, for example by re-rendering the sidebar interface 402 and/or one or more sub-components thereof (e.g., re-rendering at least the organized channel set interface elements associated with the interaction). In some such embodiments, in response to the user interaction and/or to otherwise facilitate the reordering of the group-based communication channels into a new organized channel set, the client device and/or group-based communication system receives a channel organization request for further processing.

In this regard, it should be appreciated that in some embodiments, a single type of user interaction is utilized to facilitate various functionality. Accordingly, embodiments herein may be configured to determine the beginning and/or end location associated with a user interaction, for example by parsing the interaction data and/or otherwise processing the interaction data for such determinations. Such embodiments may be configured to initiate an appropriate action based on the parsed and/or processed interaction data (e.g., to determine whether a group-based communication was dragged onto another group-based communication channel within a shared organized channel set interface element, over a different organized channel set interface element, or the like. For example, in some embodiments, a group-based communication channel may be removed from its organized channel set and associated with a default grouping using a drag-and-drop action that releases the group-based communication channel not over any existing organized channel set interface element (such as when released over the content interface 404).

Additionally or alternatively, in some embodiments, the group-based communication interface may be organized by activating an channel organization mode configured to enable efficient and/or structured organization of elements rendered via the sidebar interface 402. As illustrated in FIG. 5, for example, the sidebar interface comprises interface settings button 502. The interface settings button 502 may be configured to enable access to one or more settings, parameters, and/or other data values associated with the group-based communication interface 400. For example, in at least one example embodiment, the interface settings button 502 is configured to receive user interaction. In response to such user interaction, the group-based communication interface 400 may be updated to include the channel organization modal 504. The channel organization modal 504 may include one or more sub-interface elements therein, for example an interface element for activating a channel organization mode and/or an interface element for deactivating a channel organization mode. In some embodiments, a single interface element is utilized to activate a channel organization mode (e.g., when not currently activated) and deactivate the channel organization mode (e.g., when currently activated). It should be appreciated that, in some embodiments, the channel organization modal 504 may include one or more interface elements for organizing and/or altering rendered components of the sidebar interface 402. For example in some embodiments, as illustrated, the channel organization model 504 includes one or more interface elements associated with limiting renderings to the sidebar interface 402 (e.g., notifications, badges, and/or the like). Additionally or alternatively, the channel organization modal 504 may include a limited subset of interface elements for altering specific settings, and provide an interface element for accessing a full list of settings associated with managing renderings to the sidebar interface 402.

FIGS. 6A-6C illustrate various states of the group-based communication interface 400 while a channel organization mode is activated. The channel organization mode may have been activated in response to user interaction with the channel organization modal 504, for example a particular sub-interface element thereof. In some embodiments, while a channel organization mode is activated, one or more sub-interfaces of the group-based communication interface 400 may be rendered utilizing a visual effect. In some embodiments, for example as illustrated, the content interface 404 is rendered using a darkened color (e.g., a semi-transparent darkened view with a determined and/or predefined transparency) over the content thereof. In some embodiments, one or more other interfaces is similarly affected (e.g., a flex interface associated with the group-based communication interface 400). The visual effect may help indicate to the user that a channel organization mode is activated. Additionally or alternatively, in some embodiments, the sub-interfaces affected by the visual effect may not receive user interaction while the channel organization mode is activated. In this regard, in some such embodiments, the visual effect draws attention from to the sidebar interface 402 while the channel organization mode is activated. It should be appreciated that the visual effects may be removed upon deactivation of the channel organization mode, such that rendering of the affected interfaces returns to normal.

In some embodiments, upon activation of the channel organization mode, the sidebar interface 402 is updated to include one or more interface elements configured to facilitate channel organization. For example, as illustrated, while in sidebar interface 402 includes the selection submission interface element 602 and the selection interface element set 604. Additionally or alternatively, in some embodiments, the sidebar interface 402 is configured to include one or more interface elements for completing and/or otherwise finalizing channel organization actions performed while channel organization mode is activated (e.g., a "done" button) and/or for reverting channel organization actions performed while channel organization mode is activated (e.g., a "cancel" button). In some embodiments, the sidebar interface 402 is configured to be rendered without such elements when the channel organization mode is deactivated.

In an example context as illustrated, selection interface element set 604 includes a selection interface element for each group-based communication channel rendered via the sidebar interface 402. In this regard, each selection interface element in the selection interface element set 604 may be linked to, and/or otherwise associated with, a particular group-based communication channel rendered to the sidebar interface 402. Each selection interface element of the selection interface element set 604 may be configured to receive user interaction indicating selection of the linked the group-based communication channel for organizing (e.g., moving to an organized channel set, moving to a different organized channel set, and/or removing from an organized channel set). In this regard, one or more group-based communication channels may be selected for organizing together, for example to enable a user to efficiently generate a new organized channel set with one or a plurality of selected group-based communication channels, or efficiently add the one or plurality of selected group-based communication channels to a particular existing organized channel set.

FIG. 6B illustrates one such context of the group-based communication interface 400 with selected group-based communication channels while a channel organization mode is activated. In a particular example context, each selection interface element of the selection interface element set 604 comprises a checkbox. The checkbox may be updated upon user interaction, for example to update a rendering status to "checked" when the group-based communication channel is selected and updating the rendering status to "unchecked" when the group-based communication channel is deselected. Additionally or alternatively, in some embodiments, the selection status of the group-based communication channel for each group-based communication channel determines whether the group-based communication channel is rendered with a visual effect. For example, in some embodiments, a selected group-based communication channel is rendered with a highlighted, bolded, or other visual effect, which may apply to the group-based communication channel alone or the group-based communication channel together with its corresponding selection interface element. For example, as illustrated in FIG. 6B, the group-based communication channel and corresponding selection interface element of the selection interface element set 604 is highlighted upon selection via the corresponding selection interface element.

In some embodiments, the sidebar interface 402 comprises one or more interface elements for adding the group-based communication channels to an organized channel set. For example, as illustrated in FIG. 6C, the sidebar interface 402 comprises selection submission interface element 602. The selection submission interface element 602 may be embodied by any number of known interface components. In some embodiments, in response to the selection submission interface element 602 one or more actions are initiated and/or one or more interfaces are rendered for initiating one or more actions, such as adding the group-based communication channels to an existing organized channel set and/or new channel set.

For example, as illustrated with respect to FIG. 6C, the organized channel set selection modal 606 may be rendered in response to user interaction with the selection submission interface element 602. The organized channel set selection modal 606 may be configured to enable selection of an existing organized channel set and/or creating a new organized channel set. For example, the organized channel set selection modal 606 may include an interface element associated with selecting each of the organized channel sets associated with the authenticated user account, such as to add the selected group-based communication channels to the selected organized channel set. In this regard, each interface element of the organized channel set selection modal 606 may be configured based on the corresponding organized channel sets associated with the authenticated user account and/or group-based communication interface. Additionally or alternatively, for example as illustrated, the organized channel set selection modal 606 additionally includes an interface element for creating a new organized channel set to which the selected group-based communication messages are to be added. In response to engagement with the interface element for creating the new organized channel set, the group-based communication interface 400 may be updated to include interface elements for creating the new organized channel set.

For example, as illustrated in FIG. 7A, in response to user interaction with an interface element for creating a new organized channel set, the group-based communication interface 400 is configured to include new organized channel set modal 700 for creating the new organized channel set. As illustrated, in some embodiments, the new organized channel set modal 700 is rendered over the group-based communication interface 400 without particularly being rendered within the sidebar interface 402 or content interface 404. FIG. 7B illustrates an independent view of the new organized channel set modal 700 separate from the group-based communication interface 400.

The new organized channel set modal 700 includes a plurality of interface elements for creating the new organized channel set. For example, as illustrated, the new organized channel set modal 700 includes an organized channel set image input element 702, an organized channel set title input element 704, and/or one or more interface elements for initiating the creation of the new organized channel set and/or for cancelling creation of the new organized channel set. In some embodiments, the new organized channel set modal 700 additionally includes various information and/or text labels for communicating, to the user, information associated with creating the organized channel set.

In some embodiments, the organized channel set image input element 702 is configured to receive organized channel set image data for utilization in creating the new organized channel set. In some embodiments, the organized channel set image input element 702 is configured to receive user interaction for inputting organized channel set image data. In some embodiments, in response to user interaction, the user may be prompted with an interface for selecting an image (e.g., from one or more available files and/or one or more pre-determined and/or otherwise available image formats).

Alternatively or additionally, in some embodiments, in response to user interaction with the organized channel set image input element 702, the user may input one or more text image data, such as one or more emojis, emoticons, stickers, or the like. In should be appreciated that, in some embodiments, the organized channel set image data is input using one or more keyboards (e.g., physical keyboards and/or virtual keyboards), clicks, and/or other peripherals. The organized channel set image data may be stored within the newly created organized channel set, for example upon submission via one or more other interface elements of the new organized channel set modal 700.

The organized channel set title input element 704 is configured to receive organized channel set title data for utilization in creating the new organized channel set. In some embodiments, the organized channel set title input element 704 is configured to receive user interaction for inputting organized channel set title data. For example, in some embodiments, the user may input organized channel set title data, for example text data, via one or more keyboards (e.g., physical and/or virtual keyboard(s)), other peripherals, and/or other input methodologies. In some embodiments, the organized channel title data entered via the organized channel set title input element 704 is compared to organized channel title data for each existing organized channel set to determine whether the entered organized channel title data is unique. In some embodiments, in a circumstance where the organized channel title data entered via the organized channel set title input element 704 is not unique, one or more error messages are rendered via the new organized channel set modal 700. In some such embodiments, one or more interface elements, associated with submitting the entered information and creating the corresponding new organized channel set, may be disabled until new, unique organized channel set title data is entered. It should be appreciated that, in some embodiments, the organized channel set title data may be stored within the newly created organized channel set, for example upon submission via one or more other interface elements of the new organized channel set modal 700.

FIG. 8 illustrates a de-cluttered sidebar interface 802 including a limited set of group-based communication channels. As illustrated, the sidebar interface 802 includes a limited set of group-based communication channels with respect to the sidebar interface 402. In this regard, the user may select one or more organized channel set(s) to cause rendering of the group-based communication channels associated with the selected organized channel set(s). In some embodiments, the user may change between the default sidebar interface 402 and the de-cluttered sidebar interface 802 using a defined user interaction. For example, in some embodiments, the user may change between the default sidebar interface 402 and the de-cluttered sidebar interface 802 by performing a swipe action, such as in such a circumstance where such renderings are accessible via a page control. It should be appreciated that, for a given authenticated user account accessing a particular group-based communication interface, the accessible group-based communication channels for the authenticated user account remain the same regardless of whether such group-based communication channels are rendered to the sidebar interface of the group-based communication interface.

The sidebar interface 802 includes channel de-cluttering elements set 804. The channel de-cluttering elements set 804 includes any number of interface elements configured to receive user interaction for de-cluttering the accessible group-based communication channel set based on the selected interface element of the channel de-cluttering elements set 804. For example, in some embodiments, the channel de-cluttering elements set 804 includes at least a de-cluttering interface element linked to each organized channel set. Additionally or alternatively, in some embodiments, the channel de-cluttering elements set 804 may include one or more default interface elements. For example, in some embodiments, the channel de-cluttering elements set 804 includes one or more interface elements linked to each group-based communication channel type and/or a set of group-based communication channel type(s) (e.g., an interface element for de-cluttering based on "direct messages," including single-user direct group-based communication channels and multi-user direct group-based communication channels). Each interface element in the channel de-cluttering elements set 804 may be configured to receive user interaction selecting the interface element, and in response to such interaction to initiate one or more processes for de-cluttering the group-based communication channels rendered to the sidebar interface 802. In some embodiments, a selected interface element of the channel de-cluttering elements set is affected by a visual effect while selected (e.g., a color change, a highlight, an animation, bolding or another text effect, or the like). It should be appreciated that, while in some embodiments only one selection may be made, in other embodiments any number of selections may be made for de-cluttering the sidebar interface 802.

In response to user engagement with one of the interface elements in the channel de-cluttering elements set 804, the sidebar interface 802 is updated to reflect a corresponding de-cluttered channel set. In some such embodiments, the de-cluttered channel set is based on the group-based communication channels linked to, or otherwise associated with, a selected organized channel set, where the de-cluttered channel set comprises zero or more group-based communication channels. For example, as illustrated in FIG. 8, the interface element associated with the "Starred" organized channel set is selected (i.e., an organized channel set having organized channel set title data as "Starred"). Based on this selection, the sidebar interface 802 includes the de-cluttered channel set 806, which as illustrated comprises four group-based communication channels. In this regard, the group-based communication channels rendered to the sidebar interface 802 comprises the group-based communication channels linked to the selected organized channel set associated with the selected interface element of the channel de-cluttering elements set 804. In one example context, the user had previously linked the illustrated group-based communication channels with the "Starred" organized channel set, for example as described with respect to one or more of the above-described interfaces and/or via one or more of the processes described below.

The de-cluttered channel set 806 provides a streamlined visual interface as desired by the user. In this regard, one or more organized channel set(s) enable a user to limit the sidebar interface 802 based on the specific desires of the user. A user may create organized channel sets including specific subsets of group-based communication channels, and quickly de-clutter the sidebar interface 802 based on the relevant organized channel set at any given moment. By doing so, such interfaces remove visual clutter and improve overall experience while limiting required user interaction and conserving computing resources traditionally required for rendering such interfaces (e.g., networking resources and/or processing resources).

It should be appreciated that, in some embodiments, additional functionality associated with maintaining organized channel set(s) is provided, for example via the group-based communication interface 400. For example, in some embodiments the group-based communication interface 400 includes sub-interfaces for managing organized channel set(s) in an efficient manner. As illustrated in FIG. 9, for example, the organized channel set interface element 406 is rendered including an organized channel set editing element 902. In some embodiments, the organized channel set editing element 902 is configured to receive user interaction for editing one or more properties of the associated organized channel set. In some embodiments, for example, the organized channel set editing element 902 enables a user to efficiently configure one or more group-based communication channel settings for all group-based communication channels within the corresponding organized channel set. For example, in some embodiments, interaction with the organized channel set editing element 902 and/or one or more corresponding sub-interfaces (e.g., another interface element of the organized channel set editing options modal 904) enables a user to configure channel setting value(s) for available each group-based communication channel setting, or a subset thereof. Once submitted, the updated channel setting values may be utilized to configure the group-based communication channel settings for each group-based communication channel associated with the corresponding organized channel set, for example while they remain associated with the organized channel set or permanently until a subsequent configuration. In this regard, the organized channel set editing element 902 may enable a user to efficiently configure group-based communication channel settings for a plurality of group-based communication channels with a single, or minimal, user interaction.

For example, in some embodiments, the organized channel set editing options modal 904 is rendered in response to user interaction with the organized channel set editing element 902. In some embodiments, the organized channel set editing options modal 904 includes any number of interface elements, each associated with editing a property of the corresponding organized channel set. For example, the organized channel set editing options modal 904 includes an interface element for "renaming" the corresponding organized channel set (such as updating organized channel set title data and/or organized channel set image data for the corresponding organized channel set). In some such embodiments, in response to use reengagement with such an interface element, the user may be presented with the an organized channel set editing modal, for example including interface elements for inputting updated organized channel set image data and/or organized channel set title data (for example, as described above with respect to the organized channel set image input element 702 and the organized channel set title input element 702). Additionally or alternatively, for example as illustrated, the organized channel set editing options modal 904 includes an interface element for deleting the corresponding organized interface element. In some embodiments, upon deleting an organized interface element, the sidebar interface element is updated to be rendered without the corresponding organized channel set interface element. For example, interacting with such an interface element of the organized channel set editing options modal 904 may cause updated rendering of the sidebar interface 402 without the organized channel set interface element 406. In some embodiments, an organized channel set may only be deleted when the organized channel set is linked, or otherwise associated with, no group-based communication channels (e.g., any previously-linked channels have been removed or linked to a different organized channel set).

In other embodiments, upon deleting an organized channel set, group-based communication channels previously linked to that organized channel set are re-organized according to one or more default rules (e.g., associated with an organized channel set based on group-based communication channel type, associated with a default channel list, or the like).

Example Operations Performed by

Embodiments of the Disclosure

Having described example apparatuses and interfaces for initiating specific processes, example flowcharts including various operations performed by apparatuses, devices, and/or sub-systems of the above described systems will now be discussed. It should be appreciated that each of the flowcharts depicts an example computer-implemented process that may be performed by one, or more, of the above described apparatuses, systems, or devices. In regard to the below flowcharts, one or more of the depicted blocks may be optional in some, or all, embodiments. Optional blocks are depicted with broken (dashed) lines.

It should be appreciated that the particular operations depicted and described below with respect to FIGS. 10-17 illustrate specific operations or steps that may be performed in a particular process. Further, the process may be implemented by computer hardware, software, or a combination thereof, of a system, apparatus, device, or the like, as a computer-implemented method. In other embodiments, the various blocks may represent blocks capable of being performed by an apparatus, device, or system. For example, computer-coded instructions may be specially programmed for performing the various operations depicted and stored for execution by an apparatus, for example in one or more memory devices for execution by one or more processors. In other embodiments, computer program code capable of executing the operations depicted by the various blocks may be stored to one or more non-transitory memory devices associated with a computer program product or other computer readable storage medium.

In some embodiments, it should be appreciated that the operations described herein are performed by a group-based communication system, for example embodied by an apparatus 200. In some such embodiments, the user may interact with the group-based communication system via a specially configured client device, for example embodied by an apparatus 300. The client device may be configured for rendering group-based communication interfaces based on particular data received from the group-based communication system, and/or retrieved from the client device based on information received from the group-based communication system. In other embodiments, the client device embodied by the apparatus 300 is configured to perform the operations depicted without communicating with a group-based communication system, for example such that all organized channel sets and/or corresponding information is maintained and retrieved locally. It should be appreciated that all such embodiments are to be within the scope of the disclosure herein.

FIG. 10 illustrates an example process for group-based communication channel organization. The example process illustrated may be performed by a group-based communication system, for example a group-based communication system 102 embodied by the apparatus 200, and/or a client device 104 embodied by the apparatus 300. In some embodiments the apparatus includes or otherwise is in communication with one or more other apparatuses, systems, devices, or the like, to facilitate the operations described herein.

At block 1002, the apparatus includes means configured to receive an interface rendering request associated with an authenticated user account. For example, in some embodiments, the apparatus 200 includes means such as the channel organization module 212, communications module 208, input/output module 206, processor 202, and/or the like, or a combination thereof, configured to receive the interface rendering request from a client device. A user may have previously initiated an authenticated session associated with an authenticated user account, for example via the client device. In some embodiments, the interface rendering request is further associated with a particular group-based communication interface for a particular group-based workspace. For example, in this regard, the interface rendering request may include information identifying the accessed group-based communication interface (e.g., a group-based communication interface identifier) and/or the associated authenticated user account for the client device.

In other embodiments, the apparatus 300 includes means such as the group-based client management module 310, communications module 308, input/output module 306, processor 302, and/or the like, or a combination thereof, configured to receive the interface rendering request in response to user interaction with the apparatus 300. The interface rendering request may include a group-based communication interface identifier based on the user interaction. A user may have previously initiated an authenticated session associated with the authenticated user account, for example through communication with a group-based communication system. The apparatus 300 may store information associated with the authenticated user account (e.g., a user account identifier or authentication information for maintaining an authenticated session) to associate the interface rendering request with the authenticated user account.

At block 1004, the apparatus includes means configured to identify at least one organized channel set associated with the authenticated user account. The at least one organized channel set includes each organized channel set previously generated by the authenticated user account, for example for organizing group-based communication channels within an accessed group-based communication interface identified by the interface rendering request. For example, in some embodiments, the apparatus 200 includes means such as the channel organization module 212, communications module 208, processor 202, and/or the like, or a combination thereof, configured to identify at least one organized channel set associated with the authenticated user account. In some embodiments, the identified at least one organized channel set based on the authenticated user account and the accessed group-based communication interface. For example, the accessed group-based communication interface may be identified based on a group-based communication interface identifier within the interface rendering request. In some embodiments, the apparatus 200 is configured to identify the at least one organized channel set by communicating with one or more group-based communication datastores, for example as described below with respect to FIG. 11A.

In other embodiments, the apparatus 300 includes means such as the group-based client management module 310, communications module 308, processor 302, and/or the like, or a combination thereof, configured to identify at least one organized channel set associated with the authenticated user account. In some embodiments, the apparatus 300 identifies the at least one organized channel set based on the authenticated user account and the accessed group-based communication interface, for example identified from the interface rendering request. In some embodiments, the apparatus 300 is configured to identify the at least one organized channel set by communicating with one or more client datastores, for example as described below with respect to FIG. 11B.

At block 1006, the apparatus includes means configured to cause rendering of a group-based communication interface comprising a sidebar interface, the sidebar interface including at least an organized channel set interface element associated with the at least one organized channel set. For example, in some embodiments, the apparatus 200 includes means such as the channel organization module 212, communications module 208, processor 202, and/or the like, or a combination thereof, configured to cause rendering of a group-based communication interface comprising a sidebar interface, the sidebar interface including at least an organized channel set interface element associated with the at least one organized channel set. In some embodiments, the apparatus 200 is configured to cause rendering of the group-based communication interface by transmitting the group-based communication interface, or associated information, to a client device for rendering to a display associated with the client device. For example, in some embodiments, the apparatus 200 is configured to transmit at least the identified at least one organized channel set to the client device for rendering. In such embodiments, the client device may be configured to configure the group-based communication interface based on the received at least one organized channel set. In some embodiments, the sidebar interface is configured to include an organized channel interface element for each identified organized channel set. In other embodiments, the sidebar interface is configured to include organized channel interface element(s) only for a portion thereof.

In other embodiments, the apparatus 300 includes means such as the group-based client management module 310, communications module 308, processor 302, and/or the like, or a combination thereof, configured to cause rendering of a group-based communication interface comprising a sidebar interface, the sidebar interface including at least an organized channel set interface associated with the at least one organized channel set. In some embodiments, the apparatus 300 is configured to cause rendering to a display integrated with, associated with, and/or otherwise accessible to the apparatus 300. In some embodiments, the apparatus 300 configures the group-based communication interface to have the sidebar interface include at least one organized channel set interface element for each of the identified organized channel set(s). It should be appreciated that, in some embodiments, only a portion of the organized channel set interfaces are rendered at a time, for example depending on resolution and/or display size to which the group-based communication interface is being rendered.

At optional block 1008, the apparatus includes means configured to cause rendering of at least one group-based communication channel separate from the at least one organized channel set interface element. In some embodiments, the at least one group-based communication channel is rendered to an accessible group-based communication channel set. In some such embodiments, the accessible group-based communication channel set includes, by default, all group-based communication channels not yet added to an organized channel set and/or that have been removed from their organized channel set. For example, in some embodiments, the apparatus 200 includes means such as the channel organization module 212, communications module 208, processor 202, and/or the like, or a combination thereof, configured to cause rendering of at least one other group-based communication channel separate from the at least one organized channel set interface element associated with the at least one organized channel set. In some embodiments, the apparatus 200 is configured to cause rendering of the at least one group-based communication channel by transmitting the group-based communication channel (or corresponding identification information, such as a group-based communication identifier) to a client device for rendering. The apparatus 200 may transmit the data associated with the group-based communication channel in a second transmission separated from the data for rendering the at least one organized channel set interface element, or may be transmitted together (e.g., in the same transmission to the client device) with the data for rendering the at least one organized channel set interface element and separately identified within the transmission such that the client device can parse the at least one group-based communication channel for rendering separately.

In other embodiments, the apparatus 300 includes means such as the group-based client management module 310, communications module 308, processor 302, and/or the like, or a combination thereof, configured to cause rendering of at least one group-based communication channel separate from the at least one organized channel set interface element associated with the at least one organized channel set. In some embodiments, the apparatus 300 is configured to identify any group-based communication channels not associated with one of the organized channel set(s), and render these group-based communication channels separate from the at least one organized channel set interface element. For example, the client device 300 may configure the sidebar interface to include an accessible group-based communication channel list comprising the at least one group-based communication channel for rendering separate from any organized channel set interface element. Additionally or alternatively, in other embodiments where the apparatus 300 determines that all group-based communication channels are assigned to at least one organized channel set, the apparatus 300 may not render any separate group-based communication channels.

In some embodiments, after completion of block 1008, the flow ends. In other embodiments, after completion of block 1008, the flow continues to the beginning of any of the flows described herein with respect to FIG. 11A/B or 12-17.

FIG. 11A illustrates additional example operations for an example process for group-based communication channel organization, specifically to identify at least one organized channel set associated with an authenticated user account. In some embodiments, one or more of the operations depicted with respect to FIG. 11A is/are performed in addition to, or alternative to, the operations depicted with respect to FIG. 10. In some embodiments, the example process illustrated may be performed by a group-based communication system, for example a group-based communication system 102 embodied by the apparatus 200.

As illustrated, the process begins at block 1102, which may occur after one or more of the blocks as illustrated in FIG. 10, for example after block 1002. At block 1102, the apparatus 200 includes means such as the channel organization module 212, communications module 208, processor 202, and/or the like, or a combination thereof, configured to query a group-based communication datastore based on the authenticated user account. In some embodiments, the group-based communication datastore is additionally queried based on the authenticated user account and the accessed group-based communication interface, for example identified from a received interface rendering request. In this regard, the apparatus 200 may generate a query utilizing a user account identifier associated with the authenticated user account and/or a group-based communication interface identifier associated with the accessed group-based communication interface, for example such that the combination of the identifiers forms search parameters for the query. The group-based communication datastore may be embodied by one or more local and/or remote (e.g., "cloud") datastores associated with the apparatus 200. The group-based communication datastore may be communicable with the apparatus 200 directly (e.g., under direct management by the apparatus 200) or via one or more APIs.

At block 1104, the apparatus 200 includes means such as the channel organization module 212, communications module 208, processor 202, and/or the like, or a combination thereof, configured to receive the at least one organized channel set in response to querying the group-based communication datastore. In some such embodiments, the retrieved organized channel set(s) are associated with both the authenticated user account and the accessed group-based communication interface based on the query. In this regard, the organized channel set(s) represent organized channel set(s) previously created by the authenticated user account for the accessed group-based communication interface. It should be appreciated that each organized channel set may be linked to, or otherwise associated with, any number of group-based communication channels for the authenticated user account and/or accessed group-based communication interface.

In some such embodiments where the apparatus 200 is configured to store and/or retrieve the organized channel set(s) via communication with a group-based communication datastore, such embodiments may provide consistent interface rendering across a plurality of client devices in communication with a group-based communication interface. For example, a user may create an organized channel set on a first client device, and later access the group-based communication system via a second client device. In such an example context, the apparatus 200 may retrieve the organized channel set(s) through querying the group-based communication datastore and provide the organized channel set to cause rendering of the group-based communication interface to the second client device without requiring the user to re-create the organized channel set via the second client device.

In some embodiments, after completion of block 1104, the flow ends. In other embodiments, after completion of block 1104 the flow returns a subsequent block in another flow, for example to block 1006 as illustrated. In yet other embodiments, after completion of block 1104, the flow continues to the beginning of any of the flows described herein with respect to FIG. 10 or 12-17.

FIG. 11B illustrates additional example operations for an example process for group-based communication channel organization, specifically to identify at least one organized channel set associated with an authenticated user account. In some embodiments, one or more of the operations depicted with respect to FIG. 11B is/are performed in addition to, or alternative to, the operations depicted with respect to FIG. 10. In some embodiments, the example process illustrated may be performed by a specially configured client device, for example a specially configured client device 104 embodied by the apparatus 300.

As illustrated, the process begins at block 1106, which may occur after one or more of the blocks as illustrated in FIG. 10, for example after block 1002. At block 1102, the apparatus 300 includes means such as the group-based client management module 310, input/output module 306, communications module 308, processor 302, and/or the like, or a combination thereof, configured to query a client datastore based on the authenticated user account. In some embodiments, the client datastore is additionally queried based on the authenticated user account and the accessed group-based communication interface, for example identified from a received interface rendering request. In this regard, the apparatus 300 may generate a query utilizing a user account identifier associated with the authenticated user account and/or a group-based communication interface identifier associated with the accessed group-based communication interface, for example such that the combination of the identifiers forms search parameters for the query. The client datastore may be embodied by one or more local datastores maintained by the apparatus 300. In this regard, the client datastore may store information specifically maintained for use by the apparatus 300 in rendering group-based communication interfaces and/or performing associated functionality.

At block 1108, the apparatus 300 includes means such as the group-based client management module 310, input/output module 306, communications module 308, processor 302, and/or the like, or a combination thereof, configured to receive the at least one organized channel set in response to querying the client datastore. In some such embodiments, the retrieved organized channel set(s) are associated with both the authenticated user account and the accessed group-based communication interface based on the query. In this regard, the organized channel set(s) represent organized channel set(s) previously created by the authenticated user account for the accessed group-based communication interface. It should be appreciated that each organized channel set may be linked to, or otherwise associated with, any number of group-based communication channels for the authenticated user account and/or accessed group-based communication interface.

In some such embodiments where the apparatus 300 is configured to store and/or retrieve the organized channel set(s) via a client datastore, such embodiments may provide individualized channel organization across a user's various client devices. Additionally or alternatively, such embodiments minimize networking resources required to render the corresponding group-based communication interface utilizing an appropriate layout, as no communications to a group-based communication system may be required. In this regard, such embodiments may function to function while network communication services are offline and/or inaccessible.

In some embodiments, after completion of block 1108, the flow ends. In other embodiments, after completion of block 1108 the flow returns a subsequent block in another flow, for example to block 1006 as illustrated. In yet other embodiments, after completion of block 1108, the flow continues to the beginning of any of the flows described herein with respect to FIG. 10 or 12-17.

FIG. 12 illustrates additional example operations for an example process for group-based communication channel organization, specifically to create and store a new organized channel set. In some embodiments, one or more of the operations depicted with respect to FIG. 12 is/are performed in addition to, or alternative to, the operations depicted with respect to FIG. 10. The example process illustrated may be performed by a group-based communication system, for example a group-based communication system 102 embodied by the apparatus 200, and/or a client device 104 embodied by the apparatus 300. In some embodiments the apparatus includes or otherwise is in communication with one or more other apparatuses, systems, devices, or the like, to facilitate the operations described herein.

As illustrated, the process begins at block 1202, which may occur after one or more of the blocks as illustrated in FIG. 10, for example after block 1008. At block 1202, the apparatus includes means configured to receive an organized channel set creation request associated with an authenticated user account. For example, in some embodiments, the apparatus 200 includes means such as the channel organization module 212, input/output module 206, communications module 208, processor 202, and/or the like, or a combination thereof, configured to receive an organized channel set creation request associated with the authenticated user account from a client device, for example over one or more communications networks. The organized channel set creation request data object may be transmitted by the client device in response to user interaction with a rendered group-based communication interface, or a sub-element thereof. In some embodiments, the organized channel set creation request includes a user account identifier, or other identification information, associated with the authenticated user account. Additionally or alternatively, in some embodiments, the organized channel set creation request includes a group-based communication interface identifier, and/or other identification information, associated with the group-based communication interface with which the newly created organized channel set is to be linked. In this regard, the organized channel set may be rendered associated with an organized channel set interface element within the associated group-based communication interface.

In other embodiments, the apparatus 300 includes means such as the group-based client management module 310, input/output module 306, communications module 308, processor 302, and/or the like, or a combination thereof, configured to receive an organized channel set creation request associated with the authenticated user account. In some embodiments, the apparatus 300 receives the organized channel set creation request in response to user engagement with a rendered interface element of an accessed group-based communication interface. For example, the apparatus 300 may receive the organized channel set creation request in response to user engagement with a new organized channel set modal as described above, and/or another interface element associated with creating a new organized channel set associated with the currently accessed group-based communication interface. In some embodiments, the organized channel set creation request includes a group-based communication interface identifier associated with the accessed group-based communication interface, or the apparatus 300 is configured to automatically identify the group-based communication interface identifier and/or other identification information associated with the accessed group-based communication interface.

At block 1204, the apparatus includes means configured to generate a new organized channel set based on the organized channel set creation request. The new organized channel set may be generated associated with a unique organized channel set identifier, such that the new organized channel set may be uniquely identified from other organized channel sets currently existing and/or that may be created at a later time. The new organized channel set may be configured to be linked to any number of group-based communication channels. For example, in some embodiments, the new organized channel set includes a linked group-based communication channel list that includes group-based communication identifier(s) and/or other identifying information for linked group-based communication channels. In some such embodiments, by default, the linked group-based communication channel list for the new organized channel set is empty (e.g., not associated with any group-based communication channels) upon initial creation.

In some embodiments, the apparatus 200 includes means such as the channel organization module 212, input/output module 206, communications module 208, processor 202, and/or the like, or a combination thereof, configured to generate the new organized channel set based on the organized channel set creation request. In this regard, the apparatus 200 may be configured to parse the various data included in the organized channel set creation request to create the new organized channel set. For example, the apparatus 200 may be configured to parse the organized channel set creation request to identify organized channel set title data and/or organized channel set image data to be associated with the new organized channel set. In some such embodiments, the organized channel set title data and/or organized channel set image data may have been input and submitted by a user via the client device from which the organized channel set creation request is received. In other embodiments, the apparatus 300 includes means such as the group-based client management module 310, input/output module 306, communications module 308, processor 302, and/or the like, or a combination thereof, configured to generate the new organized channel set based on the organized channel set creation request. In some such embodiments, the apparatus 300 is configured to parse the organized channel set creation request for use in creating the new organized channel set. Alternatively or additionally, in some embodiments, the apparatus 300 may be configured to identify data input via one or more interface components for use in generating the new organized channel set. For example, the apparatus 300 may identify an organized channel set image input element and be configured to parse organized channel set image data associated with the new organized channel set from the organized channel set image input element. Additionally or alternatively, for example, the apparatus 300 may identify an organized channel set title input element and be configured to parse organized channel set title data associated with the new organized channel set from the organized channel set title input element.

At block 1206, the apparatus includes means configured to store the new organized channel set associated with the authenticated user account. Additionally or alternatively, in some embodiments, the new organized channel set is stored associated with the authenticated user account and the accessed group-based communication interface. In some embodiments, the new organized channel set includes identification information associated with the authenticated user account and/or accessed group-based communication interface to link the new organized channel set with such data. For example, in some embodiments, the new organized channel set includes the user account identifier associated with the authenticated user account, and/or the group-based communication interface identifier associated with the accessed group-based communication interface. In other embodiments, the new organized channel set is stored using a given identifier (e.g., a new organized channel set identifier) associated with the authenticated user account identifier, or other identification information, and/or the group-based communication interface identifier, or other identification information. By storing such the new organized channel set associated with the authenticated user account and/or group-based communication interface, the apparatus may retrieve the organized channel set upon subsequent access of the group-based communication interface by the authenticated user account during an authenticated session, for example in use in rendering a corresponding group-based communication interface.

In some embodiments, the apparatus 200 includes means such as the channel organization module 212, input/output module 206, communications module 208, processor 202, and/or the like, or a combination thereof, configured to store the new organized channel set associated with the authenticated user account, and/or the accessed group-based communication interface. In some such embodiments, the apparatus 200 is configured to store the new organized channel set in a group-based communication datastore, for example remote from one or more client devices. In this regard, the apparatus 200 may retrieve the new organized channel set for use in rendering the corresponding accessed group-based communication interface to any client device associated with the authenticated user account (e.g., upon establishing and/or otherwise initiating an authenticated session associated with the authenticated user account).

In other embodiments, the apparatus 300 includes means such as the group-based client management module 310, input/output module 306, communications module 308, processor 302, and/or the like, or a combination thereof, configured to store the new organized channel set associated with the authenticated user account, and/or the accessed group-based communication interface. In some such embodiments, the apparatus 300 is configured to store the new organized channel set in a client datastore, for example locally maintained by the apparatus 300. In this regard, the apparatus 300 may retrieve the new organized channel set for use in subsequent renderings of the accessed group-based communication interface. The new organized channel set may continue to be locally managed by the apparatus 300, such that the organized channel set will not be reflected in renderings of the accessed group-based communication interface via other client devices, apparatuses, or the like.

At block optional 1208, the apparatus includes means configured to cause updated rendering of the group-based communication interface to include a new organized channel set interface element configured based on the new organized channel set. In this regard, the new organized channel set interface element may be rendered within the sidebar interface of the group-based communication interface. In some embodiments, the new organized channel set interface element is configured to include one or more sub-interfaces including the organized channel set title data and/or organized channel set image data for the new organized channel set. It should be appreciated that, in some embodiments, the updated rendering includes the new organized channel set interface element separate from other organized channel set interface elements for one or more previously created organized channel set(s).

In some embodiments, the apparatus 200 includes means such as the channel organization module 212, input/output module 206, communications module 208, processor 202, and/or the like, or a combination thereof, configured to cause updated rendering of the group-based communication interface to include a new organized channel set interface element configured based on the new organized channel set. In some such embodiments, the apparatus 200 is configured to cause rendering of the updated group-based communication interface by transmitting the updated group-based communication interface, or associated information, to a client device for rendering to a display associated with the client device. For example, in some embodiments, the apparatus 200 is configured to transmit at least the new organized channel set, and/or a particular subset of information therein (e.g., organized channel set title data and/or image data) to the client device. In such embodiments, the client device may be configured to update group-based communication interface to include the new organized channel set interface element based on the received information.

In other embodiments, the apparatus 300 includes means such as the group-based client management module 310, input/output module 306, communications module 308, processor 302, and/or the like, or a combination thereof, configured to cause updated rendering of the group-based communication interface to include a new organized channel set interface element configured based on the new organized channel set.

For example, in some embodiments, the apparatus 300 is configured to cause rendering to a display integrated with, associated with, and/or otherwise accessible to the apparatus 300. In some embodiments, the apparatus 300 configures the sidebar interface of the group-based communication interface to include the new organized channel set interface element. The apparatus 300 may configure the new organized channel set interface element by parsing information from the new organized channel set (e.g., organized channel set title data and/or image data). It should be appreciated that, in some contexts, the new organized channel set interface element is rendered upon user interaction with the group-based communication interface (e.g., upon scrolling, in a circumstance where the new organized channel set interface element does not fit within the sidebar interface).

In some embodiments, after completion of block 1208, the flow ends. In other embodiments, after completion of block 1208 the flow returns a subsequent block in another flow as illustrated. In yet other embodiments, after completion of block 1208, the flow continues to the beginning of any of the flows described herein with respect to FIG. 10-11 or 13-17.

FIG. 13 illustrates additional example operations for an example process for group-based communication channel organization, specifically to organize at least one group-based communication channel within an organized channel set. In some embodiments, one or more of the operations depicted with respect to FIG. 13 is/are performed in addition to, or alternative to, the operations depicted with respect to FIG. 10. The example process illustrated may be performed by a group-based communication system, for example a group-based communication system 102 embodied by the apparatus 200, and/or a client device 104 embodied by the apparatus 300. In some embodiments the apparatus includes or otherwise is in communication with one or more other apparatuses, systems, devices, or the like, to facilitate the operations described herein.

As illustrated, the process begins at block 1302, which may occur after one or more of the blocks as illustrated in FIG. 10, for example after block 1008. At block 1302, the apparatus includes means configured to receive a channel organization request. The channel organization request may be associated with at least one selected group-based communication channel and a selected organized channel set. In this regard, the channel organization request indicates a user desire to link the at least one selected group-based communication channel to the selected organized channel set (for example, by associating the selected organized channel set and at least one selected group-based communication channel(s)).

For example, in some embodiments, the apparatus 200 includes means such as the channel organization module 212, input/output module 206, communications module 208, processor 202, and/or the like, or a combination thereof, configured to receive a channel organization request. In some embodiments, the apparatus 200 receives the channel organization request from a client device, for example in response to user interaction with the client device. In some such embodiments, the channel organization request includes at least an organized channel set identifier associated with the selected organized channel set, and a group-based communication channel identifier for each selected group-based communication channel.

In other embodiments, the apparatus 300 includes means such as the group-based client management module 310, input/output module 306, communications module 308, processor 302, and/or the like, or a combination thereof, configured to receive a channel organization request. In some embodiments, the apparatus 300 receives the channel organization request in response to user interaction with an accessed group-based communication interface, and/or a sub-component thereof. For example, in some embodiments, the apparatus 300 receives the channel organization request in response to user interaction with one or more group-based communication channels and/or an organized channel set interface element rendered to the sidebar of the accessed group-based communication interface. For example, in some embodiments, the channel organization request is received in response to a drag-and-drop action, such as dragging a group-based communication channel and releasing it over a rendered organized channel set interface element. In other embodiments, the channel organization request is received based on user interaction while in an organization mode, for example as described below with respect to FIG. 14.

At optional block 1304, the apparatus includes means configured to store the at least one selected group-based communication channel associated with the selected organized channel set. In some embodiments, each organized channel set includes a linked group-based communication channel list, such that the selected organized channel set may be linked to the selected channel set by including the selected organized channels (or corresponding identifiers and/or other identifying information) in the selected organized channel set stored by the apparatus. In other embodiments, the apparatus is configured to store one or more records including the selected organized channel set identifier and the selected group-based communication channel identifiers.

In some embodiments, the apparatus 200 includes means such as the channel organization module 212, input/output module 206, communications module 208, processor 202, and/or the like, or a combination thereof, configured to store the at least one selected group-based communication channel associated with the selected organized channel set within a group-based communication datastore, for example remote from one or more client devices. In this regard, in some embodiments, the apparatus 200 retrieves the selected organized channel set from the group-based communication datastore, updates the organized channel set to include the at least one selected group-based communication channel, and storing the updated organized channel set. Additionally or alternatively, in some embodiments, the apparatus 200 stores a new record linking the selected organized channel set and the one or more selected group-based communication channels in the group-based communication datastore.

In other embodiments, the apparatus 300 includes means such as the group-based client management module 310, input/output module 306, communications module 308, processor 302, and/or the like, or a combination thereof, configured to store the at least one selected group-based communication channel associated with the selected organized channel set within a client datastore. In some embodiments, the apparatus 300 is configured to retrieve the selected organized channel set from the client datastore, update the organized channel set to include the at least one selected group-based communication channel, and store the updated organized channel set back to the client datastore. Additionally or alternatively, in some embodiments, the apparatus 300 stores a new record to the client datastore that links the selected organized channel set and the one or more selected group-based communication channels in the client datastore.

At block 1306, the apparatus includes means configured to cause updated rendering of a selected organized channel set interface element associated with the selected organized channel set to include the at least one selected group-based communication channel. In this regard, the set of group-based communication channels rendered within the selected organized channel set interface element may be updated to include the at least one selected group-based communication channel. For example, in some embodiments, the apparatus 200 includes means such as the channel organization module 212, input/output module 206, communications module 208, processor 202, and/or the like, or a combination thereof, configured to cause updated rendering of a selected organized channel set interface element associated with the selected organized channel set to include the at least one selected group-based communication channel. In some embodiments, for example, the apparatus 200 is configured to transmit the updated organized channel set, and/or associated data, to a client device to cause rendering. Alternatively or additionally, in some embodiments, the apparatus 200 is configured to transmit the selected group-based communication channels, or corresponding identification information, to a client device for rendering. The client device may be configured to automatically generate and/or render the corresponding updated organized channel set interface element in response to receiving the data.

In other embodiments, the apparatus 300 includes means such as the group-based client management module 310, input/output module 306, communications module 308, processor 302, and/or the like, or a combination thereof, configured to cause updated rendering of a selected organized channel set interface element associated with the selected organized channel set to include the at least one selected group-based communication channel. For example, in some embodiments, the apparatus 300 configures the selected organized channel set interface element to be updated to include the at least one selected group-based communication channel within a corresponding channel set. Additionally or alternatively, in some embodiments, the apparatus 300 updates another interface element to remove the group-based communication channel from a previous interface element where it was rendered. For example, if the group-based communication channel was previously associated with a second organized channel set, the group-based communication channel will no longer be rendered associated with a second organized channel set interface element corresponding to the second organized channel set and will be rendered within the selected organized channel set interface element for the selected organized channel set.

It should be appreciated that the process described above with respect to blocks 1302-1306 may similarly be repeated for organizing any number of group-based communication channels within one or more organized channel sets. For example, at block 1308, the apparatus includes means configured to receive a second channel organization request in response to second user interaction data, the second channel organization request associated with at least one second selected group-based communication channel and a second selected organized channel set. It should be appreciated that the at least one second selected group-based communication channel may include the same and/or different group-based communication channels than the first selected group-based communication channels (e.g., received at block 1302). Similarly, the second selected organized channel set may be the same as and/or different from the first selected organized channel set (e.g., received at block 1302).

Further, in this regard, at block 1308 the apparatus 200 and/or apparatus 300 may be configured to receive the second organization request similarly as described above with respect to block 1302. Additionally or alternatively, in this regard, at block 1310 the apparatus 200 and/or apparatus 300 may be configured to store the at least one second selected group-based communication channel associated with the second selected organized channel set similarly as described above with respect to block 1304. Additionally or alternatively, in this regard, at block 1312 the apparatus 200 and/or apparatus 300 may be configured to cause updated rendering of a second organized channel set interface element associated with the second selected organized channel set to include the at least one second selected group-based communication channel similarly as described above with respect to block 1306. In some embodiments, the at least one selected group-based communication channel is represented by a plurality of group-based communication channel identifiers for the selected group-based communication channels. In this regard, in some embodiments, it should be appreciated that the embodiments may be configured to, at one time, store any number of group-based communication channels associated with a selected organized channel set.

In some embodiments, after completion of block 1312, the flow ends. In other embodiments, after completion of block 1312 the flow returns a subsequent block in another flow as illustrated. In yet other embodiments, after completion of block 1312, the flow continues to the beginning of any of the flows described herein with respect to FIG. 10-12 or 14-17.

FIG. 14 illustrates additional example operations for an example process for group-based communication channel organization, specifically to receive a channel organization request. In some embodiments, one or more of the operations depicted with respect to FIG. 14 is/are performed in addition to, or alternative to, the operations depicted with respect to FIG. 13. The example process illustrated may be performed by a client device 104 embodied by the apparatus 300.

As illustrated, the process begins at block 1402, which may occur after one or more of the blocks as illustrated in FIG. 10, for example after block 1008. At block 1402, the apparatus 300 includes means, such as the group-based client management module 310, input/output module 306, communications module 308, processor 302, and/or the like, or a combination thereof, configured to receive a first user interaction data indicating activation of a channel organization mode. In some such embodiments, the first user interaction data indicates user interaction with a specific interface element of the group-based communication interface indicating a user desire to organize one or more group-based communication channels into one or more organized channel set(s). For example, in some embodiments, the first user interaction data is received in response to user interaction with a channel organization modal, as described above.

At block 1404, the apparatus 300 includes means, such as the group-based client management module 310, input/output module 306, communications module 308, processor 302, and/or the like, or a combination thereof, configured to cause rendering of the group-based communication interface comprising at least a selection interface element associated with each group-based communication channel accessible to the authenticated user account. The selection interface elements may be rendered to the sidebar interface of the group-based communication interface, for example next to the various accessible group-based communication channels associated with the authenticated user account. For example, in some embodiments, the apparatus 300 renders the sidebar interface with each selection interface element adjacent to the corresponding group-based communication channel within the group-based communication interface. In some embodiments, to cause rendering of the selection interface elements, the apparatus 300 is configured to toggle each selection interface element to an unhidden state.

At block 1406, the apparatus 300 includes means, such as the group-based client management module 310, input/output module 306, communications module 308, processor 302, and/or the like, or a combination thereof, configured to receive channel selection data for the at least one selected group-based communication channel in response to user interaction with each selection interface element associated with the at least one selected group-based communication channel. In this regard, for example, the apparatus 300 may receive one or more user touches, taps, gestures, clicks, keypresses, commands, or other user interaction with a particular selection interface element associated with a corresponding group-based communication channel. In this regard, the channel selection data indicates the corresponding group-based communication channel has been selected by the user. In response to the channel selection data, the apparatus 300 may be configured to update one or more renderings to the group-based communication interface, for example to reflect the appropriate selected state via the rendered selection interface element and/or corresponding group-based communication channel. It should be appreciated that the channel deselection data may be similarly received in response to a subsequent user interaction with the selection interface element for a group-based communication channel in a selected state, for example where the channel deselection data indicates a user has deselected the group-based communication channel. The channel selection data may indicate selection of any number of group-based communication channels.

At block 1408, the apparatus 300 includes means, such as the group-based client management module 310, input/output module 306, communications module 308, processor 302, and/or the like, or a combination thereof, configured to receive the channel organization request in response to user interaction with the selection submission interface element. In some embodiments, the selection submission interface element is rendered to the group-based communication interface for submitting the selected group-based communication channels for adding to an organized channel set. In some embodiments, for example, the user may interact with the selection submission interface element to cause rendering of an organized channel set selection modal including a number of interface elements associated with selectable organized channel sets. For example, the user may interact with the selection submission interface element to access the organized channel set selection modal for choosing a selected organized channel set from the previously created organized channel sets. In some embodiments, upon interacting with the interface element associated with the selected organized channel set and receiving corresponding interaction data, the apparatus 300 may parse the user interaction data to identify the selected organized channel set and parse the channel selection data to identify the at least one selected group-based communication channel. In some such embodiments, the combination of the at least one selected group-based communication channel and selected organized channel set may form the channel organization request. In this regard, the at least one selected group-based communication channel may be based on the channel selection data and the selected organized channel set based on the user interaction data with the selection submission interface.

In some embodiments, after completion of block 1408, the flow ends. In other embodiments, after completion of block 1408 the flow returns a subsequent block in another flow, for example to block 1304 as illustrated. In yet other embodiments, after completion of block 1408, the flow continues to the beginning of any of the flows described herein with respect to FIG. 10-13 or 15-17.

FIG. 15 illustrates additional example operations for an example process for group-based communication channel organization, specifically to reorganize group-based communication channels within an organized channel set. In some embodiments, one or more of the operations depicted with respect to FIG. 15 is/are performed in addition to, or alternative to, the operations depicted with respect to FIG. 10. The example process illustrated may be performed by a group-based communication system, for example a group-based communication system 102 embodied by the apparatus 200, and/or a client device 104 embodied by the apparatus 300. In some embodiments the apparatus includes or otherwise is in communication with one or more other apparatuses, systems, devices, or the like, to facilitate the operations described herein.

As illustrated, the process begins at block 1502, which may occur after one or more of the blocks as illustrated in FIG. 10, for example after block 1008. At block 1502, the apparatus includes means configured to receive channel reordering user interaction data in response to user interaction with the selected group-based communication channel. The channel reordering user interaction data may represent an action performed to change the order of group-based communication channels within the selected group-based communication channel. For example, in some embodiments, the channel reordering user interaction data indicates a movement of one or more group-based communication channels higher in a channel order or lower in a channel order. In one example context, the user interaction is a drag-and-drop action, for example where a user interacts with a rendered group-based communication channel to move it (i.e. "drag") and ceases interaction, or otherwise physically releases the group-based communication channel (i.e. "drops"), at a new location that defines the new position for the group-based communication channel within a channel order.

In some embodiments, for example, the apparatus 200 includes means such as the channel organization module 212, input/output module 206, communications module 208, processor 202, and/or the like, or a combination thereof, configured to receive channel reordering user interaction data in response to user interaction with the selected group-based communication channel. In some such embodiments, the channel reordering user interaction data is received from a client device. For example, a user may interact with the group-based communication interface rendered to the client device (e.g., using a drag-and-drop action), such that the client device transmits the channel reordering user interaction data in response to completion of the user interaction. In other embodiments, the apparatus 300 includes means such as the group-based client management module 310, input/output module 306, communications module 308, processor 302, and/or the like, or a combination thereof, configured to receive channel reordering user interaction data in response to user interaction with the selected group-based communication channel. In some such embodiments, the apparatus 300 is configured to receive the user interaction (e.g., a drag-and-drop action). In response to completion of the user interaction, the apparatus 300 may be configured to receive the channel reordering user interaction data for processing. For example, in some example embodiments, the user interaction data includes a beginning location and an end location associated with a drag-and-drop action with respect to the coordinate window of the group-based communication interface and/or display associated with the apparatus 300. In other embodiments, the channel reordering user interaction data represents user interaction with a specific interface element associated with reordering the selected group-based communication channel (e.g., an up-arrow for moving the group-based communication channel higher in a channel order, or a down-arrow for moving the group-based communication lower in the channel order).

At block 1504, the apparatus includes means configured to generate an updated channel order based on a channel order and the channel reordering user interaction data. In some such embodiments, each organized channel set includes, or is otherwise associated with, the channel order that represents the order for rendering group-based communication channels linked to, or otherwise associated with, the organized channel set within a corresponding organized channel set interface element. In some embodiments, the channel reordering user interaction data is processed to determine whether the selected group-based communication channel should be reordered to a higher or lower position within the channel order. In an example context, where the channel reordering user interaction data is associated with a drag-and-drop action, the channel reordering user interaction data includes a start location and an end location, for example to identify a selected group-based communication channel based on the start location and identify whether the selected group-based communication channel was released above and/or below another group-based communication channel associated with another position in the channel order based on the end location. The updated channel order may represent the channel order as updated to reposition the selected group-based communication channel within the channel order based on the channel reordering user interaction data. For example, if the selected group-based communication channel was moved above one or more other group-based communication channels, the apparatus may generate the updated channel order to reflect the channel order with all group-based communication channels between the current position and the new position for the selected group-based communication channel shifted down one position (or more if multiple selected group-based communication channels were moved at once).

For example, in some embodiments, the apparatus 200 includes means such as the channel organization module 212, input/output module 206, communications module 208, processor 202, and/or the like, or a combination thereof, configured to generate an updated channel order based on a channel order and the channel reordering user interaction data. For example, the apparatus 200 may receive the channel reordering user interaction data from a client device, such as over one or more communications networks. In this regard, the apparatus 200 may process the channel reordering user interaction data to generate the updated channel order. In an example context, the apparatus 200 is configured parses the channel ordering user interaction data to identify the selected group-based communication channel. Based on the selected group-based communication channel, the apparatus 200 is configured to identify an associated organized channel set and corresponding channel order. The apparatus 200 may further process the channel reordering user interaction data to identify a new position for the selected group-based communication channel, and generate the updated channel order accordingly (e.g., by associating the selected group-based communication system with the new position in the channel order and associating other group-based communication channels with a shifted position as required).

In other embodiments, the apparatus 300 includes means such as the group-based client management module 310, input/output module 306, communications module 308, processor 302, and/or the like, or a combination thereof, configured to generate an updated channel order based on a channel order and the channel reordering user interaction data. In this regard, the apparatus 300 may receive the user interaction with the selected group-based communication channel and process the user interaction to receive the channel reordering user interaction data indicating the user requested a reordering of the selected group-based communication channel. In an example context, the apparatus 300 is configured to identify the selected group-based communication channel, an associated organized channel set with a corresponding channel order, and/or a new position for the selected group-based communication channel within the channel order (e.g., higher or lower than a current position associated with the selected group-based communication channel). In some embodiments, the apparatus 300 is configured to generate the updated channel order to associate the selected group-based communication channel with the new position.

At block 1506, the apparatus includes means configured to cause updated rendering of the group-based communication interface comprising at least the organized channel set interface element rendered based on the updated channel order. In at least some embodiments, the organized channel set interface element is rendered to a sidebar interface of the group-based communication interface. In this regard, the updated group-based communication interface comprises the organized channel set interface element with each associated group-based communication channel rendered in proper positions based on the updated channel order, such that the rendered channel order matches the updated channel order.

For example, in some embodiments, the apparatus 200 includes means such as the channel organization module 212, input/output module 206, communications module 208, processor 202, and/or the like, or a combination thereof, configured to cause updated rendering of the group-based communication interface comprising at least the organized channel set interface element rendered based on the updated channel order. In some embodiments, the apparatus 200 is configured to configure the updated group-based communication interface and transmit the updated group-based communication interface to a client device to cause rendering. Additionally or alternative in some embodiments, the apparatus 200 is configured to transmit the updated channel order, or a corresponding organized channel set including the updated channel order, to a client device to cause rendering of the updated group-based communication interface.

In other embodiments, the apparatus 300 includes means such as the group-based client management module 310, communications module 308, processor 302, and/or the like, or a combination thereof, configured to cause updated rendering of the group-based communication interface comprising at least the organized channel set interface element rendered based on the updated channel order. In some embodiments, the apparatus 300 is configured to cause rendering to a display integrated with, associated with, and/or otherwise accessible to the apparatus 300. In some embodiments, the apparatus 300 configures the updated group-based communication interface including an organized channel set interface element that includes associated group-based communication channels rendered in positions based on the updated channel order. The apparatus 300 may render the organized channel set interface element within a sidebar interface of the group-based communication interface.

In some embodiments, after completion of block 1506, the flow ends. In other embodiments, after completion of block 1506 the flow returns a subsequent block in another flow as illustrated. In yet other embodiments, after completion of block 1506, the flow continues to the beginning of any of the flows described herein with respect to FIG. 10-14 or 16.

FIG. 16 illustrates additional example operations for an example process for group-based communication channel organization, specifically to reorganize organized channel sets for rendering within a group-based communication interface. In some embodiments, one or more of the operations depicted with respect to FIG. 16 is/are performed in addition to, or alternative to, the operations depicted with respect to FIG. 10. The example process illustrated may be performed by a group-based communication system, for example a group-based communication system 102 embodied by the apparatus 200, and/or a client device 104 embodied by the apparatus 300. In some embodiments the apparatus includes or otherwise is in communication with one or more other apparatuses, systems, devices, or the like, to facilitate the operations described herein.

As illustrated, the process begins at block 1602, which may occur after one or more of the blocks as illustrated in FIG. 10, for example after block 1008. At block 1602, the apparatus includes means configured to receive organized channel set reordering user interaction data in response to user interaction with a selected organized channel set interface element. The organized channel set reordering user interaction data may represent an action performed by the user to change the order of organized channel set interface elements rendered within a group-based communication interface, for example within a sidebar interface of the group-based communication interface. For example, in some embodiments, the organized channel set reordering user interaction data indicates a movement of an organized channel set interface element to a higher or lower position in an organized channel set order with respect to one or more other organized channel set interface elements. In one example context, the user interaction is a drag-and-drop action, for example where a user interacts with a rendered organized channel set interface element to move it (i.e. "drag") and ceases interaction, or otherwise physically releases the organized channel set interface element (i.e., "drops"), at a new location that defines a new position for the organized channel set interface element within an organized channel set order. In this regard, the user interaction and corresponding organized channel set reordering user interaction data is associated with the selected organized channel set interface element, and/or a second organized channel set interface element such as the organized channel set interface element above and/or below which the selected organized channel set interface element was dropped.

In some embodiments, for example, the apparatus 200 includes means such as the channel organization module 212, input/output module 206, communications module 208, processor 202, and/or the like, or a combination thereof, configured to receive organized channel set reordering user interaction data in response to user interaction with a selected organized channel set interface element. In some such embodiments, the apparatus 200 is configured to receive the organized channel set reordering user interaction data from a client device. For example, a user may interact with the selected organized channel set interface element rendered to the client device (e.g., using a drag-and-drop action), such that the client device transmits the organized channel set reordering user interaction data in response to completion of the user interaction.

In other embodiments, the apparatus 300 includes means such as the group-based client management module 310, input/output module 306, communications module 308, processor 302, and/or the like, or a combination thereof, configured to receive organized channel set reordering user interaction data in response to user interaction with a selected organized channel set interface element. In some such embodiments, the apparatus 300 is configured to receive the user interaction (e.g., the drag-and-drop action). In response to completion of the user interaction, which the apparatus 300 may be configured to detect (for example, the user ceases interaction with the apparatus 300), the apparatus 300 may be configured to receive the organized channel set reordering user interaction data for processing. For example, in some example embodiments, the organized channel set reordering user interaction data includes a beginning location and an end location associated with a drag-and-drop action with respect to the coordinate window of the group-based communication interface and/or display associated with the apparatus 300. In other embodiments, the channel reordering user interaction data represents user interaction with a specific interface element associated with reordering the selected organized channel set associated with the selected organized channel set interface element (e.g., an up-arrow for moving the organized channel set higher in an organized channel set order, or a down-arrow for moving the organized channel set lower in the organized channel set order).

At block 1604, the apparatus includes means configured to generate an updated organized channel set order based on an organized channel set order and the organized channel set reordering user interaction data. In some such embodiments, each authenticated user account is associated with an organized channel set order for a particular group-based communication interface, where the organized channel set order represents the order for rendering organized channel set interface elements within the group-based communication interface. In some embodiments, the organized channel set reordering user interaction data is processed to determine whether the selected organized channel set interface element should be reordered to a higher or lower position within the organized channel set order. In an example context, where the organized channel set reordering user interaction data is associated with a drag-and-drop action, the organized channel set reordering user interaction data includes a start location and an end location. In this regard, the apparatus may process the organized channel set reordering user interaction data to identify the selected organized channel set interface element based on the start location and identify whether the selected organized channel set interface element was released above and/or below another organized channel set interface element associated with another position in the organized channel set order based on the end location. The updated organized channel set order may represent the organized channel set order as updated to reposition the selected organized channel set within the organized channel set order based on the organized channel set ordering user interaction data. For example, if the selected organized channel set interface element was moved above one or more other organized channel set interface elements, the apparatus may generate the updated organized channel set order to reflect the organized channel set order with all organized channel sets between the current position and the new position for the selected organized channel set down one position (or more if multiple selected organized channel sets were moved at once).

In some embodiments, the apparatus 200 includes means such as the channel organization module 212, input/output module 206, communications module 208, processor 202, and/or the like, or a combination thereof, configured to generate an updated organized channel set order based on an organized channel set order and the organized channel set reordering user interaction data. For example, the apparatus 200 may process the organized channel set reordering user interaction data received from a client device, such as over one or more communications networks. In this regard, the apparatus may process the organized channel set reordering user interaction data to generate the updated organized channel set order. Based on the group-based communication interface within which the selected organized channel set interface element is rendered, the apparatus 200 is configured to identify the organized channel set order for the group-based communication interface. In some embodiments, the apparatus 200 stores the organized channel set order for the group-based communication interface associated with the authenticated user account, such that each authenticated user account may personalize the order of organized channel set interface elements rendered within the group-based communication interface. By parsing the organized channel set reordering user interaction data, and/or processing data therein (e.g., a start location), the apparatus 200 is configured to identify the selected organized channel set interface element. The apparatus 200 may further process the organized channel set reordering user interaction data to identify a new position for the selected organized channel set, for example by parsing the organized channel set reordering user interaction data to identify a new position therein or by parsing the organized channel set reordering user interaction data to identify an end location and processing the end location to determine a new position. Based on processing such information, the apparatus 200 is then configured to generate the updated organized channel set order accordingly (e.g., by associating the selected organized channel set with the new position in the updated organized channel set order and associating other organized channel sets with a shifted position as required).

In other embodiments, the apparatus 300 includes means such as the group-based client management module 310, input/output module 306, communications module 308, processor 302, and/or the like, or a combination thereof, configured to generate an updated organized channel set order based on an organized channel set order and the organized channel set reordering user interaction data. In this regard, the apparatus 300 may receive the user interaction with the selected organized channel set interface element and process the user interaction to receive the organized channel set reordering user interaction data indicating the user requested a reordering of the organized channel set interface element within the group-based communication interface. In an example context, the apparatus 300 is configured to identify the group-based communication interface with which the reorganized channel set reordering user interaction data is associated (e.g., the currently accessed group-based communication interface) and/or the authenticated user account, for use in identifying a corresponding organized channel set order. Additionally or alternatively, the apparatus 300 may process the organized channel set reordering user interaction data to identify the selected organized channel set interface element and/or a new position for the selected organized channel set associated with the selected organized channel set interface element (e.g., higher or lower than a current position associated with the selected organized channel set). In some embodiments, the apparatus 300 is configured to generate the updated organized channel set order to associate the selected organized channel set with the new position.

At block 1606, the apparatus includes means configured to cause updated rendering of the group-based communication interface comprising the sidebar interface, the sidebar interface comprising at least the organized channel set interface element rendered based on the updated organized channel set order. In at least some embodiments, the selected organized channel set interface element is one of a plurality of organized channel set interface elements rendered within the sidebar interface. The plurality of organized channel set interface elements may be rendered based on the updated organized channel set order, such that the selected organized channel set is rendered at the new position. In this regard, the sidebar interface of the updated group-based communication interface comprises each of the organized channel set interface elements rendered in proper positions based on the updated organized channel set order, such that the rendered organized channel set interface element order matches the updated organized channel set interface order.

For example, in some embodiments, the apparatus 200 includes means such as the channel organization module 212, input/output module 206, communications module 208, processor 202, and/or the like, or a combination thereof, configured to cause updated rendering of the group-based communication interface comprising the sidebar interface, the sidebar interface comprising at least the selected organized channel set interface element rendered based on the updated organized channel set order. In some embodiments, the apparatus 200 is configured to configure the updated group-based communication interface and transmit the updated group-based communication interface to a client device to cause rendering. Additionally or alternative in some embodiments, the apparatus 200 is configured to transmit the updated organized channel set order, or a corresponding set of organized channel sets associated with the group-based communication interface representing the updated organized channel set order, to a client device to cause rendering of the updated group-based communication interface.

In other embodiments, the apparatus 300 includes means such as the group-based client management module 310, communications module 308, processor 302, and/or the like, or a combination thereof, configured to cause updated rendering of the group-based communication interface comprising the sidebar interface, the sidebar interface comprising at least the selected organized channel set interface element rendered based on the updated organized channel set order. In some embodiments, the apparatus 300 is configured to cause rendering to a display integrated with, associated with, and/or otherwise accessible to the apparatus 300. In some embodiments, the apparatus 300 configures the updated group-based communication interface to include the sidebar interface including a plurality of organized channel set interface elements rendered in positions based on the updated organized channel set order for the group-based communication.

In some embodiments, after completion of block 1606, the flow ends. In other embodiments, after completion of block 1606 the flow returns a subsequent block in another flow as illustrated. In yet other embodiments, after completion of block 1606, the flow continues to the beginning of any of the flows described above with respect to FIGS. 10-15 and/or 17.

FIG. 17 illustrates additional example operations for an example process for group-based communication channel organization, specifically to process a settings configuration request in accordance with at least one example embodiment of the present disclosure. In some embodiments, one or more of the operations depicted with respect to FIG. 17 is/are performed in addition to, or alternative to, the operations depicted with respect to FIG. 10. The example process illustrated may be performed by a group-based communication system, for example a group-based communication system 102 embodied by the apparatus 200, and/or a client device 104 embodied by the apparatus 300. In some embodiments the apparatus includes or otherwise is in communication with one or more other apparatuses, systems, devices, or the like, to facilitate the operations described herein.

As illustrated, the process begins at block 1702, which may occur after one or more of the blocks as illustrated in FIG. 10, for example after block 1008. At block 1702, the apparatus includes means configured to receive a settings configuration request associated with a selected organized channel set in response to user interaction with a selected organized channel set interface element. The selected organized channel set interface element embodies a particular organized channel set interface element within an earlier rendered group-based communication interface. In some embodiments for example, the settings configuration request is received in response to user interaction with an organized channel set editing element, and/or corresponding modal, of the selected organized channel set interface element. In some embodiments, the settings configuration request includes at least an organized channel set identifier corresponding to the selected organized channel set, for example identified based on the selected organized channel set interface with which the user interacted. Additionally or alternatively, in some embodiments, the settings configuration request includes a channel setting value set for use in configuring one or more corresponding group-based communication channel settings.

In some embodiments, for example, the apparatus 200 includes means such as the channel organization module 212, input/output module 206, communications module 208, processor 202, and/or the like, or a combination thereof, configured to receive the settings configuration request associated with the selected organized channel set in response to user interaction with the selected organized channel set interface element. In some such embodiments, the apparatus 200 is configured receive the settings configuration request from a client device, for example in response to user interaction with the client device. For example, a user may interact with the selected organized channel set interface element rendered to the client device (e.g., via an organized channel set editing element within the selected organized channel set interface element), such that the client device generates and/or transmits the settings configuration request in response to completion of the user interaction.

In other embodiments, the apparatus 300 includes means such as the group-based client management module 310, input/output module 306, communications module 308, processor 302, and/or the like, or a combination thereof, configured to receive the settings configuration request associated with the selected organized channel set in response to user interaction with the selected organized channel set interface element. In some such embodiments, the apparatus 300 is configured to receive the user interaction directly, for example via one or more peripherals, touch components, or the like (e.g., a click on an organized channel set editing element). In response to completion of the user interaction, the apparatus 300 may be configured to receive user interaction data embodying the settings configuration request for processing.

At block 1704, the apparatus includes means configured to configure at least one group-based communication channel setting for each group-based communication channel in a group-based communication channel set associated with the selected organized channel set. In some embodiments, the selected organized channel set is identified and/or retrieved based on information from the settings configuration request, for example an organized channel set identifier therein. In this regard, such embodiments may identify the group-based communication channel associated with the selected organized channel set (e.g., group-based communication channels or identifiers stored within or stored associated with the selected organized channel set, such that group-based communication channel is linked to the organized channel set). To configure the group-based communication channel setting for each group-based communication channel, in some embodiments, the selected organized channel set is updated to reflect new channel setting value(s) identified from the settings configuration request. In some such embodiments, the group-based communication channels linked to the selected organized channel set may inherit such channel setting values while within the selected organized channel set (e.g., and may inherit different values if moved to another organized channel set). Alternatively, in other embodiments, to configure the group-based communication channel setting for each group-based communication channel, the channel setting values are directly updated for each group-based communication channel (e.g., such that if the group-based communication channel is moved, the channel settings values remain the same until a subsequent configuration is performed).

In some embodiments, the apparatus 200 includes means such as the channel organization module 212, processor 202, and/or the like, or a combination thereof, configured to configure at least one group-based communication channel setting for each group-based communication channel in a group-based communication channel set associated with the selected organized channel set. In this regard, the apparatus 200 may identify the selected organized channel set, and/or a corresponding group-based communication channel set, by retrieving such information from a group-based communication datastore. Additionally or alternatively, in this regard, the apparatus 200 may configure the group-based communication channel settings by storing channel setting values identified from the settings configuration request, for the each group-based communication channel settings. The updated channel settings values may be stored, for example in a group-based communication datastore, associated with the organized channels set (e.g., for configuring all group-based communication channels associated with the set through inheritance of the channel setting values), or associated with each group-based communication channel directly (e.g., for configuring the group-based communication channel irrespective of its continued association with the selected organized channel set). The updated channel setting values may be stored associated with a particular authenticated user account identifier, which may be parsed and/or otherwise identified from the settings configuration request, such that the updated channel setting values may be retrieved for use in processing data for transmission to a client device associated with the authenticated user account. In this regard, it should be appreciated that the channel settings values that a particular authenticated user account may be shared across the various client devices associated with the authenticated user account, but different authenticated user accounts are separate such that each may still personalize their channel setting values. The apparatus 200 may, for a particular authenticated user account, utilize such channel setting values in determining how to process incoming information, requests, user interaction data, and/or other data. For example, when receiving new group-based communication messages associated with a group-based communication channel within the selected organized channel set, the apparatus 200 may utilize channel setting values for certain group-based communication channel settings of the selected organized channel set in determining whether to transmit the group-based communication message(s) and/or corresponding notification data (e.g., push notifications) to a client device for rendering.

In other embodiments, the apparatus 300 includes means such as the group-based client management module 310, processor 302, and/or the like, or a combination thereof, configured to configure at least one group-based communication channel setting for each group-based communication channel in a group-based communication channel set associated with the selected organized channel set. In this regard, the apparatus 200 may identify the selected organized channel set, and/or a corresponding group-based communication channel set, by retrieving such information from a client datastore (e.g., local and/or directly accessible to the apparatus 300). Additionally or alternatively, in this regard, the apparatus 300 may configure the group-based communication channel settings by storing channel settings values identified from the settings configuration request for each of the group-based communication settings. The updated channel settings values may be stored, for example in the client datastore, associated with the selected organized channel set (e.g., for configuring all group-based communication channels associated with the organized channel set through inheritance of the channel setting values), or associated with each group-based communication channel directly the channel setting values), or associated with each group-based communication channel directly (e.g., for configuring the group-based communication channel irrespective of its continued association with the selected organized channel set). The apparatus 300 may, for a particular authenticated user account, utilize such channel setting values in determining how to process incoming information, requests, user interaction data, and/or other data. For example, when receiving new group-based communication messages associated with a group-based communication channel within the selected organized channel set, the apparatus 300 may utilize channel setting values for certain group-based communication channel settings of the selected organized channel set in determining whether to render a popup notification message associated with one or more of the received group-based communication messages.

In some embodiments, after completion of block 1704, the flow ends. In other embodiments, after completion of block 1704 the flow returns a subsequent block in another flow as illustrated. In yet other embodiments, after completion of block 1704, the flow continues to the beginning of any of the flows described above with respect to FIGS. 10-16.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., a FPGA or an ASIC. The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    causing display, via a client of a first user associated with a first organization, of an interface associated with a communication platform, wherein the interface includes a first section that includes a first set of non-shared communication channels associated with the first organization and a second section that includes a second set of shared communication channels associated with the first organization and one or more other organizations;
    determining that the first user has been added as a member of a shared communication channel in which the first user was previously a non-member that lacked authorization to access the shared communication channel, wherein the shared communication channel is also associated with one or more second users associated with a second organization that is different than the first organization; and
    based at least in part on determining that the first user has been added as the member of the shared communication channel, automatically associating the shared communication channel with the second section such that the shared communication channel is displayed within the second section.

2. The method as recited in claim 1, wherein, via the interface, the first user is authorized to associate one or more non-shared communication channels with the first section and one or more shared communication channels with the second section.

3. The method as recited in claim 1, further comprising:
    based at least in part on receiving a request, via the interface, from at least one user associated with the first organization or the second organization, generating the shared communication channel, wherein the request identifies users, including the first user and the one or more second users, to be associated with the shared communication channel; and
    automatically associating the shared communication channel with the second section based at least in part on the request.

4. The method as recited in claim 1, wherein direct messages exchanged between the first user and users associated with the one or more other organizations are automatically associated with, and included within, the second section.

5. The method as recited in claim 1, wherein the first user is associated with a plurality of workspaces, wherein the second section is included within each workspace or the plurality of workspaces, further comprising:
    determining an update associated with the second section in association with a first workspace of the plurality of workspaces; and
    updating, based at least in part on the update, the second section in each other workspace of the plurality of workspaces.

6. The method as recited in claim 1, wherein the first section is different than the second section, the first section is included in a first portion of the interface, and the second section is included in a second portion of the interface that is different than the first portion.

7. The method as recited in claim 1, further comprising:
    receiving, from the client associated with the first user and via the interface, a request to drag the shared communication channel or a second shared communication channel of the second set of shared communication channels into a third section associated with the interface; and
    based at least in part on the request, causing display of the shared communication channel or the second shared communication channel within the third section.

8. A system comprising:
one or more processors; and
memory storing one or more computer-executable instructions that, when executed by the one or more processors, cause the one or processors to perform operations comprising:
    causing display, via a client of a first user associated with a first organization, of an interface associated with a communication platform, wherein the interface includes a first section that includes a first set of non-shared communication channels associated with the first organization and a second section that includes a second set of shared communication channels associated with the first organization and one or more other organizations;
    determining that the first user has been added as a member of a shared communication channel in which the first user was previously a non-member that lacked authorization to access the shared communication channel, wherein the shared communication channel is also associated with one or more second users associated with a second organization that is different than the first organization; and
    based at least in part on determining that the first user has been added as the member of the shared communication channel, automatically associating the shared communication channel with the second section such that the shared communication channel is displayed within the second section.

9. The system as recited in claim 8, wherein, via the interface, the first user is authorized to associate one or more non-shared communication channels with the first section and one or more shared communication channels with the second section.

10. The system as recited in claim 8, wherein the operations further comprise:
    based at least in part on receiving a request, via the interface, from at least one user associated with the first organization or the second organization, generating the shared communication channel, wherein the request identifies users, including the first user and the one or more second users, to be associated with the shared communication channel; and
    automatically associating the shared communication channel with the second section based at least in part on the request.

11. The system as recited in claim 8, wherein direct messages exchanged between the first user and users associated with the one or more other organizations are automatically associated with, and included within, the second section.

12. The system as recited in claim 8, wherein the first user is associated with a plurality of workspaces, wherein the second section is included within each workspace or the plurality of workspaces, wherein the operations further comprise:
    determining an update associated with the second section in association with a first workspace of the plurality of workspaces; and updating, based at least in part on the update, the second section in each other workspace of the plurality of workspaces.

13. The system as recited in claim 8, wherein the first section is different than the second section, the first section is included in a first portion of the interface, and the second section is included in a second portion of the interface that is different than the first portion.

14. The system as recited in claim 8, wherein the operations further comprise:
 receiving, from the client associated with the first user and via the interface, a request to drag the shared communication channel or a second shared communication channel of the second set of shared communication channels into a third section associated with the interface; and
 based at least in part on the request, causing display of the shared communication channel or the second shared communication channel within the third section.

15. One or more non-transitory computer-readable media storing one or more computer-executable instructions that, when executed by one or more processors, cause the one or more processors to perform operations comprising:
 causing display, via a client of a first user associated with a first organization, of an interface associated with a communication platform, wherein the interface includes a first section that includes a first set of non-shared communication channels associated with the first organization and a second section that includes a second set of shared communication channels associated with the first organization and one or more other organizations;
 determining that the first user has been added as a member of a shared communication channel in which the first user was previously a non-member that lacked authorization to access the shared communication channel, wherein the shared communication channel is also associated with one or more second users associated with a second organization that is different than the first organization; and
 based at least in part on determining that the first user has been added as the member of the shared communication channel, automatically associating the shared communication channel with the second section such that the shared communication channel is displayed within the second section.

16. The one or more non-transitory computer-readable media as recited in claim 15, wherein, via the interface, the first user is authorized to associate one or more non-shared communication channels with the first section and one or more shared communication channels with the second section.

17. The one or more non-transitory computer-readable media as recited in claim 15, wherein the operations further comprise:
 based at least in part on receiving a request, via the interface, from at least one user associated with the first organization or the second organization, generating the shared communication channel, wherein the request identifies users, including the first user and the one or more second users, to be associated with the shared communication channel; and
 automatically associating the shared communication channel with the second section based at least in part on the request.

18. The one or more non-transitory computer-readable media as recited in claim 15, wherein direct messages exchanged between the first user and users associated with the one or more other organizations are automatically associated with, and included within, the second section.

19. The one or more non-transitory computer-readable media as recited in claim 15, wherein the first user is associated with a plurality of workspaces, wherein the second section is included within each workspace or the plurality of workspaces, wherein the operations further comprise:
 determining an update associated with the second section in association with a first workspace of the plurality of workspaces; and
 updating, based at least in part on the update, the second section in each other workspace of the plurality of workspaces.

20. The one or more non-transitory computer-readable media as recited in claim 15, wherein the operations further comprise:
 receiving, from the client associated with the first user and via the interface, a request to drag the shared communication channel or a second shared communication channel of the second set of shared communication channels into a third section associated with the interface; and
 based at least in part on the request, causing display of the shared communication channel or the second shared communication channel within the third section.

\* \* \* \* \*